United States Patent
Watanabe et al.

(10) Patent No.: US 9,837,890 B2
(45) Date of Patent: Dec. 5, 2017

(54) CHARGE PUMP CIRCUIT AND SEMICONDUCTOR DEVICE INCLUDING THE SAME

(71) Applicant: Semiconductor Energy Laboratory Co., Ltd., Atsugi-shi, Kanagawa-ken (JP)

(72) Inventors: Kazunori Watanabe, Kanagawa (JP); Tomoaki Atsumi, Kanagawa (JP)

(73) Assignee: Semiconductor Energy Laboratory Co., Ltd., Atsugi-shi, Kanagawa-ken (JP)

(*) Notice: Subject to any disclaimer, the term of this patent is extended or adjusted under 35 U.S.C. 154(b) by 0 days.

(21) Appl. No.: 14/842,905

(22) Filed: Sep. 2, 2015

(65) Prior Publication Data

US 2015/0381036 A1  Dec. 31, 2015

Related U.S. Application Data

(63) Continuation of application No. 14/457,525, filed on Aug. 12, 2014, now Pat. No. 9,385,592.

(30) Foreign Application Priority Data

Aug. 21, 2013  (JP) .................. 2013-171308
Jan. 28, 2014  (JP) .................. 2014-013156

(51) Int. Cl.
G05G 1/10        (2006.01)
H02M 3/07       (2006.01)

(52) U.S. Cl.
CPC ............. H02M 3/07 (2013.01); H02M 3/073 (2013.01)

(58) Field of Classification Search
CPC ....... H01L 2924/00; H01L 2924/00014; H01L 2224/32225; H01L 2224/73265; H01L 2224/48227
See application file for complete search history.

(56) References Cited

U.S. PATENT DOCUMENTS 5,489,870 A   2/1996 Arakawa
5,731,856 A   3/1998 Kim et al.
(Continued)

FOREIGN PATENT DOCUMENTS

EP   1737044 A   12/2006
EP   2226847 A    9/2010
(Continued)

OTHER PUBLICATIONS

Kobayashi.H et al., "Processor with 4.9-μs break-even time in power gating using crystalline In—Ga—Zn-oxide transistor", Cool Chips XVI, Apr. 17, 2013, pp. 1-3.
(Continued)

Primary Examiner — Sibin Chen
(74) Attorney, Agent, or Firm — Fish & Richardson P.C.

(57) ABSTRACT

Efficiency of a charge pump circuit is increased. The charge pump circuit includes serially connected fundamental circuits each including a diode-connected transistor and a capacitor. At least one transistor is provided with a back gate, and the back gate is connected to any node in the charge pump circuit. For example, the charge pump circuit is of a step-up type; in which case, if the transistor is an n-channel transistor, a back gate of the transistor in the last stage is connected to an output node of the charge pump circuit. Back gates of the transistors in the other stages are connected to an input node of the charge pump circuit. In this way, the voltage holding capability of the fundamental circuit in the last stage is increased, and the conversion efficiency can be increased because an increase in the threshold of the transistors in the other stages is prevented.

12 Claims, 36 Drawing Sheets

(56) References Cited

U.S. PATENT DOCUMENTS

| | | | |
|---|---|---|---|
| 5,744,864 A | 4/1998 | Cillessen et al. |
| 5,815,446 A | 9/1998 | Tobita |
| 5,821,805 A | 10/1998 | Jinbo |
| 5,892,267 A | 4/1999 | Takada |
| 6,069,518 A | 5/2000 | Nakai et al. |
| 6,163,487 A | 12/2000 | Ghilardelli |
| 6,172,886 B1 | 1/2001 | Lauterbach et al. |
| 6,175,264 B1 | 1/2001 | Jinbo |
| 6,294,274 B1 | 9/2001 | Kawazoe et al. |
| 6,373,325 B1 | 4/2002 | Kuriyama |
| 6,563,174 B2 | 5/2003 | Kawasaki et al. |
| 6,603,346 B2 | 8/2003 | Sawada et al. |
| 6,664,846 B1 | 12/2003 | Maung et al. |
| 6,720,822 B2 | 4/2004 | Torrisi et al. |
| 6,727,522 B1 | 4/2004 | Kawasaki et al. |
| 6,747,897 B2 | 6/2004 | Karaki |
| 6,791,882 B2 | 9/2004 | Seki et al. |
| 6,847,250 B2 | 1/2005 | Kim |
| 6,914,791 B1 | 7/2005 | Park et al. |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,211,825 B2 | 5/2007 | Shih et al |
| 7,282,782 B2 | 10/2007 | Hoffman et al. |
| 7,297,977 B2 | 11/2007 | Hoffman et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,602,231 B2 | 10/2009 | Yamamoto et al. |
| 7,674,650 B2 | 3/2010 | Akimoto et al. |
| 7,732,819 B2 | 6/2010 | Akimoto et al. |
| 7,777,557 B2 | 8/2010 | Yamahira |
| 8,004,907 B2 | 8/2011 | Russell et al. |
| 8,107,279 B2 | 1/2012 | Yamaoka et al. |
| 8,209,504 B2 | 6/2012 | Nakanishi et al. |
| 8,222,953 B2 | 7/2012 | Nakamura |
| 8,598,945 B2 | 12/2013 | Gorisse |
| 8,773,906 B2 | 7/2014 | Ohmaru |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0184360 A1 | 10/2003 | Wang et al. |
| 2003/0189401 A1 | 10/2003 | Kido et al. |
| 2003/0218222 A1 | 11/2003 | Wager, III et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0199959 A1 | 9/2005 | Chiang et al. |
| 2006/0006925 A1 | 1/2006 | Yamazoe et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0112249 A1* | 5/2008 | Kang ............... G11C 11/4074 365/226 |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0068773 A1 | 3/2009 | Lai et al. |
| 2009/0073325 A1 | 3/2009 | Kuwabara et al. |
| 2009/0102120 A1 | 4/2009 | Hou et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2011/0089927 A1 | 4/2011 | Yamazaki et al. |
| 2011/0101942 A1 | 5/2011 | Yamazaki et al. |
| 2011/0175449 A1* | 7/2011 | Kobayashi ............... H02J 1/08 307/43 |
| 2011/0216566 A1 | 9/2011 | Kamata |
| 2012/0161139 A1 | 6/2012 | Endo et al. |
| 2012/0193620 A1 | 8/2012 | Godo et al. |
| 2012/0195138 A1 | 8/2012 | Son |
| 2013/0248965 A1* | 9/2013 | Nakai ............... H01L 29/788 257/315 |
| 2013/0300462 A1 | 11/2013 | Koyama et al. |
| 2013/0307496 A1 | 11/2013 | Watanabe |
| 2013/0314125 A1* | 11/2013 | Takemura ......... H03K 19/0013 326/49 |
| 2013/0314152 A1 | 11/2013 | Matsuzaki et al. |
| 2014/0068301 A1 | 3/2014 | Watanabe |
| 2014/0077786 A1 | 3/2014 | Shionoiri et al. |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |

(56) References Cited

FOREIGN PATENT DOCUMENTS

| | | |
|---|---|---|
| JP | 2000-044236 A | 2/2000 |
| JP | 2000-150900 A | 5/2000 |
| JP | 2000-270541 A | 9/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2011-171700 A | 9/2011 |
| WO | WO-2004/114391 | 12/2004 |

OTHER PUBLICATIONS

Nagatsuka.S et al., "A 3bit/cell Nonvolatile Memory with Crystalline In—Ga—Zn—O TFT", IMW 2013 (5th IEEE International Memory Workshop), May 26, 2013, pp. 188-191.

Asakuma.N et al., "Crystallization and Reduction of Sol-Gel-Derived Zinc Oxide Films by Irradiation With Ultraviolet Lamp", Journal of Sol-Gel Science and Technology, 2003, vol. 26, pp. 181-184.

Asaoka.Y et al., "29.1: Polarizer-Free Reflective LCD Combined With Ultra Low-Power Driving Technology", SID Digest '09 : SID International Symposium Digest of Technical Papers, May 31, 2009, pp. 395-398.

Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.

Cho.D et al., "21.2:Al and Sn-Doped Zinc Indium Oxide Thin Film Transistors for AMOLED Back-Plane", SID Digest '09 : SID International Symposium Digest of Technical Papers, May 31, 2009, pp. 280-283.

Clark.S et al., "First Principles Methods Using CASTEP", Zeitschrift fur Kristallographie, 2005, vol. 220, pp. 567-570.

Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.

Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.

Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.

Fortunato.E et al., "Wide-Bandgap High-Mobility ZnO Thin-Film Transistors Produced at Room Temperature", Appl. Phys. Lett. (Applied Physics Letters) , Sep. 27, 2004, vol. 85, No. 13, pp. 2541-2543.

Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.

Godo.H et al., "P-9:Numerical Analysis on Temperature Dependence of Characteristics of Amorphouse In—Ga—Zn-Oxide TFT", SID Digest '09 : SID International Symposium Digest of Technical Papers, May 31, 2009, pp. 1110-1112.

Godo.H et al., "Temperature Dependence of Characteristics and Electronic Structure for Amorphous In—Ga—Zn-Oxide TFT", AM-FPD '09 Digest of Technical Papers, Jul. 1, 2009, pp. 41-44.

Hayashi.R et al., "42.1: Invited Paper: Improved Amorphous In—Ga—Zn—O TFTs", SID Digest '08 : SID International Symposium Digest of Technical Papers, May 20, 2008, vol. 39, pp. 621-624.

Hirao.T et al., "Novel Top-Gate Zinc Oxide Thin-Film Transistors (ZnO TFTs) for AMLCDs", J. Soc. Inf. Display (Journal of the Society for Information Display), 2007, vol. 15, No. 1, pp. 17-22.

Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.

Hsieh.H et al., "P-29:Modeling of Amorphous Oxide Semiconductor Thin Film Transistors and Subgap Density of States", SID Digest '08 : SID International Symposium Digest of Technical Papers, May 20, 2008, vol. 39, pp. 1277-1280.

Ikeda.T et al., "Full-Functional System Liquid Crystal Display Using CG-Silicon Technology", SID Digest '04 : SID International Symposium Digest of Technical Papers, 2004, vol. 35, pp. 860-863.

Janotti.A et al., "Native Point Defects in ZnO", Phys. Rev. B (Physical Review. B), Oct. 4, 2007, vol. 76, No. 16, pp. 165202-1-165202-22.

Janotti.A et al., "Oxygen Vacancies in ZnO", Appl. Phys. Lett. (Applied Physics Letters) , 2005, vol. 87, pp. 122102-1-122102-3.

Jeong.J et al., "3.1: Distinguished Paper: 12.1-Inch WXGA AMOLED Display Driven by Indium-Gallium-Zinc Oxide TFTs Array", SID Digest '08 : SID International Symposium Digest of Technical Papers, May 20, 2008, vol. 39, No. 1, pp. 1-4.

Jin.D et al., "65.2:Distinguished Paper:World-Largest (6.5") Flexible Full Color Top Emission AMOLED Display on Plastic Film and Its Bending Properties", SID Digest '09 : SID International Symposium Digest of Technical Papers, May 31, 2009, pp. 983-985.

Kanno.H et al., "White Stacked Electrophosphorecent Organic Light-Emitting Devices Employing MoO3 as a Charge-Generation Layer", Adv. Mater. (Advanced Materials), 2006, vol. 18, No. 3, pp. 339-342.

Kikuchi.H et al., "39.1:Invited Paper:Optically Isotropic Nano-Structured Liquid Crystal Composites for Display Applications", SID Digest '09 : SID International Symposium Digest of Technical Papers, May 31, 2009, pp. 578-581.

Kikuchi.H et al., "62.2:Invited Paper:Fast Electro-Optical Switching in Polymer-Stabilized Liquid Crystalline Blue Phases for Display Application", SID Digest '07 : SID International Symposium Digest of Technical Papers, 2007, vol. 38, pp. 1737-1740.

Kikuchi.H et al., "Polymer-Stabilized Liquid Crystal Blue Phases", Nature Materials, Sep. 2, 2002, vol. 1, pp. 64-68.

Kim.S et al., "High-Performance oxide thin film transistors passivated by various gas plasmas", 214th ECS Meeting, 2008, No. 2317, ECS.

Kimizuka.N et al., "Spinel,Yb2Fe2O4, and Yb2Fe3O7 Types of Structures for Compounds in the In2O3 and Sc2O3—A2O3—BO Systems [A; Fe, Ga, or Al; B: Mg, Mn, Fe, Ni, Cu,or Zn] at Temperatures Over 1000° C.", Journal of Solid State Chemistry, 1985, vol. 60, pp. 382-384.

Kimizuka.N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System", Journal of Solid State Chemistry, Apr. 1, 1995, vol. 116, No. 1, pp. 170-178.

Kitzerow.H et al., "Observation of Blue Phases in Chiral Networks", Liquid Crystals, 1993, vol. 14, No. 3, pp. 911-916.

Kurokawa.Y et al., "UHF RFCPUS on Flexible and Glass Substrates for Secure RFID Systems", Journal of Solid-State Circuits , 2008, vol. 43, No. 1, pp. 292-299.

Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.

Lee.H et al., "Current Status of, Challenges to, and Perspective View of AM-OLED", IDW '06 : Proceedings of the 13th International Display Workshops, Dec. 7, 2006, pp. 663-666.

Lee.J et al., "World's Largest (15-Inch) XGA AMLCD Panel Using IGZO Oxide TFT", SID Digest '08 : SID International Symposium Digest of Technical Papers, May 20, 2008, vol. 39, pp. 625-628.

(56) References Cited

OTHER PUBLICATIONS

Lee.M et al., "15.4:Excellent Performance of Indium-Oxide-Based Thin-Film Transistors by DC Sputtering", SID Digest '09 : SID International Symposium Digest of Technical Papers, May 31, 2009, pp. 191-193.

Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.

Masuda.S et al., "Transparent thin film transistors using ZnO as an active channel layer and their electrical properties", J. Appl. Phys. (Journal of Applied Physics) , Feb. 1, 2003, vol. 93, No. 3, pp. 1624-1630.

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

Miyasaka.M, "SUFTLA Flexible Microelectronics on Their Way to Business", SID Digest '07 : SID International Symposium Digest of Technical Papers, 2007, vol. 38, pp. 1673-1676.

Mo.Y et al., "Amorphous Oxide TFT Backplanes for Large Size AMOLED Displays", IDW '08 : Proceedings of the 6th International Display Workshops, Dec. 3, 2008, pp. 581-584.

Nakamura.M et al., "The phase relations in the In2O3—Ga2ZnO4—ZnO system at 1350° C.", Journal of Solid State Chemistry, Aug. 1, 1991, vol. 93, No. 2, pp. 298-315.

Nakamura.M, "Synthesis of Homologous Compound with New Long-Period Structure", NIRIM Newsletter, Mar. 1, 1995, vol. 150, pp. 1-4.

Nomura.K et al., "Amorphous Oxide Semiconductors for High-Performance Flexible Thin-Film Transistors", Jpn. J. Appl. Phys. (Japanese Journal of Applied Physics) , 2006, vol. 45, No. 5B, pp. 4303-4308.

Nomura.K et al., "Carrier transport in transparent oxide semiconductor with intrinsic structural randomness probed using single-crystalline InGaO3(ZnO)5 films", Appl. Phys. Lett. (Applied Physics Letters) , Sep. 13, 2004, vol. 85, No. 11, pp. 1993-1995.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Nomura.K et al., "Thin-Film Transistor Fabricated in Single-Crystalline Transparent Oxide Semiconductor", Science, May 23, 2003, vol. 300, No. 5623, pp. 1269-1272.

Nowatari.H et al., "60.2: Intermediate Connector With Suppressed Voltage Loss for White Tandem OLEDs", SID Digest '09 : SID International Symposium Digest of Technical Papers, May 31, 2009, vol. 40, pp. 899-902.

Oba.F et al., "Defect energetics in ZnO: A hybrid Hartree-Fock density functional study", Phys. Rev. B (Physica Review. B), 2008, vol. 77, pp. 245202-1-245202-6.

Oh.M et al., "Improving the Gate Stability of ZnO Thin-Film Transistors With Aluminum Oxide Dielectric Layers", J. Electrochem. Soc. (Journal of the Electrochemical Society), 2008, vol. 155, No. 12, pp. H1009-H1014.

Ohara.H et al., "21.3:4.0 In. QVGA AMOLED Display Using In—Ga—Zn-Oxide TFTs With a Novel Passivation Layer", SID Digest '09 : SID International Symposium Digest of Technical Papers, May 31, 2009, pp. 284-287.

Ohara.H et al., "Amorphous In—Ga—Zn-Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.

Orita.M et al., "Amorphous transparent conductive oxide InGaO3(ZnO)m (m<4):a Zn4s conductor", Philosphical Magazine, 2001, vol. 81, No. 5, pp. 501-515.

Orita.M et al., "Mechanism of Electrical Conductivity of Transparent InGaZnO4", Phys. Rev. B (Physical Review. B), Jan. 15, 2000, vol. 61, No. 3, pp. 1811-1816.

Osada.T et al., "15.2: Development of Driver-Integrated Panel using Amorphous In—Ga—Zn-Oxide TFT", SID Digest '09 : SID International Symposium Digest of Technical Papers, May 31, 2009, pp. 184-187.

Osada.T et al., "Development of Driver-Integrated Panel Using Amorphous In—Ga—Zn-Oxide TFT", AM-FPD '09 Digest of Technical Papers, Jul. 1, 2009, pp. 33-36.

Park.J et al., "Amorphous Indium-Gallium-Zinc Oxide TFTs and Their Application for Large Size AMOLED", AM-FPD '08 Digest of Technical Papers, Jul. 2, 2008, pp. 275-278.

Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.

Park.J et al., "Electronic Transport Properties of Amorphous Indium-Gallium-Zinc Oxide Semiconductor Upon Exposure to Water", Appl. Phys. Lett. (Applied Physics Letters) , 2008, vol. 92, pp. 072104-1-072104-3.

Park.J et al., "High performance amorphous oxide thin film transistors with self-aligned top-gate structure", IEDM 09: Technical Digest of International Electron Devices Meeting, Dec. 7, 2009, pp. 191-194.

Park.J et al., "Improvements in the Device Characteristics of Amorphous Indium Gallium Zinc Oxide Thin-Film Transistors by Ar Plasma Treatment", Appl. Phys. Lett. (Applied Physics Letters) , Jun. 26, 2007, vol. 90, No. 26, pp. 262106-1-262106-3.

Park.S et al., "Challenge to Future Displays: Transparent AM-OLED Driven by PEALD Grown ZnO TFT", IMID '07 Digest, 2007, pp. 1249-1252.

Park.Sang-Hee et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.

Prins.M et al., "A Ferroelectric Transparent Thin-Film Transistor", Appl. Phys. Lett. (Applied Physics Letters) , Jun. 17, 1996, vol. 68, No. 25, pp. 3650-3652.

Sakata.J et al., "Development of 4.0-In. AMOLED Display With Driver Circuit Using Amorphous In—Ga—Zn-Oxide TFTs", IDW '09 : Proceedings of the 16th International Display Workshops, 2009, pp. 689-692.

Son.K et al., "42.4L: Late-News Paper: 4 Inch QVGA AMOLED Driven by the Threshold Voltage Controlled Amorphous GIZO (Ga2O3—In2O3—ZnO) TFT", SID Digest '08 : SID International Symposium Digest of Technical Papers, May 20, 2008, vol. 39, pp. 633-636.

Takahashi.M et al., "Theoretical Analysis of Igzo Transparent Amorphous Oxide Semiconductor", IDW '08 : Proceedings of the 15th International Display Workshops, Dec. 3, 2008, pp. 1637-1640.

Tsuda.K et al., "Ultra Low Power Consumption Technologies for Mobile TFT-LCDs", IDW '02 : Proceedings of the 9th International Display Workshops, Dec. 4, 2002, pp. 295-298.

Ueno.K et al., "Field-Effect Transistor on SrTiO3 With Sputtered Al2O3 Gate Insulator", Appl. Phys. Lett. (Applied Physics Letters) , Sep. 1, 2003, vol. 83, No. 9, pp. 1755-1757.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

Kato.K et al., "Evaluation of Off-State Current Characteristics of Transistor Using Oxide Semiconductor Material, Indium.Gallium. Zinc Oxide", Jpn. J. Appl. Phys. (Japanese Journal of Applied Physics) , 2012, vol. 51, pp. 021201-1-021201-7.

* cited by examiner

61

62

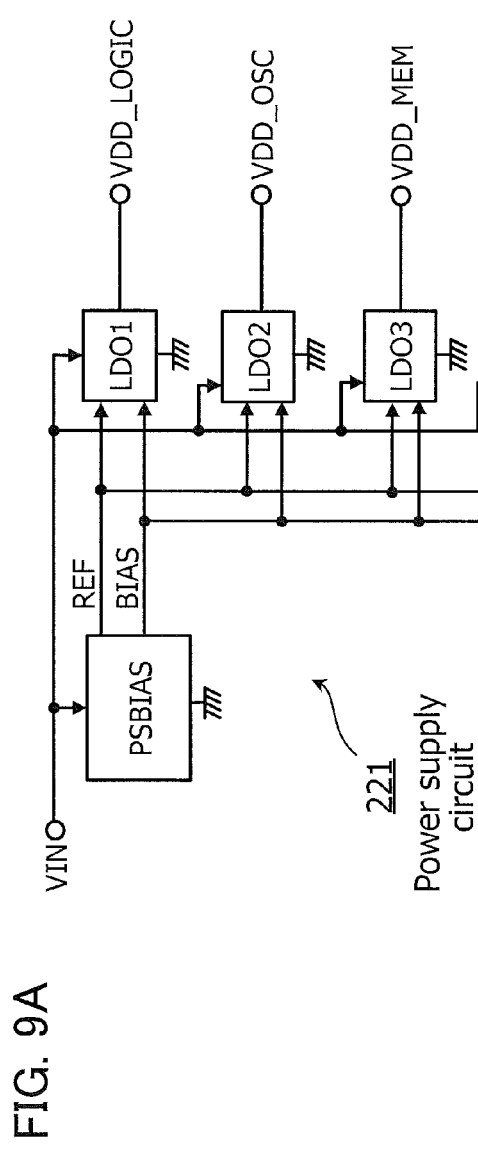
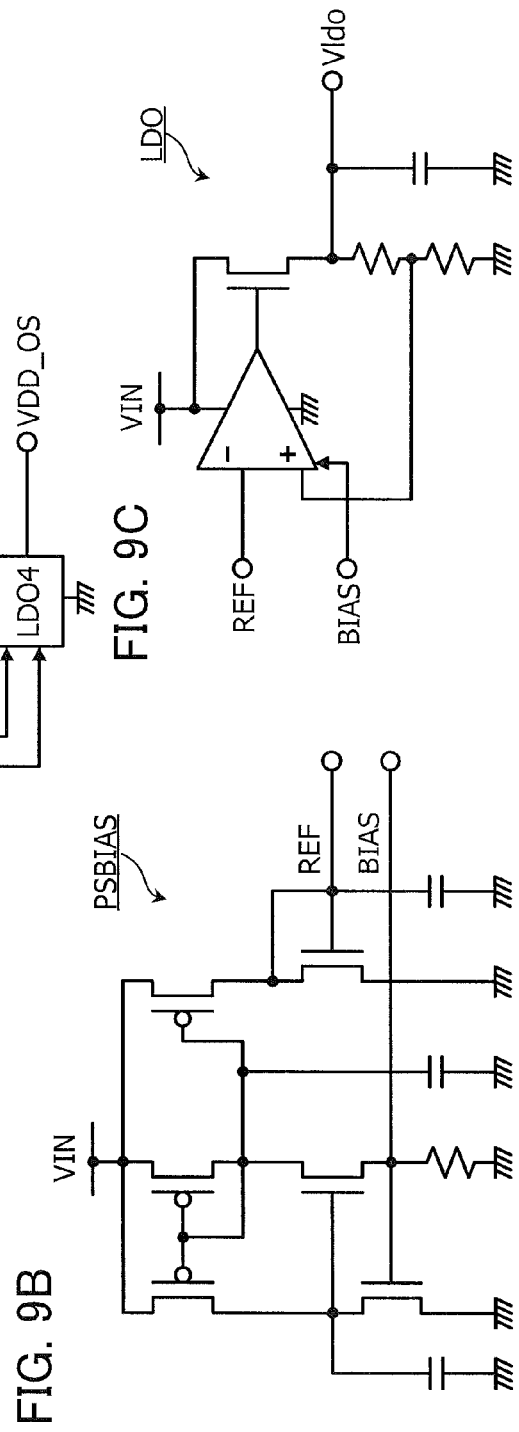
FIG. 9A
FIG. 9B
FIG. 9C

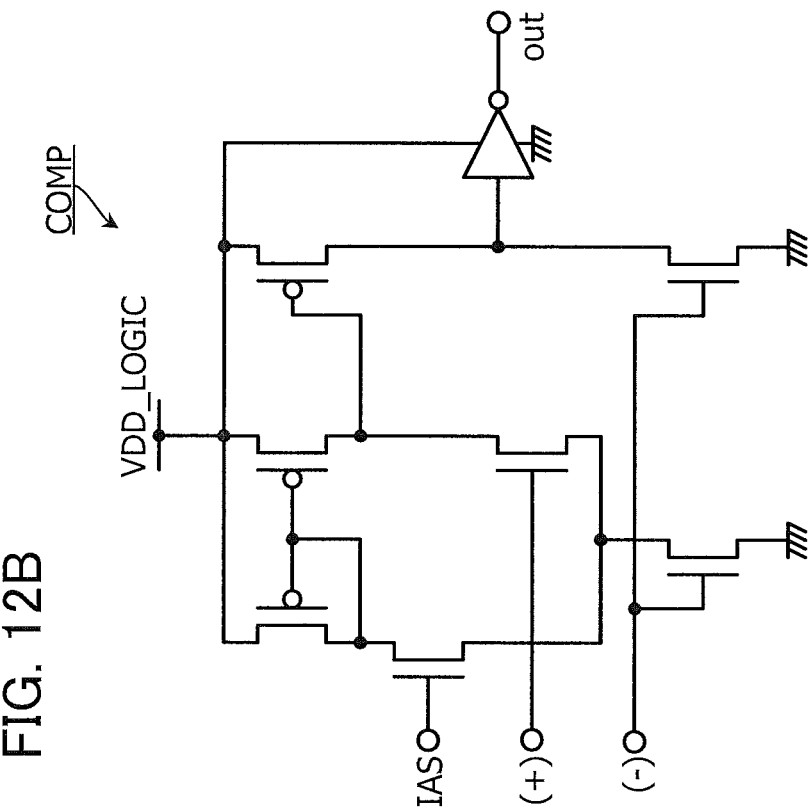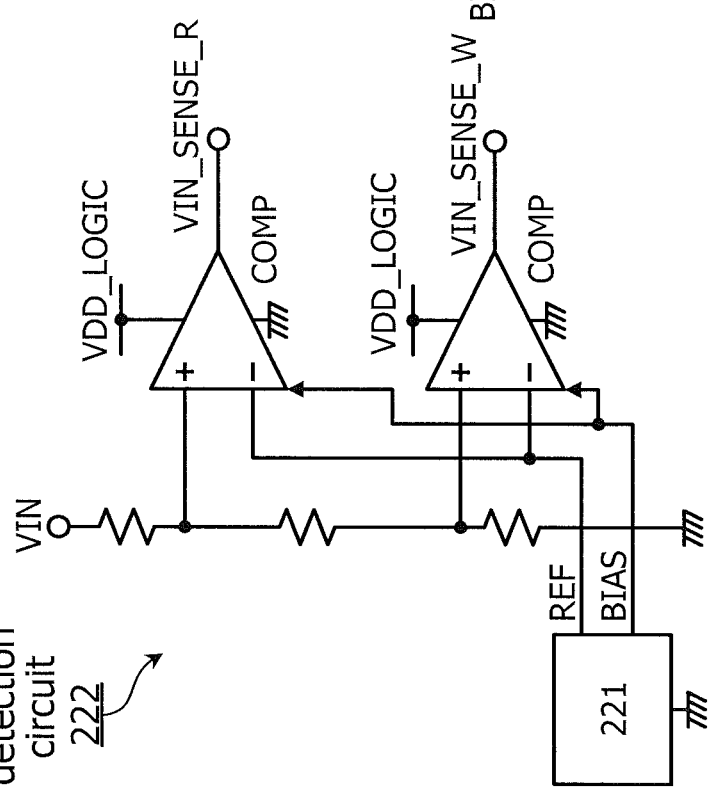
FIG. 12A
Voltage detection circuit 222
FIG. 12B

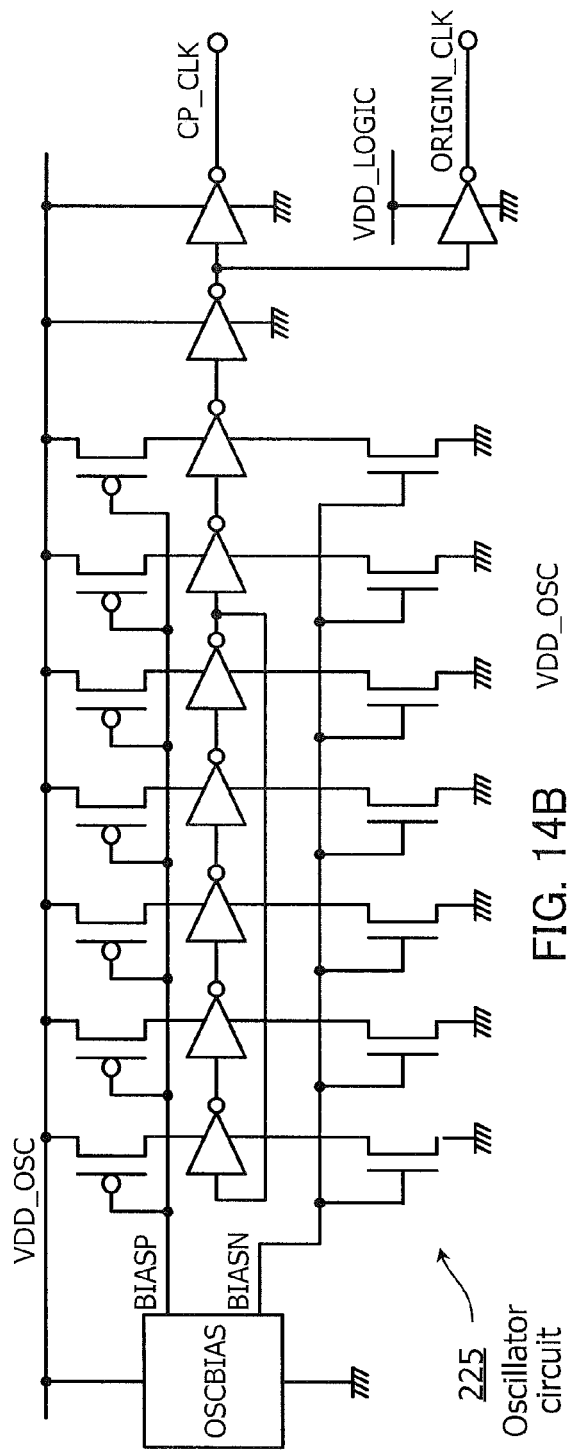
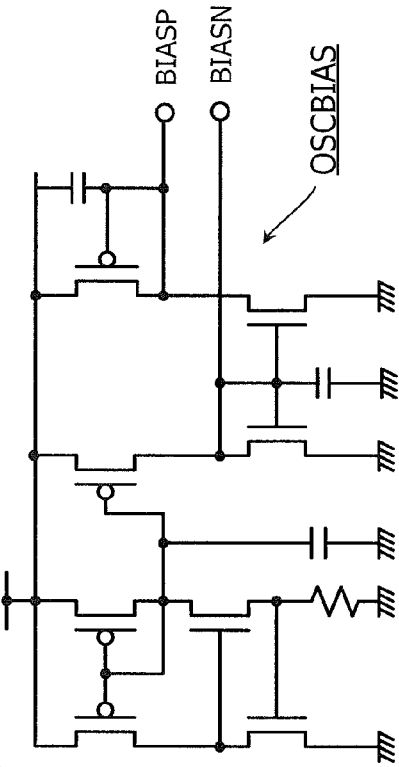
FIG. 14A
FIG. 14B

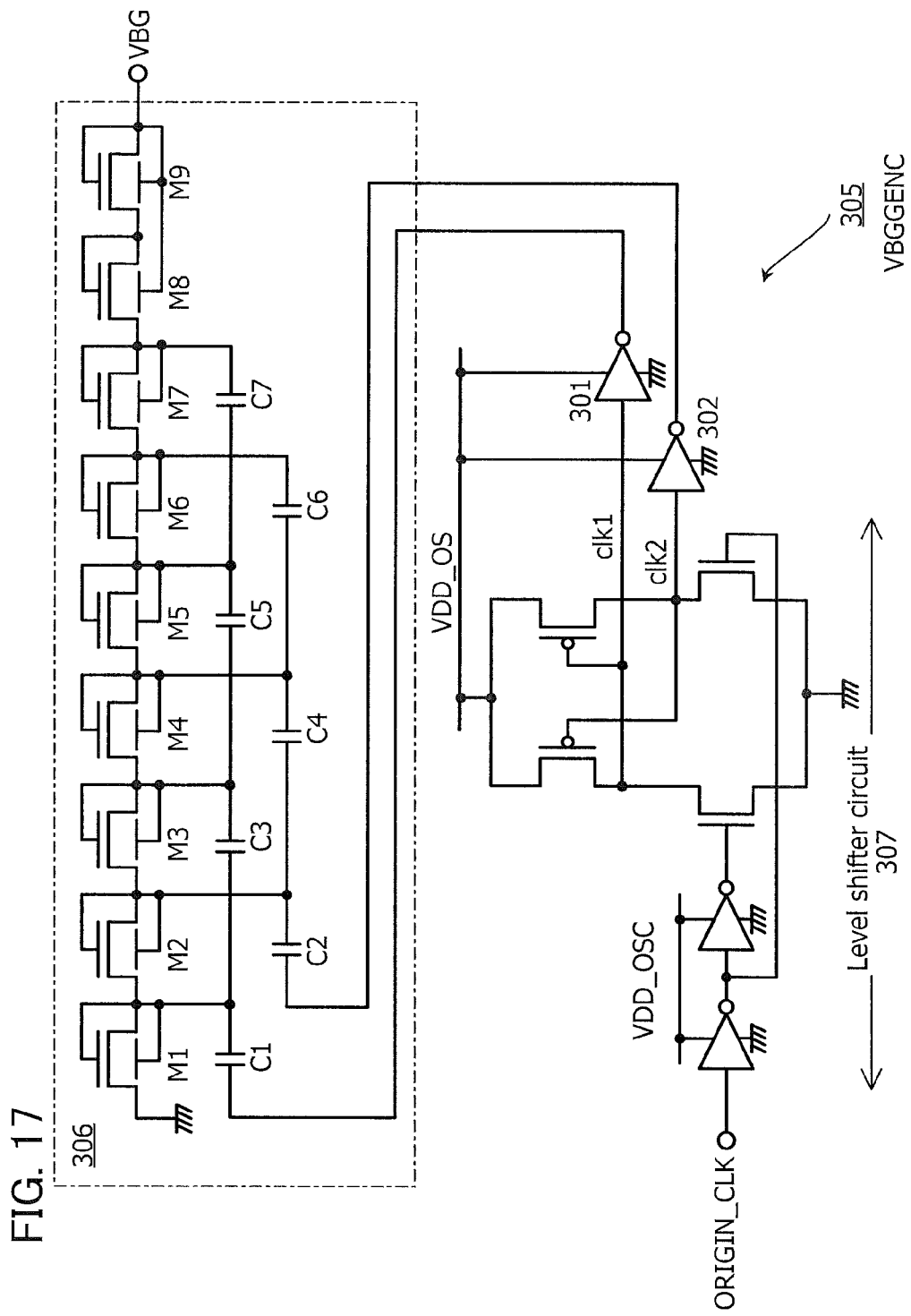

VDD_OS > VDD_MEM > VDD_LOGIC > GND > VBG

VDD_OS > VDD_MEM > VDD_LOGIC > GND > VBG

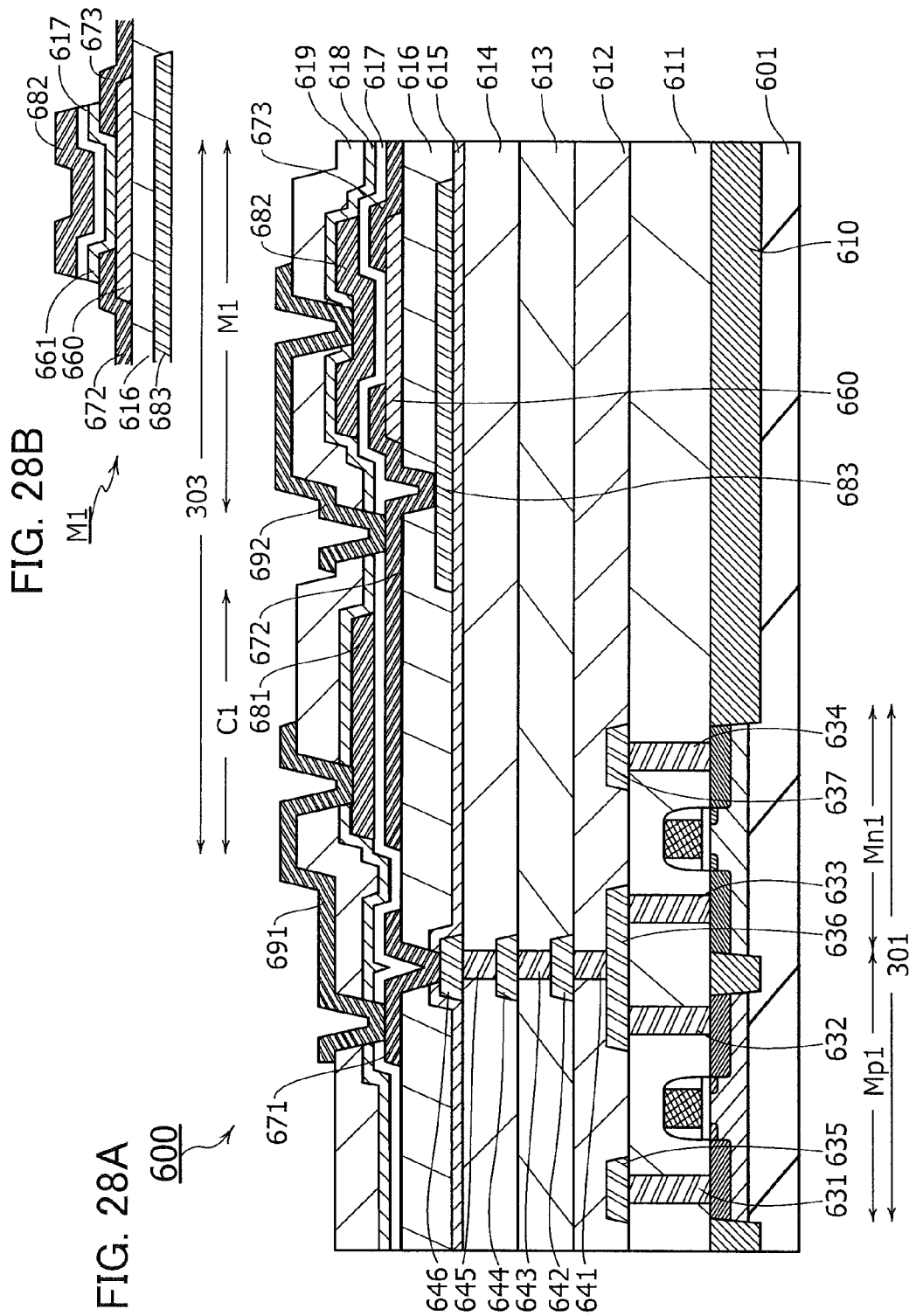

<OS>

Tmp= −25 °C, 50 °C, 150°C

L=0.45μm, W=10μm, $T_{OX}$=20nm

<single crystal Si>

Tmp= −25 °C, 50 °C, 150°C

L=0.35μm, W=10μm, $T_{OX}$=20nm

Antenna 750

CAAC-OS memory portion 740
Analog portion 720
Logic portion 730

CHARGE PUMP CIRCUIT AND SEMICONDUCTOR DEVICE INCLUDING THE SAME

CROSS-REFERENCE TO RELATED APPLICATIONS

This application is a continuation of U.S. application Ser. No. 14/457,525, filed Aug. 12, 2014, now pending, which claims the benefit of foreign priority applications filed in Japan as Serial No. 2013-171308 on Aug. 21, 2013 and Serial No. 2014-013156 on Jan. 28, 2014, all of which are incorporated by reference.

BACKGROUND OF THE INVENTION

1. Field of the Invention

One embodiment of the present invention relates to an object, a method, or a manufacturing method. In addition, one embodiment of the present invention relates to a process, a machine, manufacture, or a composition of matter. One embodiment of the present invention relates to a semiconductor device, a driving method thereof, or a manufacturing method thereof. In particular, one embodiment of the present invention relates to a charge pump circuit and a semiconductor device including the charge pump circuit.

Note that in this specification, a semiconductor device means a device that utilizes semiconductor characteristics and refers to a circuit having a semiconductor element (e.g., a transistor or a diode) and a device having such a circuit. The semiconductor device also means any device that can function by utilizing semiconductor characteristics. For example, an integrated circuit, and a chip including an integrated circuit are all semiconductor devices. Moreover, a display device, a light-emitting device, a lighting device, an electronic device, and the like include a semiconductor device in some cases.

2. Description of the Related Art

As a voltage generation circuit, a charge pump circuit including capacitors and diode-connected transistors is known (e.g., Patent Document 1). A charge pump circuit is a circuit that can generate a voltage higher or lower than an input voltage without using a coil. Therefore, a charge pump circuit can be easily integrated on one IC chip together with a processor, a memory, and the like.

A transistor in which a channel is formed in an oxide semiconductor (OS) layer such as an In—Ga—Zn oxide (In—Ga—Zn—O) layer (such a transistor is referred to as an OS transistor below) is known. The OS transistor is known to have an extremely low off-state current because an oxide semiconductor has a wider band gap than silicon. A variety of semiconductor devices that utilize OS-transistor's low off-state current characteristics have been proposed. For example, Patent Document 2 discloses a charge pump circuit. In addition, Non-Patent Document 1 discloses a nonvolatile memory. Moreover, Non-Patent Document 2 discloses a central processing unit (CPU).

REFERENCE

Patent Document

[Patent Document 1] Japanese Published Patent Application No. 2000-270541
[Patent Document 2] Japanese Published Patent Application No. 2011-171700

Non-Patent Document

[Non-Patent Document 1] S. Nagatsuka et. al., "A 3 bit/cell Nonvolatile Memory with Crystalline In—Ga—Zn—O TFT", Tech. Dig. International Memory Workshop (IMW), 2013, pp. 188-199.
[Non-Patent Document 2] H. Kobayashi et al., "Processor with 4.9-μs Break-even Time in Power Gating Using Crystalline In—Ga—Zn—Oxide Transistor," COOL Chips XVI, 2013, Session VI-1.

SUMMARY OF THE INVENTION

Low power consumption is required for semiconductor devices such as processors. To meet this requirement, a high-efficiency charge pump circuit with little energy loss is desired. Furthermore, for a reduction in power consumption of a semiconductor device, power gating, clock gating, or the like has been employed to stop operation of a circuit that need not operate right now. However, even in an operation stop period of the circuit, if the need for supplying voltage to the circuit from a charge pump circuit arises, the charge pump circuit has to operate.

When the threshold voltage (also referred to as a threshold or Vth) of an OS transistor is high, low off-state current characteristics thereof can be utilized more effectively. For example, the memory disclosed in Non-Patent Document 1 retains data by turning off an OS transistor. If Vth of the OS transistor is low, charges may leak out through a source and a drain of the OS transistor in a charge holding period, causing loss of data retained in a memory cell. In contrast, with high Vth of the OS transistor, retention characteristics of the memory cell can be increased.

Currently, the conductivity type of an oxide semiconductor is hard to control by addition of a dopant. In other words, the threshold voltage adjustment of an OS transistor by addition of a dopant to a channel formation region has not been achieved yet. It is found from our research that Vth of an OS transistor is more likely to vary depending on manufacturing conditions than Vth of a Si transistor.

An OS transistor can be used at a higher temperature than a Si transistor. FIGS. 30A and 30B show the measurement results of the temperature characteristics of fabricated transistors. FIG. 30A shows the measurement results of OS transistors and FIG. 30B shows the measurement results of Si transistors. At temperatures (Tmp) of −25° C., 50° C., and 150° C., gate voltage $V_G$-drain current $I_D$ characteristics and gate voltage $V_G$-electric field effect mobility $\mu_{FE}$ characteristics were measured. The drain voltage $V_D$ at the measurement was 1 V.

The OS transistors have a channel length L of 0.45 μm, a channel width W of 10 μm, and an equivalent oxide thickness Tox of a gate insulating layer of 20 nm. The Si transistors have an L of 0.35 μm, a W of 10 μm, and a Tox of 20 nm.

An oxide semiconductor layer in the OS transistors was made of an In—Ga—Zn-based oxide. The Si transistors were formed using an SOI single crystal silicon wafer.

FIGS. 30A and 30B show that the OS transistor has low temperature dependence of gate voltage at which a drain current starts flowing, which is substantially the same as that of the single crystal Si transistor. The off-state current of the OS transistor is lower than or equal to the lower measurement limit independently of temperature. On the contrary, the off-state current of the single crystal Si transistor largely depends on the temperature. According to the measurement results of FIG. 30B, at 150° C., the off-state current of the single crystal Si transistor rises, and a sufficiently high current on/off ratio cannot be obtained.

In view of the above, an object of one embodiment of the present invention is to provide a novel charge pump circuit. An object of one embodiment of the present invention is to provide a charge pump circuit with high voltage conversion efficiency. An object of one embodiment of the present invention is to provide a charge pump circuit capable of being used in high-temperature environment. An object of one embodiment of the present invention is to provide a charge pump circuit with a high degree of freedom of a manufacturing method of an OS transistor.

An object of one embodiment of the present invention is to provide a novel semiconductor device. For example, an object of one embodiment of the present invention is to provide a semiconductor device with a high degree of freedom of a manufacturing method of an OS transistor. An object of one embodiment of the present invention is to provide a semiconductor device with low power consumption. An object of one embodiment of the present invention is to provide a semiconductor device capable of operation after exposure to high-temperature environment. An object of one embodiment of the present invention is to provide a novel semiconductor device including an OS transistor.

Note that the description of a plurality of objects does not disturb the existence of each object. One embodiment of the present invention does not necessarily achieve all the objects. Objects other than those listed above are apparent from the description of the specification, drawings, and claims, and also such objects could be an object of one embodiment of the present invention.

One embodiment of the present invention is a charge pump circuit generating a second voltage from a first voltage, which includes a first input terminal to which the first voltage is input, a first output terminal that outputs the second voltage, and k (k is an integer of 2 or more) stages of serially connected fundamental circuits between the first input terminal and the first output terminal. Each of the fundamental circuits includes a second input terminal, a second output terminal connected to the second input terminal of the fundamental circuit in the next stage, a diode that is a transistor whose gate and drain are connected to each other, and a capacitor including a first terminal and a second terminal. An anode of the diode is connected to the second output terminal and a cathode of the diode is connected to the second input terminal. The first terminal of the capacitor is connected to the second output terminal. In the first to (k−1)-th stages of fundamental circuits, a clock signal input to the second terminal of the capacitor in one of the first to (k−1)-th stages and a clock signal input to the second terminal of the capacitor in a stage adjacent to the stage have opposite phases. A third voltage is input to the second terminal of the capacitor of the fundamental circuit in the k-th stage. In at least one of the k stages of fundamental circuits, the transistor includes a back gate connected to any of the first input terminal, the first output terminal, or the drain of the transistor.

One embodiment of the present invention is a charge pump circuit generating a second voltage from a first voltage, which includes a first input terminal to which the first voltage is input, a first output terminal that outputs the second voltage, and k (k is an integer of 2 or more) stages of serially connected fundamental circuits between the first input terminal and the first output terminal. Each of the fundamental circuits includes a second input terminal, a second output terminal connected to the second input terminal of the fundamental circuit in the next stage, a diode that is a transistor whose gate and drain are connected to each other, and a capacitor comprising a first terminal and a second terminal. An anode of the diode is connected to the second input terminal and a cathode of the diode is connected to the second output terminal. The first terminal of the capacitor is connected to the second output terminal. In the first to (k−1)-th stages of fundamental circuits, a clock signal input to the second terminal of the capacitor in one of the first to (k−1)-th stages and a clock signal input to the second terminal of the capacitor in a stage adjacent to the stage have opposite phases. A third voltage is input to the second terminal of the capacitor of the fundamental circuit in the k-th stage. In at least one of the k stages of fundamental circuits, the transistor includes a back gate connected to any of the first input terminal, the first output terminal, or the drain of the transistor.

In the above embodiments, the transistor can be a transistor in which a channel is formed in an oxide semiconductor.

Another embodiment of the present invention is a semiconductor device including the charge pump circuit of any of these embodiments.

For example, in this specification and the like, an explicit description "X and Y are connected" means that X and Y are electrically connected, X and Y are functionally connected, and X and Y are directly connected. Accordingly, without limiting to a predetermined connection relation, for example, a connection relation shown in drawings and texts, another element may be interposed between elements having the connection relation shown in the drawings and the texts.

Here, X and Y each denote an object (e.g., a device, an element, a circuit, a wiring, an electrode, a terminal, a conductive film, a layer, or the like).

For example, in the case where X and Y are electrically connected, one or more elements that enable electrical connection between X and Y (e.g., a switch, a transistor, a capacitor, an inductor, a resistor, a diode, a display element, a light-emitting element, or a load) can be connected between X and Y. A switch is controlled to be turned on or off. That is, a switch is conducting or not conducting (is turned on or off) to determine whether current flows therethrough or not. Alternatively, the switch has a function of selecting and changing a current path.

For example, in the case where X and Y are functionally connected, one or more circuits that enable functional connection between X and Y (e.g., a logic circuit such as an inverter, a NAND circuit, or a NOR circuit; a signal converter circuit such as a DA converter circuit, an AD converter circuit, or a gamma correction circuit; a potential level converter circuit such as a power supply circuit (e.g., a step-up converter, or a step-down converter) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, or a buffer circuit; a signal generation circuit; a memory circuit; and/or a control circuit) can be connected between X and Y. Note that for example, in the case where a signal output from X is transmitted to Y even when another circuit is interposed between X and Y, X and Y are functionally connected.

Note that an explicit description "X and Y are connected" means that X and Y are electrically connected (i.e., the case where X and Y are connected with another element or another circuit provided therebetween), X and Y are functionally connected (i.e., the case where X and Y are functionally connected with another circuit provided therebetween), and X and Y are directly connected (i.e., the case where X and Y are connected without another element or another circuit provided therebetween). That is, the explicit expression "X and Y are electrically connected" is the same as the explicit simple expression "X and Y are connected".

Note that, for example, the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y, can be expressed by using any of the following expressions.

The expressions include, for example, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order". When the connection order in a circuit structure is defined by an expression similar to the above examples, a source (or a first terminal or the like) and a drain (or a second terminal or the like) of a transistor can be distinguished from each other to specify the technical scope. Note that these expressions are examples and there is no limitation on the expressions. Here, X, Y, Z1, Z2 each denote an object (e.g., a device, an element, a circuit, a wiring, an electrode, a terminal, a conductive film, a layer, or the like).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

With one embodiment of the present invention, a novel semiconductor device can be provided. With one embodiment of the present invention, a charge pump circuit with high voltage conversion efficiency can be provided. With one embodiment of the present invention, a charge pump circuit capable of being used in high-temperature environment can be provided. With one embodiment of the present invention, a charge pump circuit with a high degree of freedom of a manufacturing method of an OS transistor can be provided. With one embodiment of the present invention, a semiconductor device capable of operation after exposure to high-temperature environment can be provided. Furthermore, a novel semiconductor device including an OS transistor can be provided.

Note that the description of these effects does not disturb the existence of other effects. In one embodiment of the present invention, there is no need to achieve all the effects described above. In one embodiment of the present invention, an object other than the above objects, an effect other than the above effects, and a novel feature will be apparent from the description of the specification and the drawings. Thus, other effects can be derived from the specification, the drawings, the claims, and the like.

BRIEF DESCRIPTION OF THE DRAWINGS

In the accompanying drawings:

FIG. 9A is a block diagram illustrating a structure example of a power supply circuit, FIG. 9B is a circuit diagram of a voltage generation circuit (PSBIAS) in the power supply circuit, and FIG. 9C is a circuit diagram of a voltage generation circuit (LDO) in the power supply circuit;

FIG. 12A is a circuit diagram illustrating a structure example of a voltage detector circuit, and FIG. 12B is a circuit diagram illustrating a structure example of a comparator (COMP);

FIG. 14A is a circuit diagram illustrating a structure example of an oscillator circuit, and FIG. 14B is a circuit diagram illustrating a structure example of a voltage generation circuit (OSCBIAS);

FIG. 17 is a circuit diagram illustrating a structure example of a voltage generation circuit (VBGGENC);

FIG. 28A is a cross-sectional view illustrating a structure example of a die of an RFID tag, and FIG. 28B is a cross-sectional view illustrating a structure example of an OS transistor;

FIG. 38B: an EEPROM tag).

DETAILED DESCRIPTION OF THE INVENTION

Figure 1A:
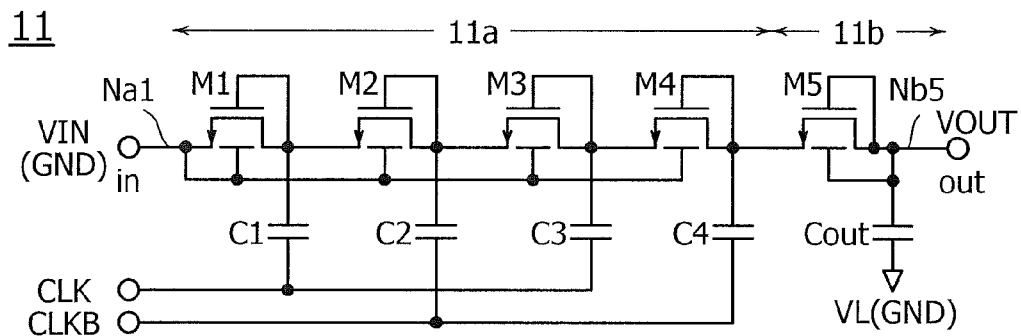
FIGS. 1A to 1C are circuit diagrams each illustrating a structure example of a step-down charge pump circuit.

Hereinafter, embodiments of the present invention will be described in detail with reference to the accompanying drawings. It will be readily appreciated by those skilled in the art that modes and details of the present invention can be changed in various ways without departing from the spirit and scope of the present invention. Therefore, the present invention should not be construed as being limited to the description of the embodiments below.

In the drawings used for the description of embodiments of the present invention, the same portions or portions having a similar function are denoted by the same reference numerals, and the repeated description thereof is omitted in some cases.

(Embodiment 1)

In this embodiment, a charge pump circuit, which is an example of a semiconductor device, will be described.

A charge pump circuit includes a plurality of serial-connected stages of fundamental circuits each including a diode and a capacitor. In the case where the charge pump circuit is of a step-down type, an input terminal and an output terminal of each fundamental circuit are a cathode and an anode, respectively, of the diode. Accordingly, a plurality of diodes are serially connected so that a forward current flows from a voltage output terminal to a voltage input terminal of the charge pump circuit. In contrast, in the case where the charge pump circuit is of a step-up type, a plurality of diodes are serially connected so that a forward current flows from the voltage input terminal to the voltage output terminal.

As the diodes, diode-connected transistors in which a gate and a drain are connected to each other are used.

In both the step-down and step-up charge pump circuits, one terminal of each capacitor is connected to an output terminal of the fundamental circuit. Here, one terminal that is connected to the output terminal of the fundamental circuit, of two terminals of each capacitor is referred to as a first terminal, and the other terminal is referred to as a second terminal. In the following description, the charge pump circuit includes k (k is an integer of two or more) stages of fundamental circuits.

The input terminals of k stages of fundamental circuits are each connected to the output terminals in their previous stages. The fundamental circuits in the first to (k−1)-th stages function as a voltage generation portion. The fundamental circuit in the last (k-th) stage functions as an output portion. The voltage generation portion has a function of generating a voltage higher or lower than an input voltage. The output portion has a function of holding and outputting the voltage generated by the voltage generation portion.

In the voltage generation portion, a clock signal is input to the second terminals of the capacitors in the odd-numbered stages, and an inverted clock signal whose phase is opposite to the phase of the clock signal is input to the second terminals in the even-numbered stages. The clock signal or the inverted clock signal is input to the output terminals of the fundamental circuits through the capacitors.

A constant voltage is applied to the second terminal of the capacitor in the fundamental circuit in the last (k-th) stage. For example, a ground potential, a low power supply voltage, or the like is applied to this second terminal.

In general, the value of potential or voltage is a relative value. Therefore, the value of the ground potential is not necessarily 0 V.

Depending on the voltage level of the clock signal, the transistors in the odd-numbered stages and the transistors in the even-numbered stages alternately turned on or off in the voltage generation portion, whereby the capacitors in the corresponding stages are charged or discharged. Thus, the voltage of the output terminal of the fundamental circuit becomes lower or higher in the stage closer to the last stage. The voltage generated by the voltage generation portion is held in the capacitor of the fundamental circuit in the last (k-th) stage. After a certain period of time from the supply of the clock signal, the voltage of the output terminal of the output portion becomes constant, and this voltage is output as an output voltage from the charge pump circuit.

In this embodiment, the voltage of a back channel of at least one transistor of the k transistors included in the charge pump circuit is controlled to increase performance of the charge pump circuit. Specifically, a back gate is provided in the transistor, and a negative bias voltage or a positive bias voltage is applied thereto. The back gate is connected to any node (wiring, electrode, or terminal) of the charge pump circuit. With this structure, the voltage of the back channel of the transistor can be controlled without increasing the circuit scale or without using another voltage generation circuit.

In the case of providing a back gate in the transistor of the fundamental circuit, the back gate is preferably connected to a node to which a voltage that is the same level as, higher than, or lower than that of a source of the transistor is applied.

More specific structure examples of a charge pump circuit will be described with reference to drawings. Here, the number of stages of fundamental circuits in the charge pump circuit is five as an example. In addition, the transistors are n-channel transistors as an example. Some structure examples are described below, and of course, the structure examples can be combined with each other as appropriate.

<<Step-Down Charge Pump Circuit>>

Structure examples of the step-down charge pump circuit will be described below. FIGS. 1A to 1C and FIGS. 2A to 2D are circuit diagrams each illustrating a structure example of a Dickson charge pump circuit. FIGS. 3A to 3C are circuit diagrams each illustrating a structure example of a Cockcroft-Walton charge pump circuit.

<Structure Example 1>

As illustrated in FIG. 1A, a charge pump circuit 11 includes five transistors M1 to M5 and five capacitors C1 to C4 and Cout. A voltage generation portion 11a includes the first to fourth stages of fundamental circuits (M1 to M4, C1 to C4). An output portion 11b includes the fifth stage of fundamental circuit (M5, Cout). Here, the transistors M1 to M5 are n-channel transistors.

The transistors M1 to M5 are serially connected between an input terminal in and an output terminal out, and each has a structure in which a gate and a drain are connected to each other. To the drains of the transistors M1 to M5, the first terminals of the corresponding capacitors C1 to C4 and Cout are connected.

In the voltage generation portion 11a, a clock signal CLK is input to the second terminals of the capacitors C1 and C3 in the odd-numbered stages, and a clock signal CLKB is input to the second terminals of the capacitors C2 and C4 in the even-numbered stages. The clock signal CLKB is an inverted clock signal whose phase is opposite to the phase of the clock signal CLK. That is, in the voltage generation portion 11a, CLK is input to the output terminals of the fundamental circuits in the odd-numbered stages through the capacitors, and CLKB is input to the output terminals of the fundamental circuits in the even-numbered stages through the capacitors.

A constant voltage VL is applied to the second terminal of the capacitor Cout in the output portion 11b.

Note that in the following description, the "clock signal CLK" is abbreviated to a "signal CLK", "CLK", or the like in some cases. Furthermore, the same can apply to other signals, voltages, circuits, elements, wirings, and the like.

The charge pump circuit 11 has a function of generating a voltage VOUT by stepping down a voltage VIN input to the input terminal in and outputting the voltage VOUT. In order that the charge pump circuit 11 functions as a negative voltage generation circuit, for example, VIN and VL may be set to be a ground potential (GND) or 0 V, for example. In this case, a negative voltage is generated only by the supply of the clock signals CLK and CLKB in the charge pump circuit 11.

(Back Gate)

When Vth of the transistors increases, the voltage conversion efficiency (step-down rate, step-up rate) of the charge pump circuit decreases. In addition, an increase in the leakage current of the transistors means the loss of charges held in the capacitors, which decreases the efficiency of the charge pump circuit, causing a slow start-up of the charge pump circuit. In the charge pump circuit of this embodiment, the transistors M1 to M5 are each provided with a back gate, and voltage is applied to the back gates to adjust Vth. These back gates are connected to any node in the charge pump circuit 11. In the charge pump circuit 11, the back gates of the transistors M1 to M4 are connected to a node Na1, and the back gate of the transistor M5 is connected to a node Nb5.

The node Na1 is the input terminal of the fundamental circuit in the first stage and is also the input terminal in. In addition, the node Nb5 is the output terminal of the fundamental circuit in the fifth stage and is also the output terminal out here.

The back gates of the transistors M1 to M4 are connected to the node Na1 where the voltage is the highest in the charge pump circuit 11. That is, to each back gate of the transistors M1 to M4, a voltage higher than that of the source (a positive bias voltage) is applied. This can lower Vth of the transistors M1 to M4 as compared with the case of not applying a voltage to the back gates, increasing current driving characteristics of the transistors M1 to M4.

Because the conversion efficiency (step-down rate) of the voltage generation portion 11a is increased, the number of stages in the voltage generation portion 11a can be reduced. Accordingly, the charge pump circuit 11 can be reduced in size, leading to lower power consumption. In addition, fast start-up of the charge pump circuit 11 can be achieved.

The back gate of the transistor M5 is connected to the node Nb5 where the voltage is the lowest in the charge pump circuit 11. To the back gate of the transistor M5, a voltage lower than that of the gate, the source, or the drain of the transistor M5 is applied. That is, a negative bias voltage is applied to the back gate of the transistor M5, whereby Vth can be increased (shifted in the positive direction). With this structure, the transistor M5 can be definitely set in an off state when the transistor M5 should be in an off state, preventing the leakage of charges from the capacitor Cout.

Consequently, a variation in the voltage VOUT output from the output portion 11b can be prevented, increasing the efficiency of the charge pump circuit 11. Since the capacitance of the capacitor Cout can be decreased, the size of the charge pump circuit 11 can be reduced.

As described above, in the charge pump circuit 11, the voltage generation portion 11a puts importance on the increase in current driving characteristics of the transistors M1 to M4, and the output portion 11b puts importance on a reduction of off-state leakage current of the transistor M5.

<Structure Example 2>

Figure 1B:
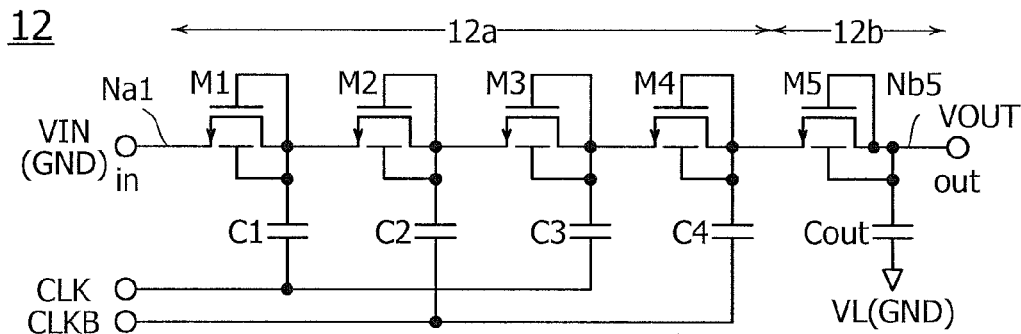

A charge pump circuit 12 in FIG. 1B includes a voltage generation portion 12a having a structure different from that in the charge pump circuit 11. An output portion 12b has the same structure as the output portion 11b.

In the voltage generation portion 12a, the back gate of the transistor in each fundamental circuit is connected to a node where the voltage is the lowest in the fundamental circuit. The back gates of the transistors M1 to M4 are connected to the output terminals of the respective fundamental circuits. That is, the transistors M1 to M4 each have a structure in which the gate and the back gate are connected to the drain.

Since the same voltage is applied to the gate and the back gate of each of the transistors M1 to M4, current driving characteristics of the transistors M1 to M4 in an on state can be increased compared to the case of not applying a voltage to the back gate. Furthermore, since a voltage lower than that of the source (a negative bias voltage) is applied to the back gate, Vth of the transistors M1 to M4 can be increased (shifted in the positive direction). Therefore, reverse current of the diode-connected transistors M1 to M4 can be reduced, preventing leakage of charges from the capacitors C1 to C4. This allows the capacitances of the capacitors C1 to C4 to be decreased, so that the size of the charge pump circuit 12 can be reduced.

Thus, the voltage generation portion 12a has both effects of the increase in current driving characteristics and the reduction in leakage current of the transistors M1 to M4.
<Structure Example 3>

Figure 1C:
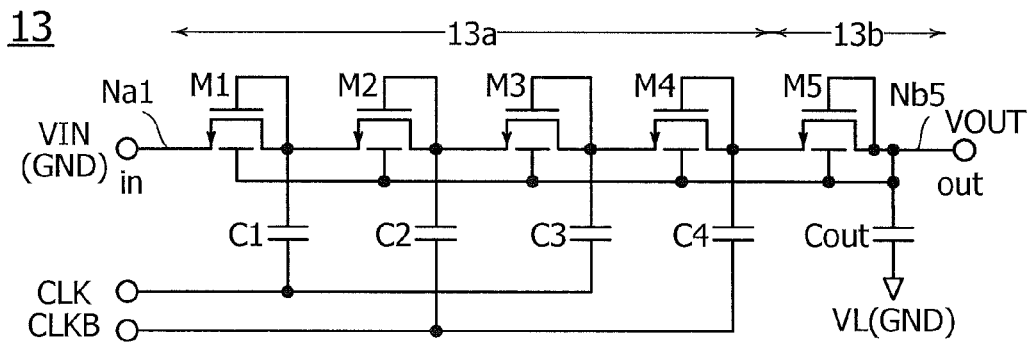

A charge pump circuit 13 in FIG. 1C includes a voltage generation portion 13a having a different structure from the voltage generation portion 12a and also includes an output portion 13b having the same structure as the output portion 12b.

The voltage generation portion 13a puts importance on a reduction of leakage current through the transistors M1 to M4 more than in the voltage generation portion 12a. The back gates of the transistors M1 to M4 are connected to the node Nb5 where the voltage is the lowest in the charge pump circuit 13. Since a voltage lower than those of the gates, sources, and drains is applied to the back gates of the transistors M1 to M4, Vth of the transistors M1 to M4 can be shifted in the positive voltage direction (in the positive direction) more than in the voltage generation portion 12a.
<Structure Example 4>

In each of the charge pump circuits 11 to 13 in FIGS. 1A to 1C, every fundamental circuit in the voltage generation portion has the same connection structure; however, some of the fundamental circuits may have a different connection structure. Such structure examples are illustrated in FIGS. 2A to 2D.

Figure 2A:
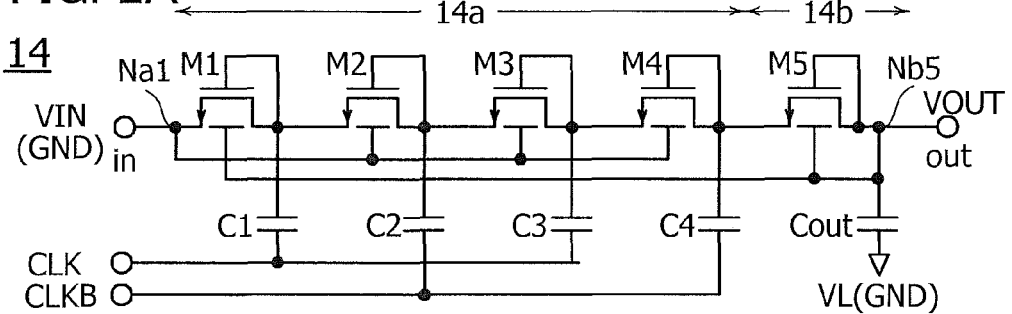
FIGS. 2A to 2D are circuit diagrams each illustrating a structure example of a step-down charge pump circuit.
Figure 3A:
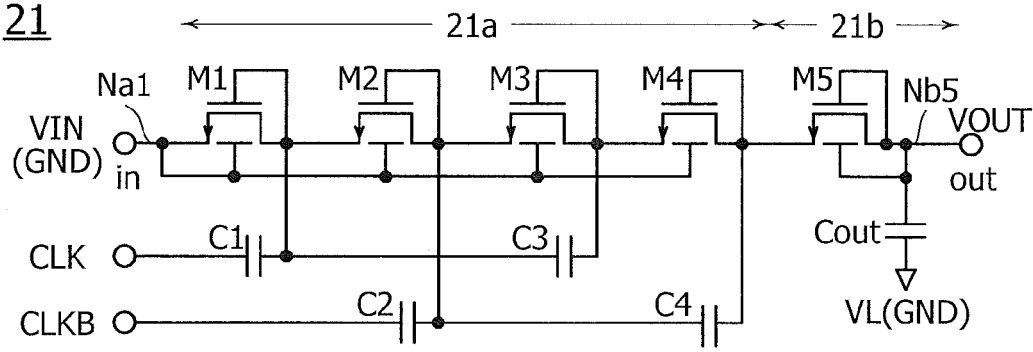
FIGS. 3A to 3C are circuit diagrams each illustrating a structure example of a step-down charge pump circuit.
Figure 3B:
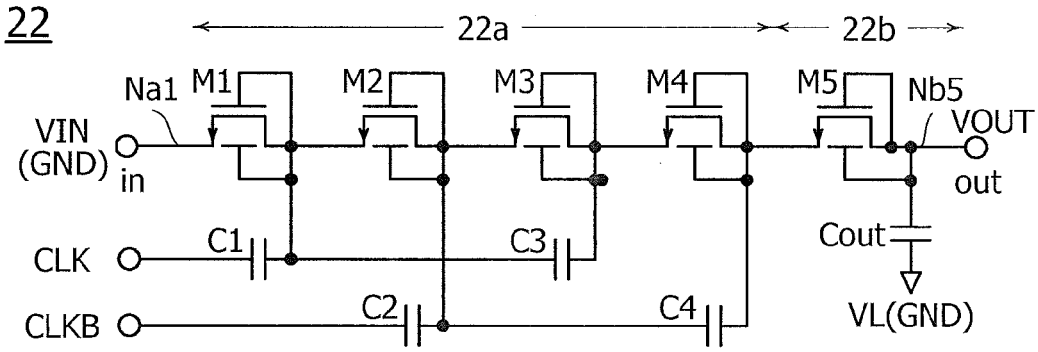
Figure 3C:
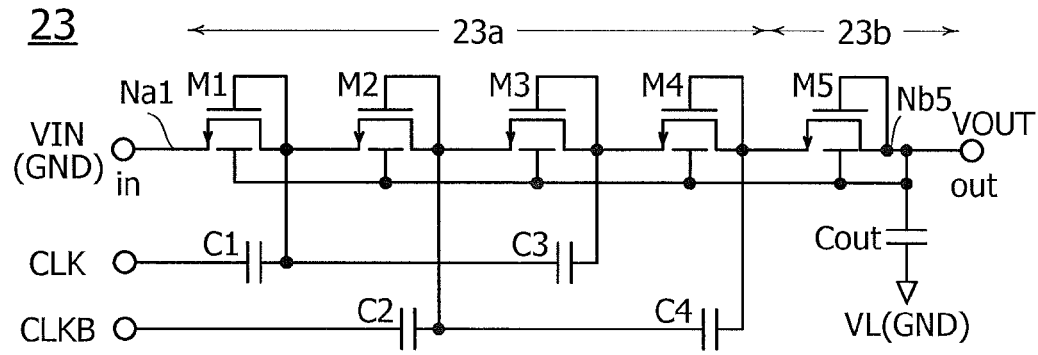

A charge pump circuit 14 in FIG. 2A is a modification example of the charge pump circuit 11. An output portion 14b has the same structure as the output portion 11b. A voltage generation portion 14a is different from the voltage generation portion 11a in that the back gate of the transistor M1 is connected to the node Nb5, which reduces leakage current from the fundamental circuit in the first stage of the voltage generation portion 14a. That is, the charge pump circuit 14 puts importance on prevention of a voltage variation in the fundamental circuits in the first and last stages and current driving characteristics in the fundamental circuits in the other stages.

Figure 2B:
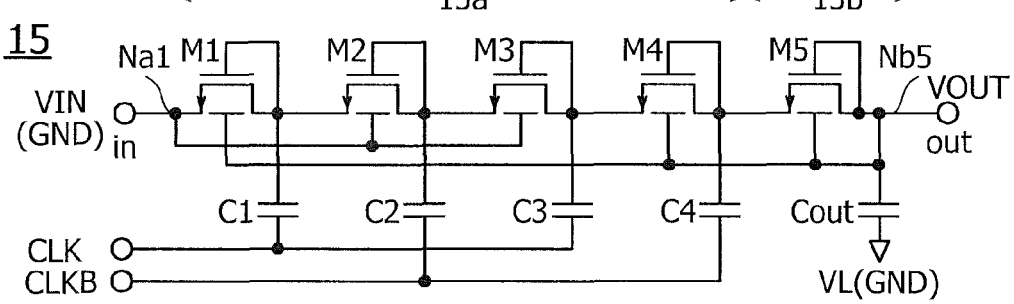

The back gate of the transistor of the fundamental circuit in the last stage (here, the fourth stage) in the voltage generation portion 14a may be connected to the node Nb5. Such a structure example is illustrated in FIG. 2B. In a voltage generation portion 15a of a charge pump circuit 15, the back gates of the transistors M1 and M4 are connected to the node Nb5, and the back gates of the transistors M2 and M3 are connected to the node Na1. An output portion 15b has the same structure as the output portion 14b.

Figure 2C:
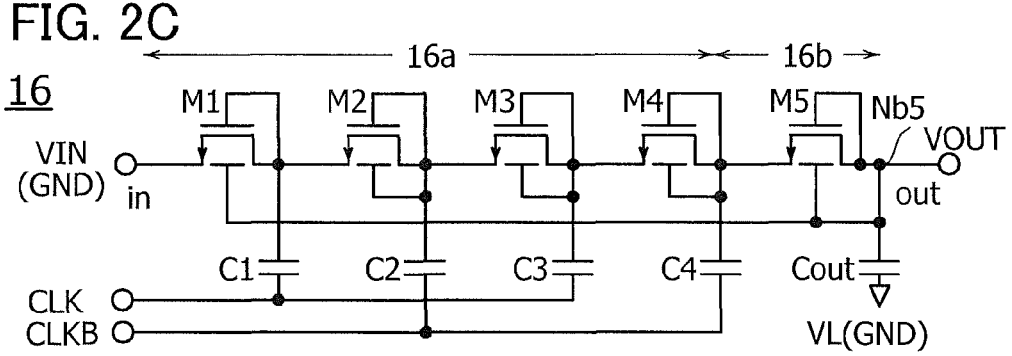

A charge pump circuit 16 illustrated in FIG. 2C is a modification example of the charge pump circuit 12. An output portion 16b has the same structure as the output portion 12b. The structure of a voltage generation portion 16a is partly different from the structure of the voltage generation portion 12a in that the back gate of the transistor M1 is connected to the node Nb5. The structure of the charge pump circuit 16 is more effective in preventing a voltage variation of the output terminal of the fundamental circuit in the first stage than the structure of the charge pump circuit 12.

Figure 2D:
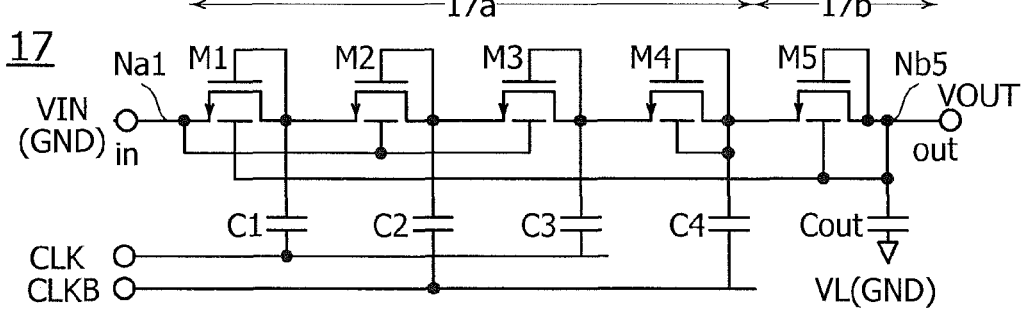

A charge pump circuit 17 illustrated in FIG. 2D is a modification example of the charge pump circuit 16. An output portion 17b has the same structure as the output portion 16b. The structure of the voltage generation portion 17a is partly different from the structure of the voltage generation portion 16a in that the back gates of the transistors M2 and M3 are connected to the node Na1.
<Structure Example 5>

The structure examples of the Dickson charge pump circuit are illustrated in FIGS. 1A to 1C and FIGS. 2A to 2D. By changing the connection of the capacitors C1 to C4, Cockcroft-Walton charge pump circuits can be formed. Such examples are illustrated in FIGS. 3A to 3C.

A charge pump circuit 21 illustrated in FIG. 3A is a Cockcroft-Walton charge pump circuit obtained by modifying the charge pump circuit 11. The charge pump circuit 21 includes a voltage generation portion 21a and an output portion 21b. The charge pump circuit 21 is the same as the charge pump circuit 11 in that CLK and CLKB are applied to the output terminals of the fundamental circuits in the first to fourth stages through the capacitors C1 to C4. The charge pump circuit 21 is different from the charge pump circuit 11 in that the capacitors C1 and C3 in the odd-numbered stages are serially connected and the capacitors C2 and C4 in the even-numbered stages are serially connected.

Circuit diagrams of Cockcroft-Walton charge pump circuits 22 and 23 obtained by modifying the Dickson charge pump circuits 12 and 13, respectively, are illustrated in FIGS. 3B and 3C. The charge pump circuit 22 includes a voltage generation portion 22a and an output portion 22b, and the charge pump circuit 23 includes a voltage generation portion 23a and an output portion 23b.

<<Step-Up Charge Pump Circuit>>

In a step-up charge pump circuit including n-channel transistors, an input terminal of each fundamental circuit is a drain of the n-channel transistor, and the output terminal is the source thereof. In a step-up charge pump circuit, at least one of the transistors M1 to M5 is provided with a back gate, and the back gate is connected to any of the drain, the node Na1, and the node Nb5, in a manner similar to that of the step-down charge pump circuits.

Structure examples of the step-up charge pump circuit will be described below with reference to FIGS. 4A to 4C.
<Structure Example 6>

Figure 4A:
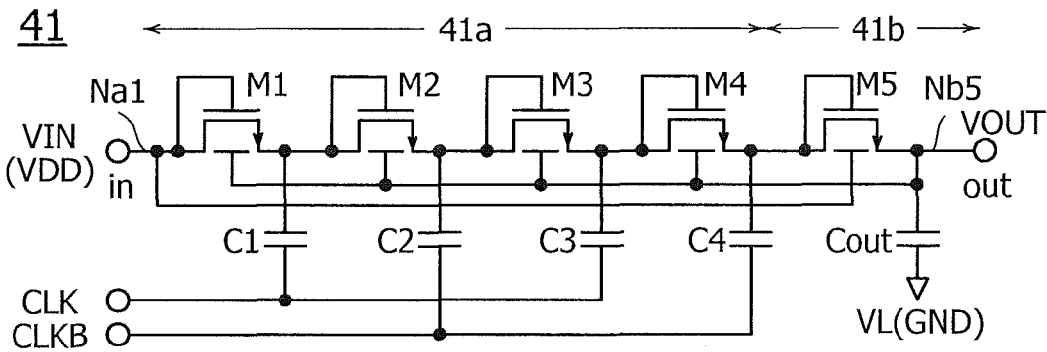
FIGS. 4A to 4C are circuit diagrams each illustrating a structure example of a step-up charge pump circuit.

A charge pump circuit 41 illustrated in FIG. 4A is of a step-up type obtained by modifying the charge pump circuit 11 illustrated in FIG. 1A. For example, the voltage VIN is set at the maximum voltage of the clock signal CLK, a high power supply voltage VDD, or the like. The voltage VOUT higher than VDD is output from the output terminal out.

The charge pump circuit 41 includes a voltage generation portion 41a and an output portion 41b. In the voltage generation portion 41a, the back gates of the transistors M1 to M4 are connected to the node Nb5 where the voltage is the highest in the charge pump circuit 41. The back gate of the transistor M5 is connected to the node Na1 where the voltage is the lowest in the charge pump circuit 41.
<Structure Example 7>

Figure 4B:
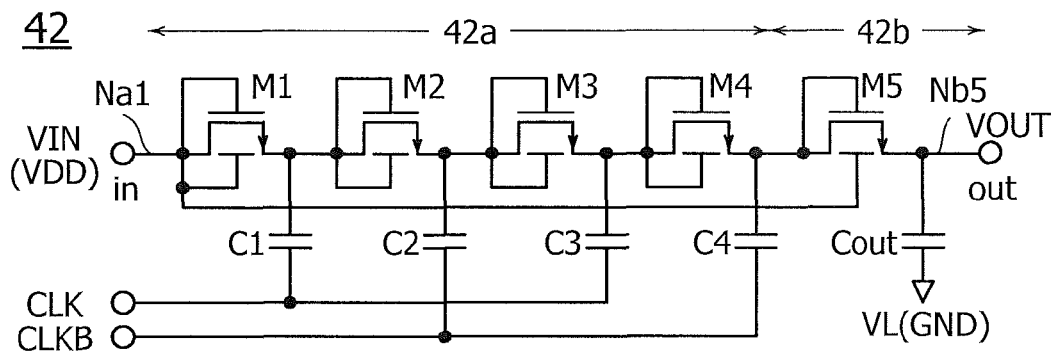

A charge pump circuit 42 illustrated in FIG. 4B is of a step-up type obtained by modifying the charge pump circuit 12 illustrated in FIG. 1B. The charge pump circuit 42 includes a voltage generation portion 42a and an output portion 42b. The output portion 42b has the same structure as the output portion 41b. In the voltage generation portion 42a, the back gates of the transistors M1 to M4 are connected to the input terminals of the respective fundamental circuits. That is, the gate and the back gate of each of the transistors M1 to M4 are connected to the drain thereof.

<Structure Example 8>

Figure 4C:
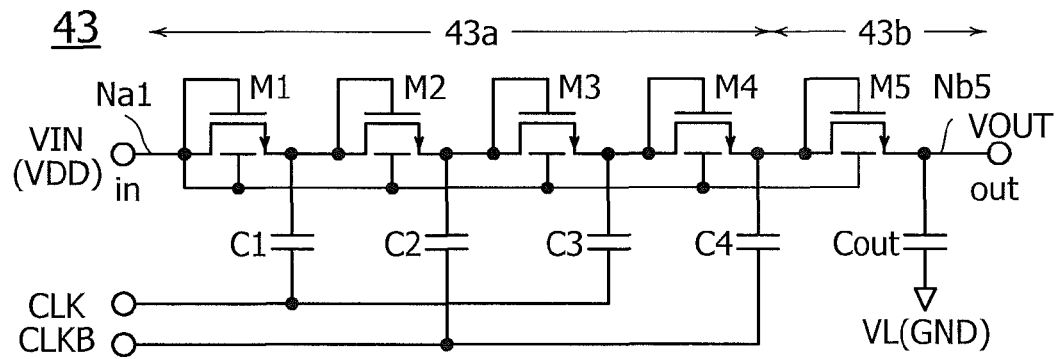

A charge pump circuit 43 illustrated in FIG. 4C is of a step-up type obtained by modifying the charge pump circuit 13 illustrated in FIG. 1C. The charge pump circuit 43 includes a voltage generation portion 43a and an output portion 43b. The output portion 43b has the same structure as the output portion 41b. In the voltage generation portion 43a, the back gates of the transistors M1 to M5 are connected to the node Na1 where the voltage is the lowest in the charge pump circuit 43.

<Structure Example 9>

Although a back gate is provided in all the transistors M1 to M5 constituting the voltage generation portion and the output portion in the charge pump circuit in FIGS. 1A to 1C, FIGS. 2A to 2D, FIGS. 3A to 3C, and FIGS. 4A to 4C, a structure in which a back gate is not provided in some of the transistors can be employed as well.

<Structure Example 10>

Moreover, although each back gate is connected to any of the node Na1, the node Nb5, and the drain of the corresponding transistor (the output terminal or input terminal of the fundamental circuit), the node to which the back gate is connected is not limited to these examples. For example, the back gate may be connected to the output terminal (or the input terminal) in previous or later stage of the fundamental circuit where the transistor is provided.

The voltage of the output terminal of the fundamental circuit becomes lower in the stage closer to the last stage in the step-down circuit and becomes higher in the stage closer to the last stage in the step-up circuit. By utilizing this feature, the back gates may be connected to a node from which a negative bias voltage can be applied to the back channels of the transistors or a node from which a positive bias voltage can be applied thereto.

<<Charge Pump Circuit Using p-Channel Transistors>>

FIGS. 1A to 1C, FIGS. 2A to 2D, FIGS. 3A to 3C, and FIGS. 4A to 4C illustrate the structure examples of the charge pump circuit including the n-channel transistors; however, charge pump circuits having similar functions can also be formed by using p-channel transistors. In a diode-connected p-channel transistor, the drain is a cathode and the source is an anode. To lower Vth of the p-channel transistor (to shift Vth in the negative direction), a negative bias voltage (a voltage lower than the source voltage) is supplied to the back gate. To increase Vth (to shift Vth in the positive direction), a positive bias voltage (a voltage higher than the source voltage) is supplied to the back gate. In each fundamental circuit, the node to which the back gate is connected may be determined in accordance with which characteristics to put importance on.

<Structure Example 11>

Structure examples of the charge pump circuit including p-channel transistors illustrated in FIGS. 5A and 5B will be described below. Although Dickson charge pump circuits are illustrated in FIGS. 5A and 5B as examples, they can be changed to Cockcroft-Walton charge pump circuits.

(Step-Down Type)

Figure 5A:
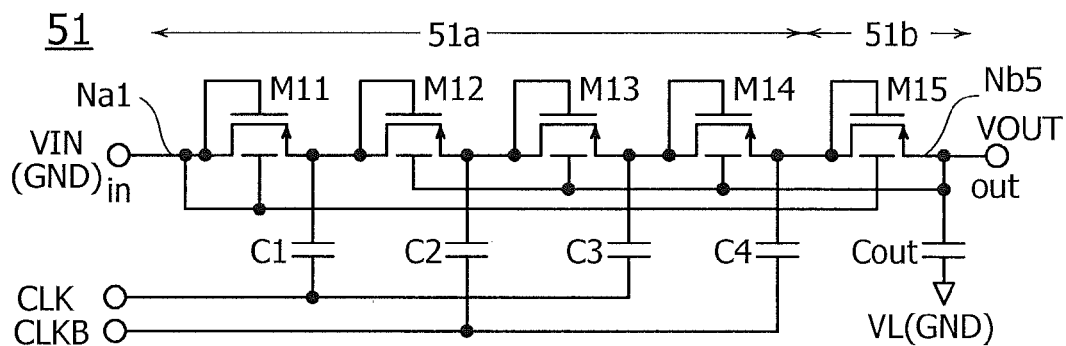
FIG. 5A is a circuit diagram illustrating a structure example of a step-down charge pump circuit using p-channel transistors.
Figure 5B:
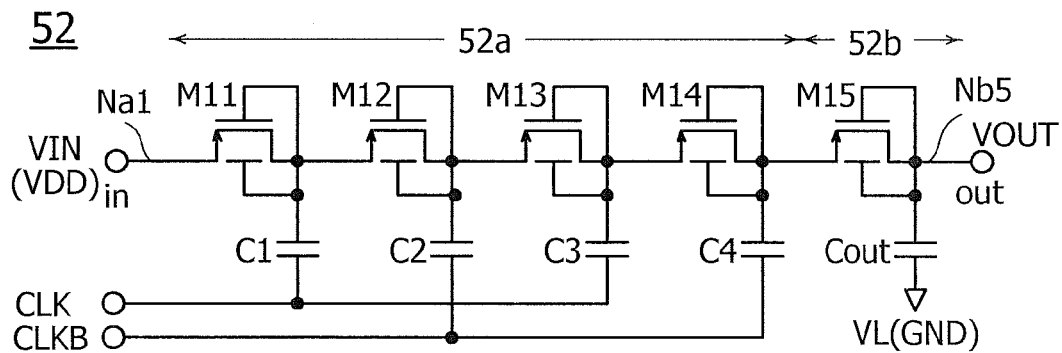
FIG. 5B is a circuit diagram illustrating a structure example of a step-up charge pump circuit using p-channel transistors.

A charge pump circuit 51 illustrated in FIG. 5A is a step-down charge pump circuit, which is an example where the transistors M1 to M5 of the charge pump circuit 14 (FIG. 2A) are replaced with p-channel transistors M11 to M15.

In a voltage generation portion 51a, a back gate of the transistor M11 is connected to the node Na1, and back gates of the transistors M12 to M14 are connected to the node Nb5. A back gate of the transistor M15 of the output portion 51b is connected to the node Na1.

The node Na1 is a node where the voltage is the highest in the charge pump circuit 51. Since a positive bias voltage can be applied to the back gates of the transistors M11 and M15, Vth of the transistors can be shifted in the positive direction.

The node Nb5 is a node where the voltage is the lowest in the charge pump circuit 51. Since a negative bias voltage can be applied to the back gates of the transistors M12 to M14, Vth of the transistors can be shifted in the negative direction. With this structure, the voltage generation portion 51a can both prevent current leakage through the fundamental circuit in the first stage and increase voltage conversion efficiency by lowering Vth in the second to fourth fundamental circuits.

(Step-Up Type)

A charge pump circuit 52 illustrated in FIG. 5B is a step-up charge pump circuit, which is an example in which the transistors M1 to M5 of the charge pump circuit 42 (FIG. 4B) are changed to p-channel transistors.

In a voltage generation portion 52a, the back gates of the transistors M11 to M14 are connected to the drains of the respective transistors. In an output portion 52b, the back gate of the transistor M15 is also connected to the drain of the transistor. In addition, the back gate of the transistor M15 is connected to the node Nb5.

<Structure Example 12>

Figure 6A:
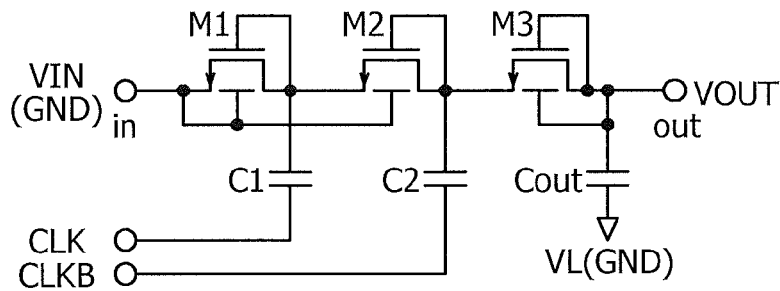
FIGS. 6A and 6B are circuit diagrams each illustrating a structure example of a step-down charge pump circuit.

In the structure examples 1 to 11, examples of the charge pump circuit including five stages of fundamental circuits have been described with reference to drawings. Needless to say, however, the number of stages of fundamental circuits is not limited to five in the charge pump circuit of one embodiment of the present invention and is any number of two or more. FIG. 6A illustrates a structure example of a charge pump circuit including three stages of fundamental circuits, and FIG. 6B illustrates a structure example of a charge pump circuit including nine stages of fundamental circuits.

A charge pump circuit 61 illustrated in FIG. 6A is a modification example of the charge pump circuit 11 (FIG. 1A). The charge pump circuit 61 is different from the charge pump circuit 11 in including two stages of fundamental circuits in the voltage generation portion. The structure of the output portion of the charge pump circuit 61 is the same as that of the charge pump circuit 11.

Figure 6B:
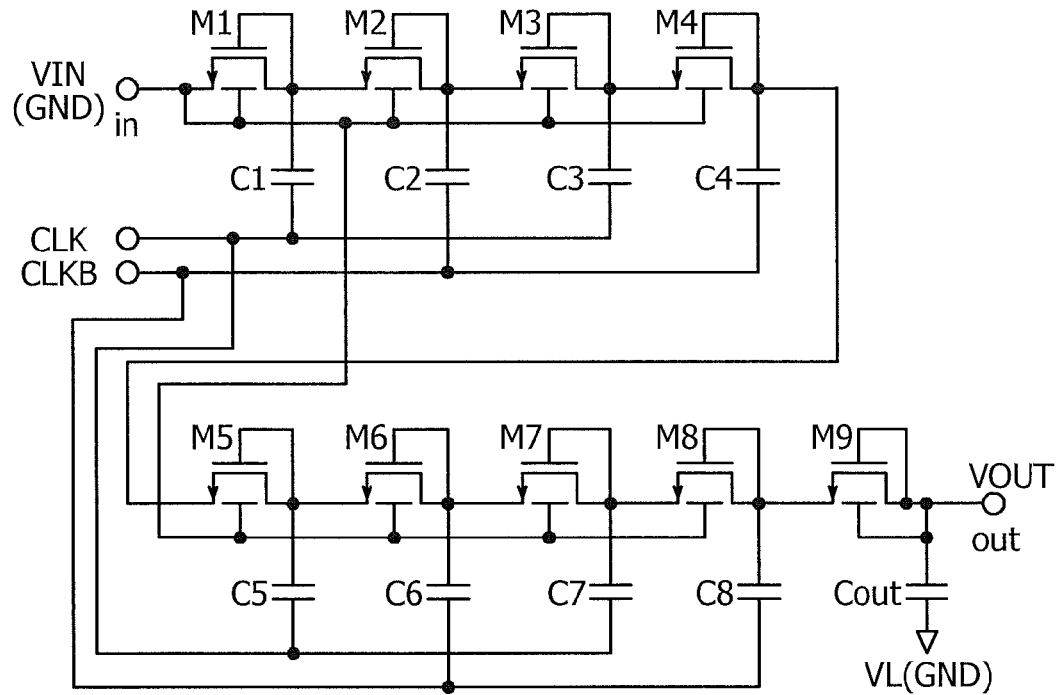

A charge pump circuit 62 illustrated in FIG. 6B is also a modification example of the charge pump circuit 11. The charge pump circuit 62 includes transistors M1 to M9 and capacitors C1 to C8 and Cout. The charge pump circuit 62 is different from the charge pump circuit 11 in including eight stages of fundamental circuits in the voltage generation portion. The structure of the output portion of the charge pump circuit 62 is the same as that of the charge pump circuit 11.

Needless to say, the number of stages of fundamental circuits included in the charge pump circuits other than the charge pump circuit 11 of the structure example 1 can also be changed similarly.

<<Transistor>>

The transistors included in the charge pump circuits are not particularly limited, and can be formed in a manner similar to that of a transistor included in a semiconductor device in which the charge pump circuit is used. For example, a transistor in which a channel is formed in a semiconductor including a Group 14 element, such as Si, SiC, or Ge, (e.g., a Si transistor) or an OS transistor can be used for the charge pump circuit. The crystallinity of a semiconductor (including an oxide semiconductor) that forms a channel may be single crystal, polycrystal, amorphous, or the like.

An oxide semiconductor of an OS transistor has a wider band gap (3.0 eV or more) than a semiconductor including a Group 14 element such as Si or Ge; accordingly, leakage current due to thermal excitation is small. In addition, the leakage current of an OS transistor in an off state (also referred to as an off-state current) is extremely small.

By reducing impurities serving as electron donors, such as moisture or hydrogen, and also reducing oxygen vacancies, an i-type (intrinsic) or a substantially i-type oxide semiconductor can be obtained. Here, such an oxide semiconductor is referred to as a highly purified oxide semiconductor. When a highly purified oxide semiconductor is used for a channel, the off-state current normalized on the channel width can be reduced to about several yoctoamperes per micrometer (yA/µm) to several zeptoamperes per micrometer (zA/µm).

The off-state current per micrometer of channel width of an OS transistor is preferably lower than or equal to 100 zA. Because the off-state current is preferably as low as possible, the normalized off-state current is preferably lower than or equal to 10 zA/µm, further preferably lower than or equal to 1 zA/µm, and still further preferably lower than or equal to 10 yA/µm.

An OS transistor preferably includes an oxide semiconductor containing at least indium (In) or zinc (Zn). The oxide semiconductor preferably also contains an element serving as a stabilizer for reducing a variation in electrical characteristics. Examples of such an element include Ga, Sn, Hf, Al, and Zr. An In—Ga—Zn-based oxide and an In—Sn—Zn-based oxide are typical examples of the oxide semiconductor used for the OS transistor. The oxide semiconductor will be described in more detail in Embodiment 3.

By using a transistor with an extremely low off-state current, the charge pump circuit can hold an output voltage in a stand-by state (a clock signal stop state). That is, in a semiconductor device incorporating the charge pump circuit, supply of a clock signal to the charge pump circuit can also be stopped at the time of clock gating.

This will be described using the charge pump circuit 11 (FIG. 1A). When a certain period of time has passed after the signals CLK and CLKB are supplied, the voltage held in the capacitor Cout in the output portion 11b becomes constant, stabilizing the output voltage VOUT. In the clock gating, the supply of CLK and CLKB is stopped in the state where the voltage VOUT is applied to the back gate of the transistor M5.

Since Vth of the transistor M5 is shifted in the positive direction, the transistor M5 can be definitely set in an off state when the supply of CLK and CLKB is stopped. Because the transistor M5 is an OS transistor, which has an ultra-low off-state current, the leakage current from the transistor M5 is extremely low when the supply of CLK and CLKB is stopped. That is, the charge pump circuit 11 can hold the voltage VOUT for a long time after the stop of the supply of CLK and CLKB and then can output the voltage VOUT.

By using an OS transistor as the transistor M5 of the output portion 11b, a variation in the voltage of the output node (Nb5) can be reduced. This allows the capacitance of the capacitor Cout of the output node to be decreased, so that the size of the charge pump circuit can be reduced. In addition, leakage of charges from each capacitor can be prevented, speeding up the start-up of the charge pump circuit.

In this way, a charge pump circuit that effectively utilizes off-state current characteristics of an OS transistor can be provided by performing the Vth adjustment by a back gate. By employing the Vth adjustment by a back gate, the degree of freedom of a manufacturing method of an OS transistor increases. Accordingly, the charge pump circuit using an OS transistor can be easily used in a variety of semiconductor devices.

This embodiment can be implemented in appropriate combination with any of the other embodiments.

(Embodiment 2)

In this embodiment, a semiconductor device capable of wireless communication, a semiconductor device including a charge pump circuit, and the like will be described.

The charge pump circuits in Embodiment 1 can be used as voltage generation circuits or voltage supply circuits in a variety of semiconductor devices. By generating a negative voltage or a voltage higher than a voltage supplied from a power supply circuit with the use of a charge pump circuit, circuits with different driving voltages can be easily integrated on one substrate or can be easily incorporated in one IC chip.

In a semiconductor device including an OS transistor, the degree of freedom of manufacturing conditions can be increased by employing the Vth adjustment of the OS transistor by voltage application to a back channel. Any of the charge pump circuits described in Embodiment 1 can be used as a circuit that generates a voltage applied to a back gate of an OS transistor that is included in a circuit including an OS transistor. As a specific example of a semiconductor device that includes a circuit including an OS transistor and a charge pump circuit, a radio frequency identification (RFID) tag will be described below. Note that the RFID tag is referred to as an RFID, an RF tag, an ID tag, an IC tag, an IC chip, a wireless tag, an electronic tag, a wireless IC tag, and the like.

A wireless communication system using RFID technology is a communication system including a wireless communication device (an interrogator) and a data carrier (a transponder), and data is wirelessly communicated between them. The transponder is an RFID tag. The interrogator refers to a device capable of wirelessly transmitting and receiving signals, such as a reader/writer, a cellular phone, or a personal computer. In this specification, the interrogator is typically a reader/writer.

RFID tags are classified according to the power feeding method into an active type with an incorporated battery and a passive type without an incorporated battery. The passive RFID tag has a function of generating an operation voltage from a communication signal received by an antenna. There is another type called a semi-passive type in which a battery is incorporated in a passive RFID tag and power is supplied from both the battery and a signal received by an antenna.

Furthermore, RFID tags are classified according to the principle of operation of communication. Two chief methods are an electromagnetic induction method and an electric wave method. In the electromagnetic induction method, a carrier frequency in a longwave band (lower than 135 kHz), a shortwave band (13.56 MHz), or the like is used. In the electric wave method, a carrier frequency in a UHF band (typically 900 MHz band), a microwave band (e.g., 2.45 GHz), or the like can be used. The antenna structure of the RFID tag varies depending on the carrier frequency.

Here, as an example of an RFID tag, an electric-wave passive RFID tag will be described. However, the communication method and the power feeding method of an RFID tag of this embodiment are not limited to those of this example.

<<Structure Example 1 of RFID Tag>>

Figure 7:
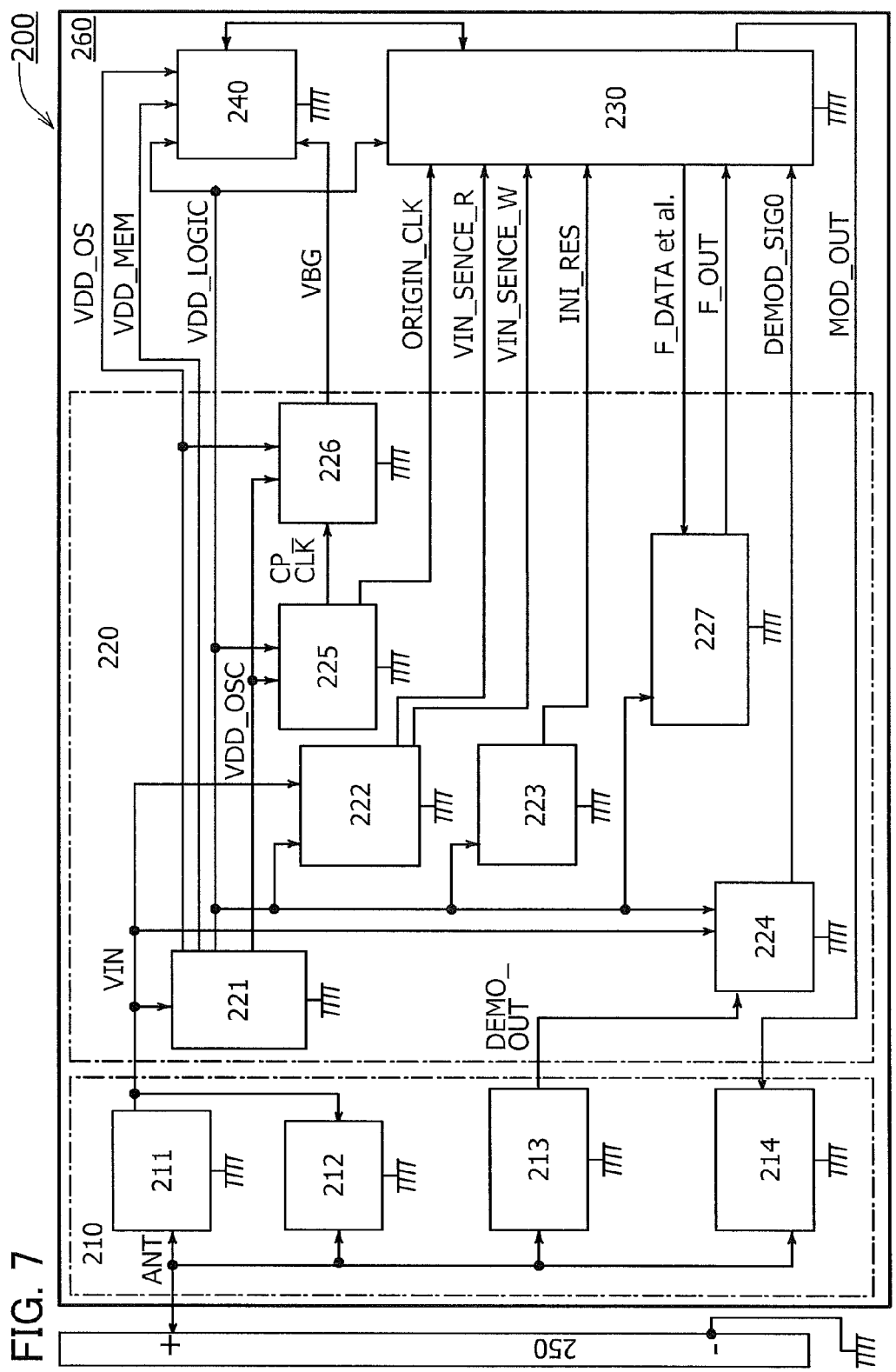
FIG. 7 is a block diagram illustrating a structure example of an RFID tag.

FIG. 7 is a block diagram illustrating a structure example of an RFID tag. An RFID tag 200 is of a passive type, and the communications zone is a UHF band. The RFID tag 200 includes an antenna 250 and a circuit portion 260. The circuit portion 260 has a function of processing a signal received by the antenna 250, a function of generating response data in accordance with the received signal, a function of outputting the response data as a carrier wave from the antenna 250, and the like. The circuit portion 260 is integrated in one IC chip, and is a semiconductor device called an RFID chip or the like. As illustrated in FIG. 7, the circuit portion 260 includes an input/output portion (IN/OUT) 210, an analog portion 220, a logic portion 230, and a memory portion 240, for example.

<Input/Output Portion>

Figure 8A:
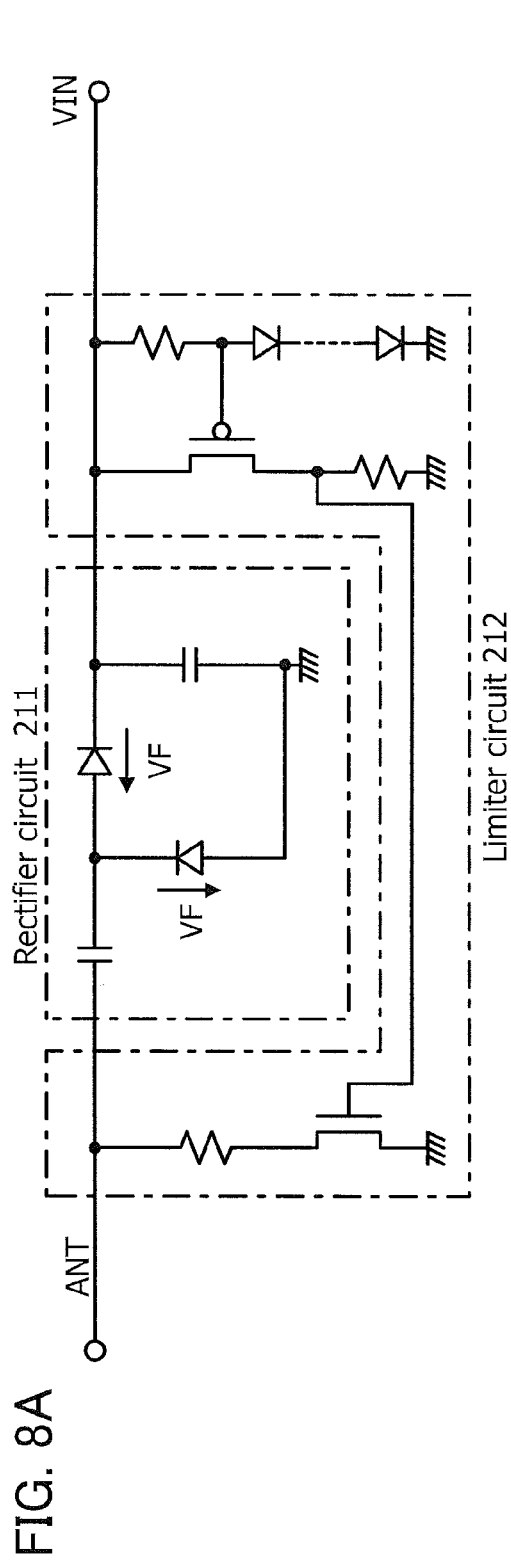
FIG. 8A is a circuit diagram illustrating a structure example of a rectifier circuit and a limiter circuit in an input/output portion.
Figure 8B:
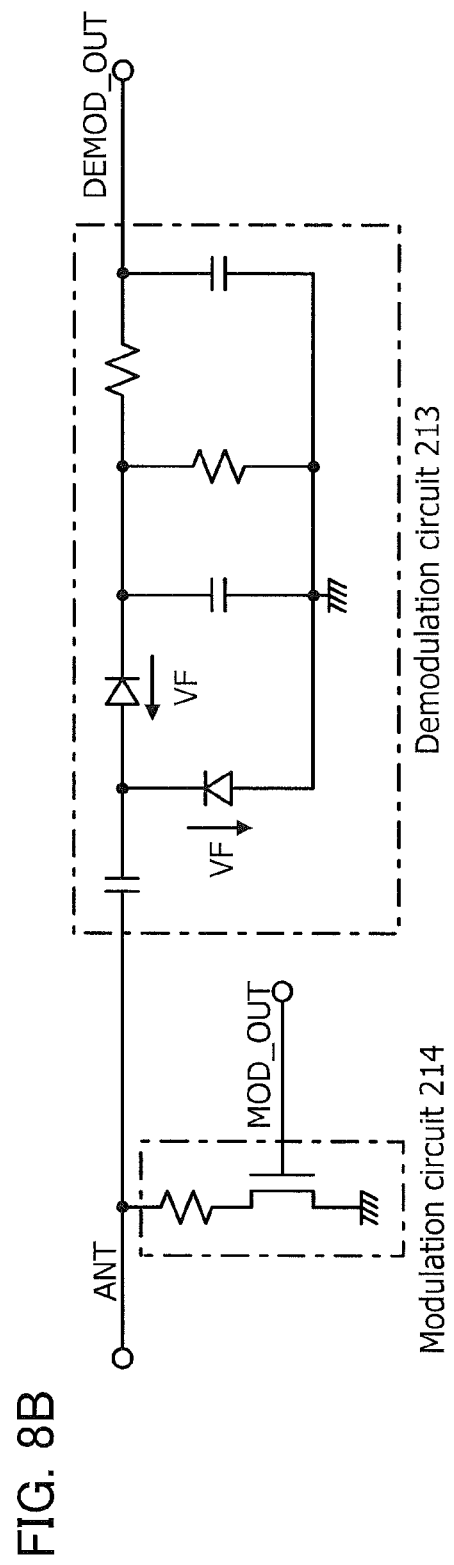
FIG. 8B is a circuit diagram illustrating a structure example of a demodulation circuit and a modulation circuit in the input/output portion.

The input/output portion 210 includes a rectifier circuit 211, a limiter circuit 212, a demodulation circuit 213, and a modulation circuit 214. FIG. 8A is a circuit diagram illustrating a structure example of the rectifier circuit 211 and the limiter circuit 212. FIG. 8B is a circuit diagram illustrating a structure example of the demodulation circuit 213 and the modulation circuit 214.

The rectifier circuit 211 is a circuit that rectifies a signal (carrier wave ANT) input from the antenna 250 and generates a voltage VIN. The voltage VIN is used as electromotive force of the circuits (the analog portion 220, the logic portion 230, and the memory portion 240). In the example of FIG. 8A, when the amplitude voltage of the carrier wave ANT is VANT, VIN is substantially equal to 2(VANT-VF).

The limiter circuit 212 is a protection circuit for preventing the voltage VIN from becoming high.

The demodulation circuit 213 is a circuit that demodulates the carrier wave ANT received by the antenna 250. The demodulation circuit 213 generates a demodulated signal DEMOD_OUT and outputs the signal from the input/output portion 210.

The modulation circuit 214 is a circuit that superimposes response data (digital signal) MOD_OUT transmitted from the logic portion 230 on the carrier wave ANT. The modulation method used here is an amplitude shift keying (ASK) method. The carrier wave ANT is modulated in accordance with MOD_OUT (modulation wave) by the modulation circuit 214, and the modulated wave is transmitted from the antenna 250.

<<Analog Portion>>

The analog portion 220 includes a power supply circuit 221, a voltage detector circuit 222, a reset circuit 223, a buffer circuit 224, an oscillator circuit 225, a VBGGENC 226, and a flag holding circuit 227 (FIG. 7). The analog portion 220 is an analog signal processing circuit and has a function of generating an operation voltage of the circuits (the analog portion 220, the logic portion 230, and the memory portion 240), a function of generating a clock signal, a function of transmitting the demodulated modulation signal to the logic portion 230, and the like.

<Power Supply Circuit>

FIG. 9A is a block diagram illustrating a structure example of the power supply circuit 221. The power supply circuit 221 is a circuit that generates operation voltages of the circuits (the analog portion 220, the logic portion 230, and the memory portion 240). Here, the power supply circuit 221 generates four operation voltages (VDD_LOGIC, VDD_OSC, VDD_MEM, VDD_OS) from the voltage VIN. The power supply circuit 221 includes a voltage generation circuit (PSBIAS) that generates a bias voltage BIAS and a reference voltage REF from VIN and four voltage generation circuits LDO1 to LDO4 that generate operation voltages from the voltages BIAS and REF.

Figure 10:
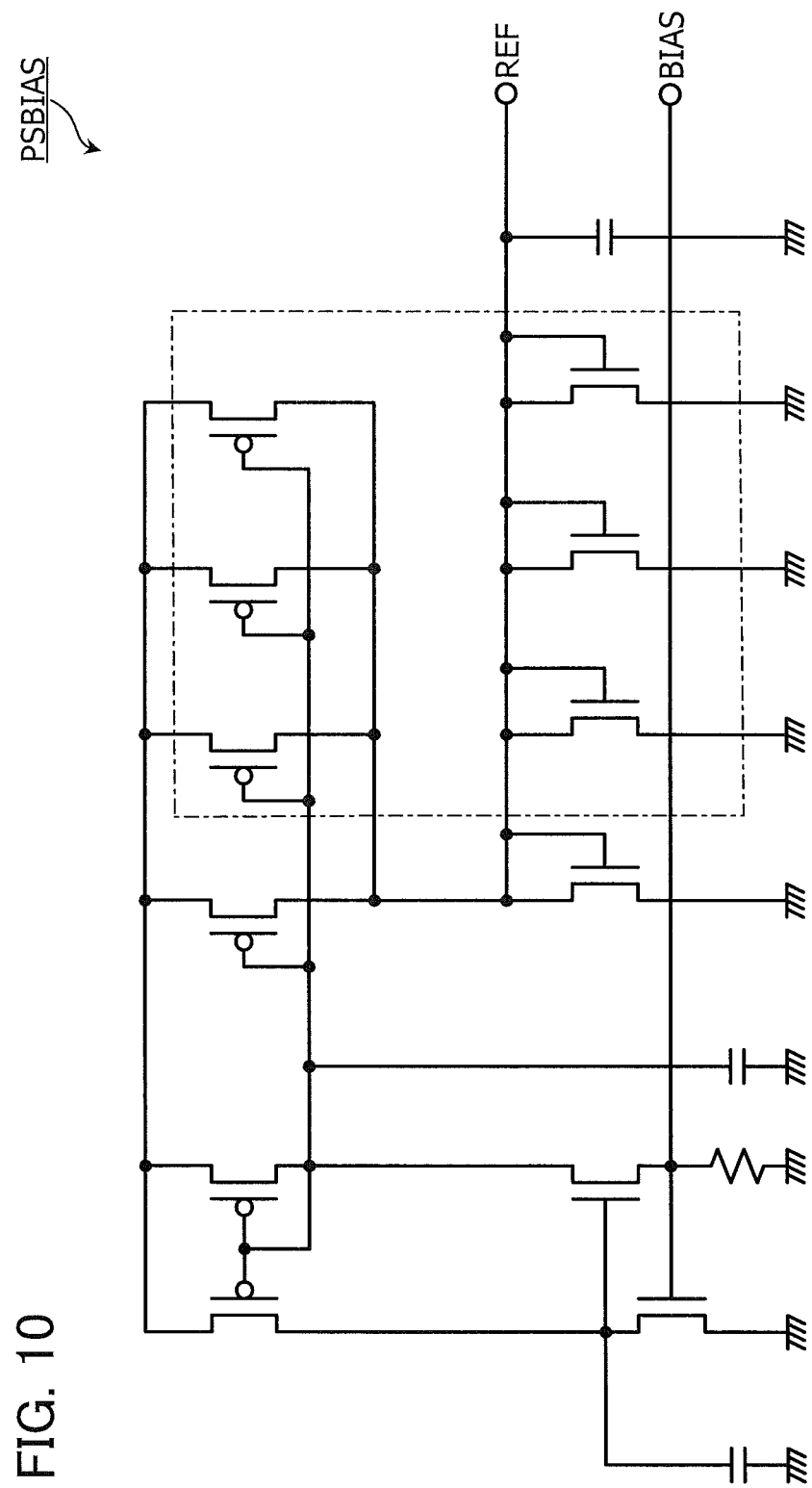
FIG. 10 is a circuit diagram illustrating a structure example of a voltage generation circuit (PSBIAS)

FIG. 9B is a circuit diagram illustrating a structure example of the PSBIAS. FIG. 10 is a circuit diagram illustrating a structure example of the PSBIAS. In the PSBIAS illustrated in FIG. 10, by decreasing or increasing the number of transistors in a portion surrounded by a dashed-dotted line, the value of the reference voltage REF output from the PSBIAS can be adjusted.

FIG. 9C is a circuit diagram illustrating a structure example of the LDO. The LDO is a circuit incorporated in the power supply circuit 221 as the voltage generation circuits LDO1 to LDO4. In an LDO, the output voltage (Vldo) can be varied by appropriately adjusting the capacitance of a capacitor connected to the output terminal, the resistance of a resistor, the channel width of a transistor, and the like. Here, the voltages generated by LDO1 to LDO4 have the following relation: VDD_OS>VDD_MEM>VDD_OSC>VDD_LOGIC.

Figure 11:
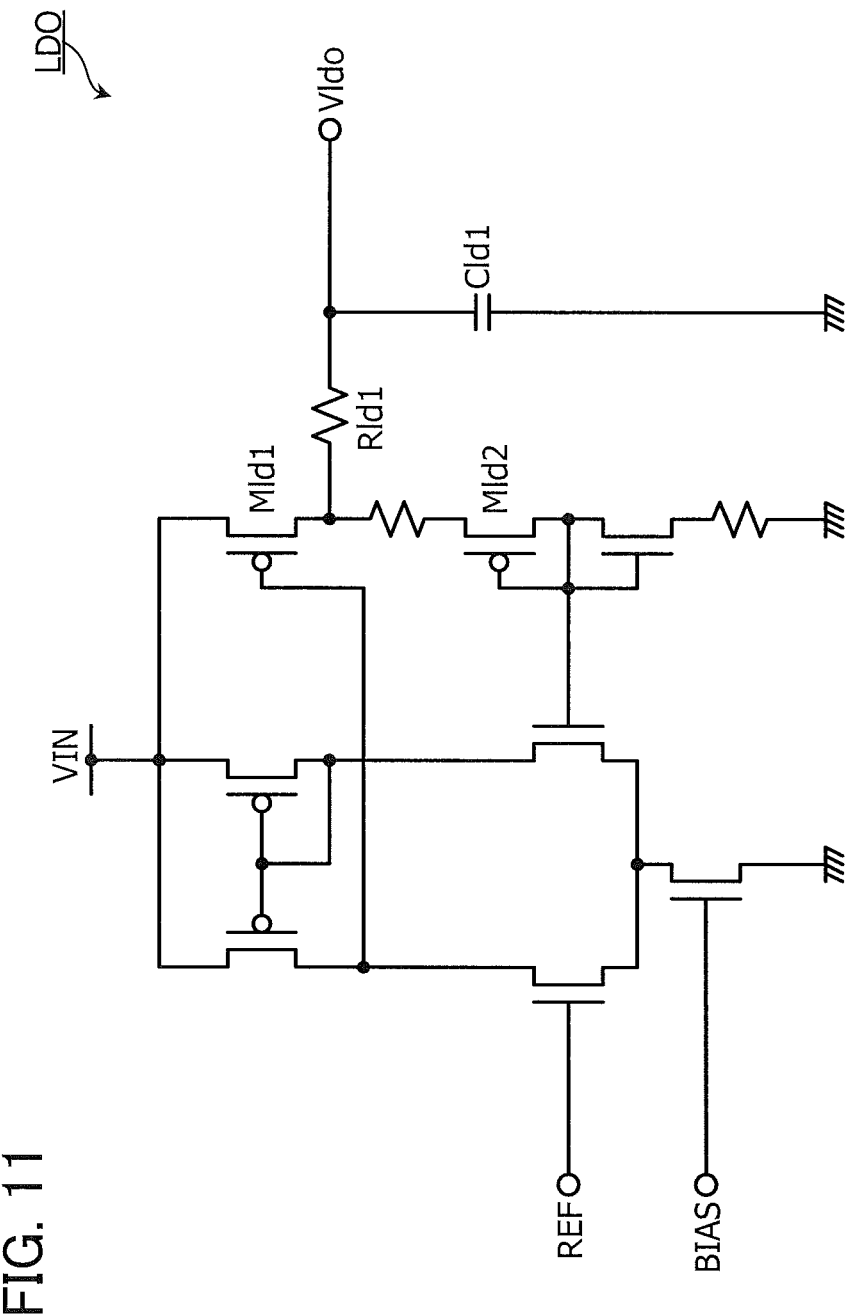
FIG. 11 is a circuit diagram illustrating a structure example of a voltage generation circuit (LDO)

FIG. 11 illustrates another structure example of the LDO. In the LDO illustrated in FIG. 11, the output voltage Vldo can be changed by adjusting the size or the like of elements constituting the LDO. For example, at least one of the channel width of a transistor Mld1, the channel width of a transistor Mld2, the resistance of a resistor Rld1, and the capacitance of a capacitor Cld1 is changed. In some cases, the resistor Rld1 is not provided intentionally.

<Voltage Detector Circuit>

FIG. 12A is a circuit diagram illustrating a structure example of the voltage detector circuit 222. The voltage detector circuit 222 has a function of determining whether VIN is higher or lower than a predetermined value and generating a digital signal corresponding to the determination result. This digital signal is used as a trigger signal for operating the logic portion 230. The voltages BIAS and REF input to comparators of the voltage detector circuit 222 are input from the PSBIAS of the power supply circuit 221. In the example of FIG. 12A, the voltage detector circuit 222 includes the two comparators COMP which generate and output signals VIN_SENSE_R and VIN_SENSE_W. FIG. 12B illustrates a structure example of the comparators COMP.

<Reset Circuit>

Figure 13A:
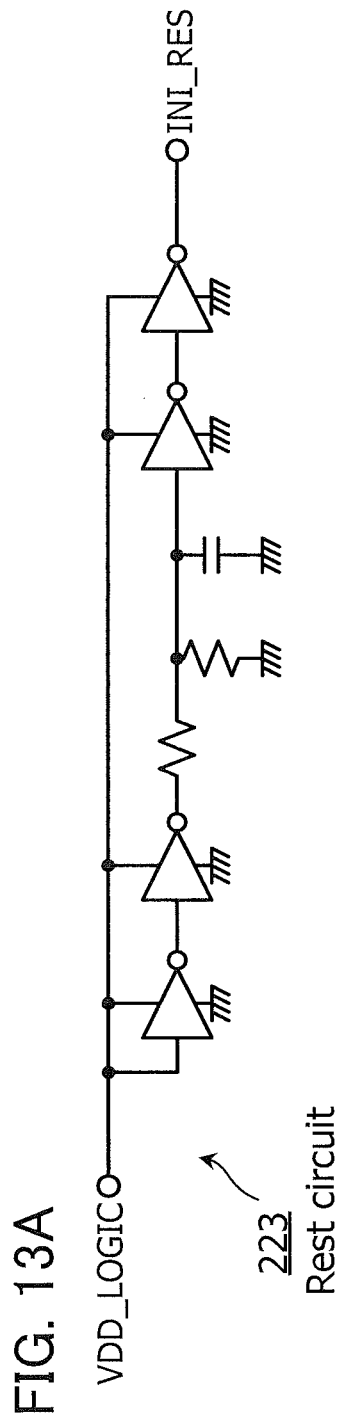
FIG. 13A is a circuit diagram illustrating a structure example of a reset circuit in an analog portion.

The reset circuit 223 monitors the voltage generated by the power supply circuit 221 and generates a reset signal that resets the logic portion 230. FIG. 13A is a circuit diagram illustrating a structure example of the reset circuit 223. In this example, the reset circuit 223 detects rising of the operation voltage VDD_LOGIC and generates a reset signal INI_RES.

<Buffer Circuit>

Figure 13B:
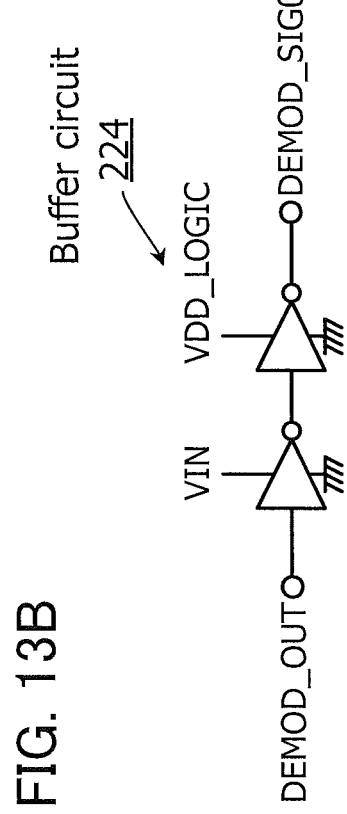
FIG. 13B is a circuit diagram illustrating a structure example of a buffer circuit in the analog portion.

The buffer circuit 224 is a circuit that transmits serial data (DEMOD_OUT) demodulated and extracted by the demodulation circuit 213, to the logic portion 230. FIG. 13B is a circuit diagram illustrating a structure example of the buffer circuit 224. In the buffer circuit 224, DEMOD_OUT is amplified in a first-stage inverter, and converted into a signal DEMOD_SIG0 having an amplitude such that the signal DEMOD_SIG0 can be input to the logic portion 230 in a second-stage inverter. The signal DEMOD_SIG0 is then input to the logic portion 230.

<Oscillator Circuit>

Figure 15:
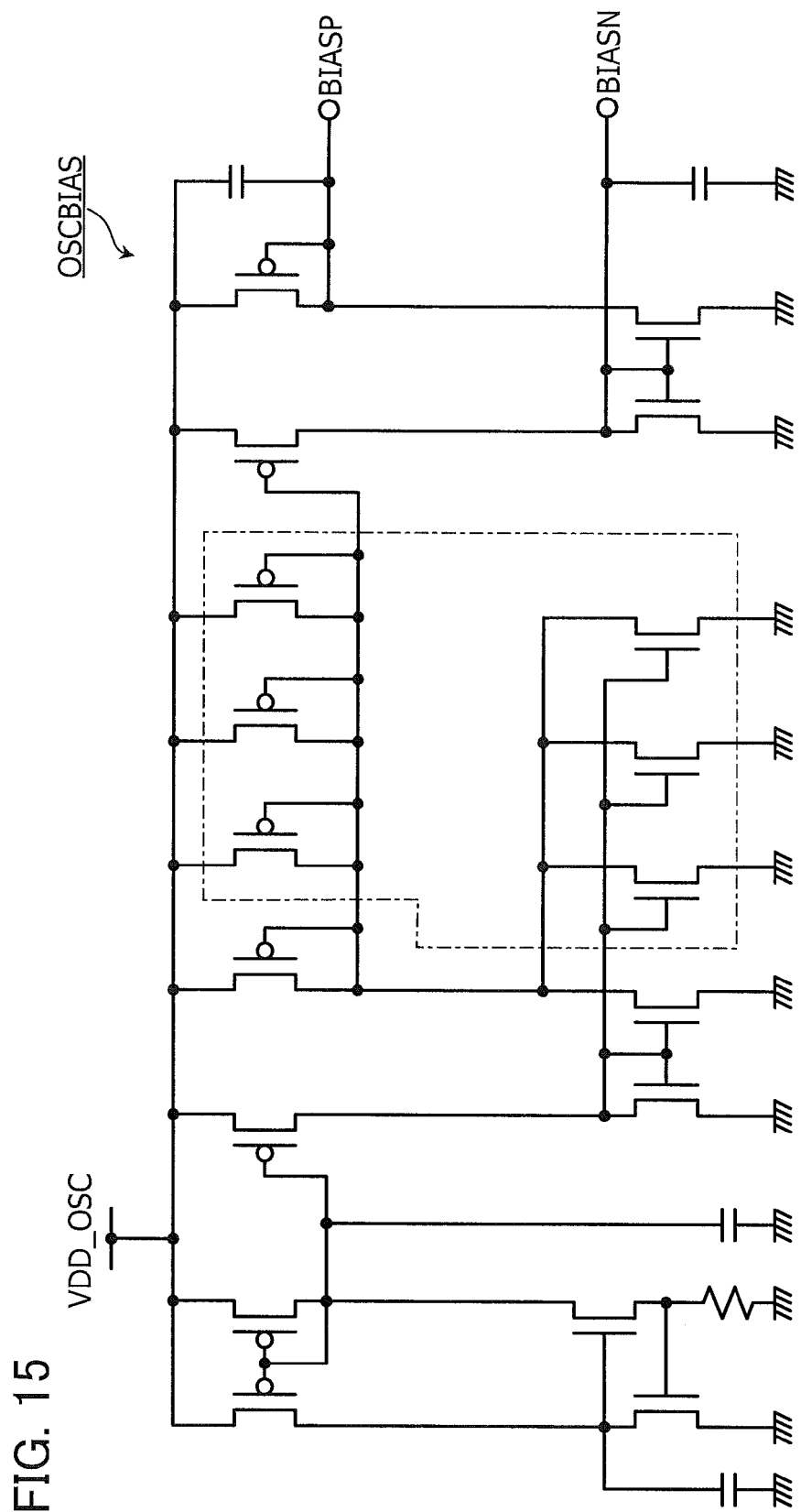
FIG. 15 is a circuit diagram illustrating a structure example of a voltage generation circuit (OSCBIAS)

The oscillator circuit 225 is a circuit that generates a reference clock signal (ORIGIN_CLK) from the voltage signal (VDD_OSC) generated by the power supply circuit 221. FIG. 14A illustrates a structure example of the oscillator circuit 225, and FIG. 14B illustrates a structure example of a voltage generation circuit (OSCBIAS) that generates bias voltages (BIASP, BIASN) of the oscillator circuit 225. FIG. 15 illustrates another structure example of the OSCBIAS. In FIG. 15, by changing the number of transistors in a portion surrounded by a dashed-dotted line, the value of the bias voltage BIASP can be adjusted.

<Voltage Generation Circuit VBGGENC>

Figure 16A:
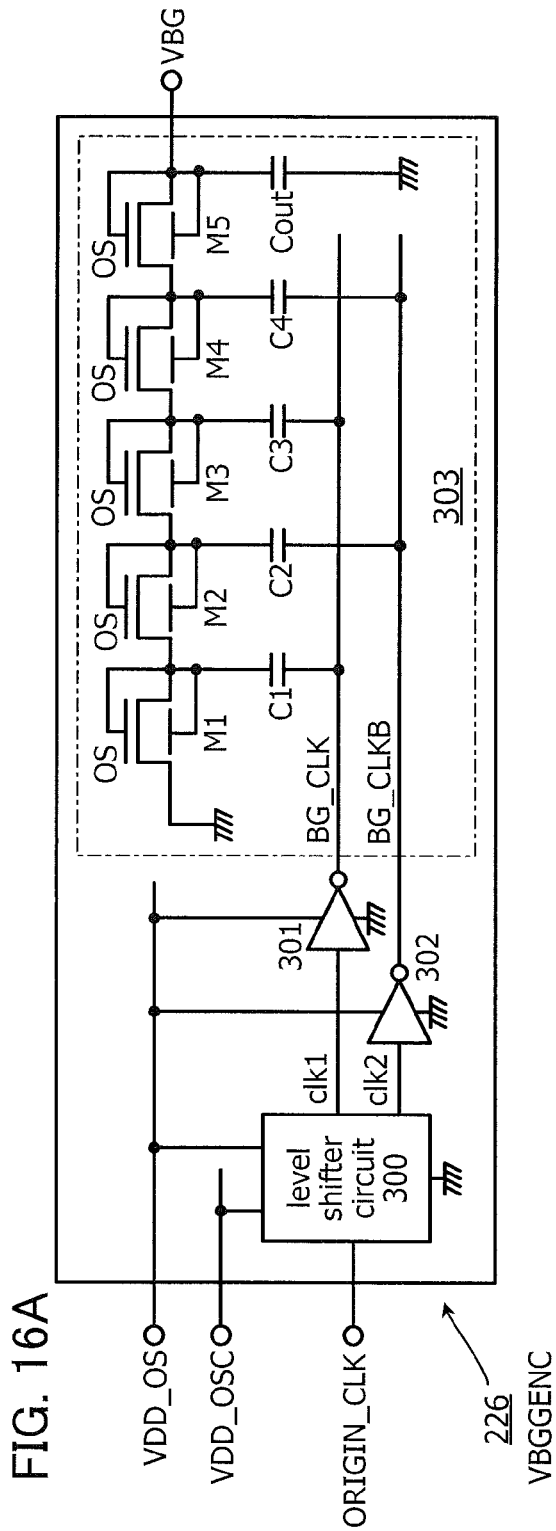
FIG. 16A is a circuit diagram illustrating a structure example of a voltage generation circuit (VBGGENC)
Figure 16B:
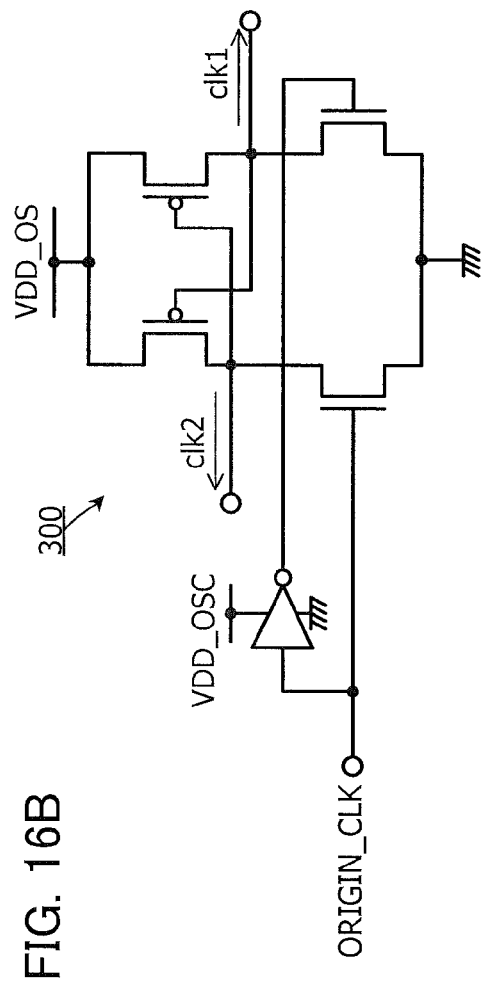
FIG. 16B is a circuit diagram illustrating a structure example of a level shifter circuit.

The voltage generation circuit (VBGGENC) 226 is a circuit that generates a negative voltage VBG used in the memory portion 240. FIG. 16A is a circuit diagram illustrating a structure example of the VBGGENC 226. The VBGGENC 226 includes a level shifter 300, an inverter 301, an inverter 302, and a charge pump circuit 303. FIG. 16B is a circuit diagram illustrating a structure example of the level shifter 300.

The level shifter 300 and the inverters 301 and 302 constitute a circuit that generates clock signals BG_CLK and BG_CLKB used in the charge pump circuit 303. The level shifter 300 generates two clock signals clk1 and clk2 from ORIGIN_CLK. clk1 and clk2 are signals having opposite phases. clk1 and clk2 are amplified in the inverters 301 and 302 and input to the charge pump circuit 303 as BG_CLK and BG_CLKB.

As the charge pump circuit 303, the charge pump circuit 12 (FIG. 1B) is employed. Of course, any of the step-down charge pump circuits of the other structure examples can be employed. The charge pump circuit 303 generates and outputs a voltage VBG during a period when BG_CLK and BG_CLKB are supplied. Here, a diode-connected OS transistor is used as the diode of the charge pump circuit 303. Therefore, the VBGGENC 226 can hold VBG for a long time during a period when BG_CLK and BG_CLKB are not supplied, and can keep supplying VBG to the memory portion 240 in this period.

FIG. 17 illustrates another structure example of the voltage generation circuit (VBGGENC). A voltage generation circuit (VBGGENC) 305 is different from the VBGGENC 226 in the circuit structures of the charge pump circuit 306 and the level shifter circuit 307. The charge pump circuit 306 is a modification example of the charge pump circuit 22 (FIG. 3B) and includes transistors M1 to M9 and capacitors C1 to C7. By using OS transistors as the transistors M1 to M9, the VBGGENC 305 can hold VBG for a long time during a period when BG_CLK and BG_CLKB are not supplied, and can keep supplying VBG to the memory portion 240 in this period.

<Flag Holding Circuit>

The flag holding circuit 227 is a circuit that holds flag data. The flag is data that shows the state of the RFID tag 200. The flag state holding period is set by International Organization for Standardization. Here, a structure example of the flag holding circuit 227 that conforms to ISO/IEC18000-6C will be described.

Figure 18A:
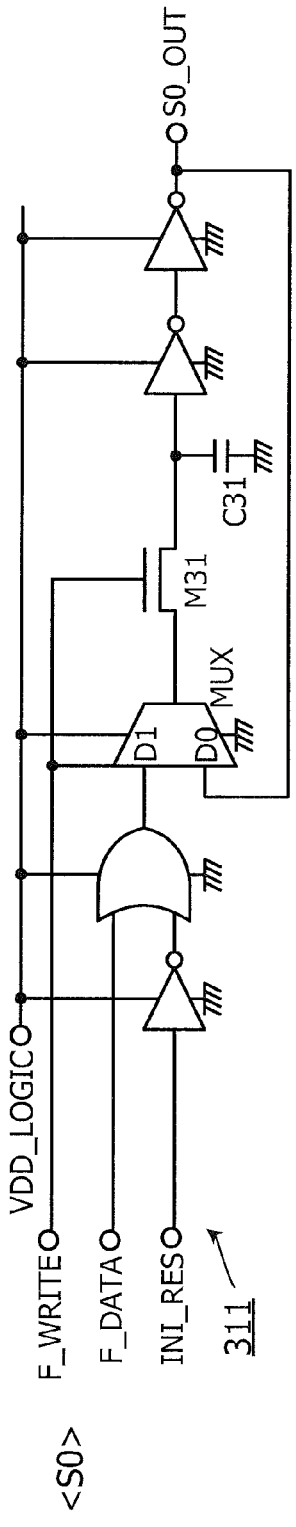
FIGS. 18A to 18C are circuit diagrams each illustrating a structure example of a flag holding circuit.
Figure 18B:
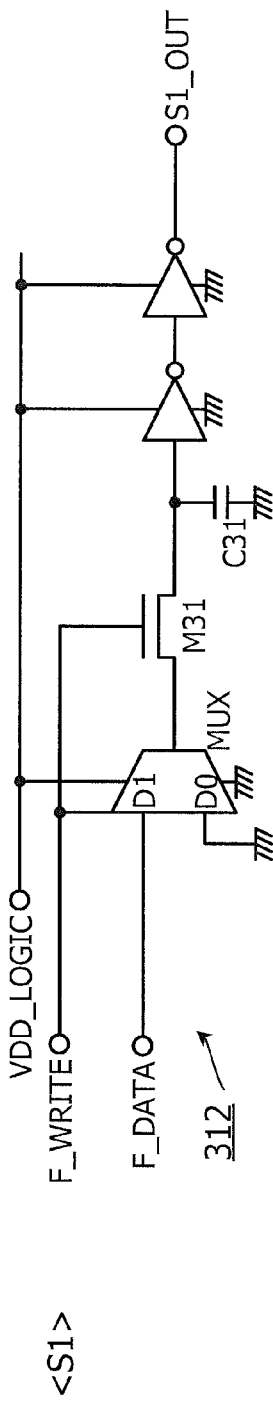
Figure 18C:
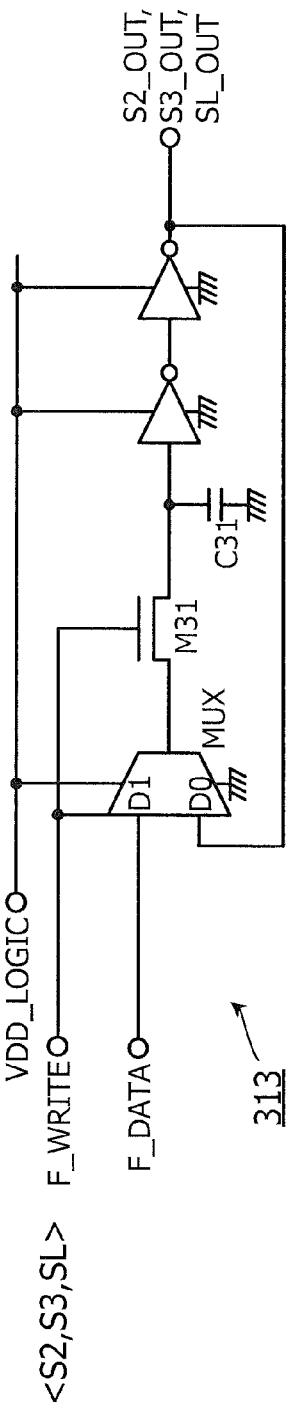

In the flag holding circuit 227, each flag data is held in its own holding circuit. FIGS. 18A to 18C are circuit diagrams each illustrating a structure example of the holding circuit. FIG. 18A illustrates a flag holding circuit 311 for a session flag 0(S0). FIG. 18B illustrates a flag holding circuit 312 for S1. FIG. 18C illustrates a flag holding circuit 313 of S2, S3, and SL (selected). The flag holding circuit 227 includes at least five flag holding circuits.

In the flag holding circuits 311 to 313, flag data (F_DATA) is held as a voltage in a capacitor C31. Output data (S0_OUT, S1_OUT, S2_OUT, S3_OUT, SL_OUT) of the circuits 311 to 313 are subjected to logical operation by a logic circuit provided in the flag holding circuit 227, and the result is input to the logic portion 230 as F_OUT.

Writing of flag data to the flag holding circuits 311 to 313 is performed by turning on a transistor M31 with a signal F_WRITE. The erase of the flag data is performed by turning off the transistor M31 and discharging charges from the capacitor C31 through a source and a drain of the transistor M31. F_WRITE and F_DATA are signals input from the logic portion 230.

Since the flag holding circuits 311 to 313 have an analog circuit structure, even after the supply of operation voltages is stopped, the holding and erase of flag data that conform to the standard are possible without using a clock signal.

<<Logic Portion>>

Figure 19:
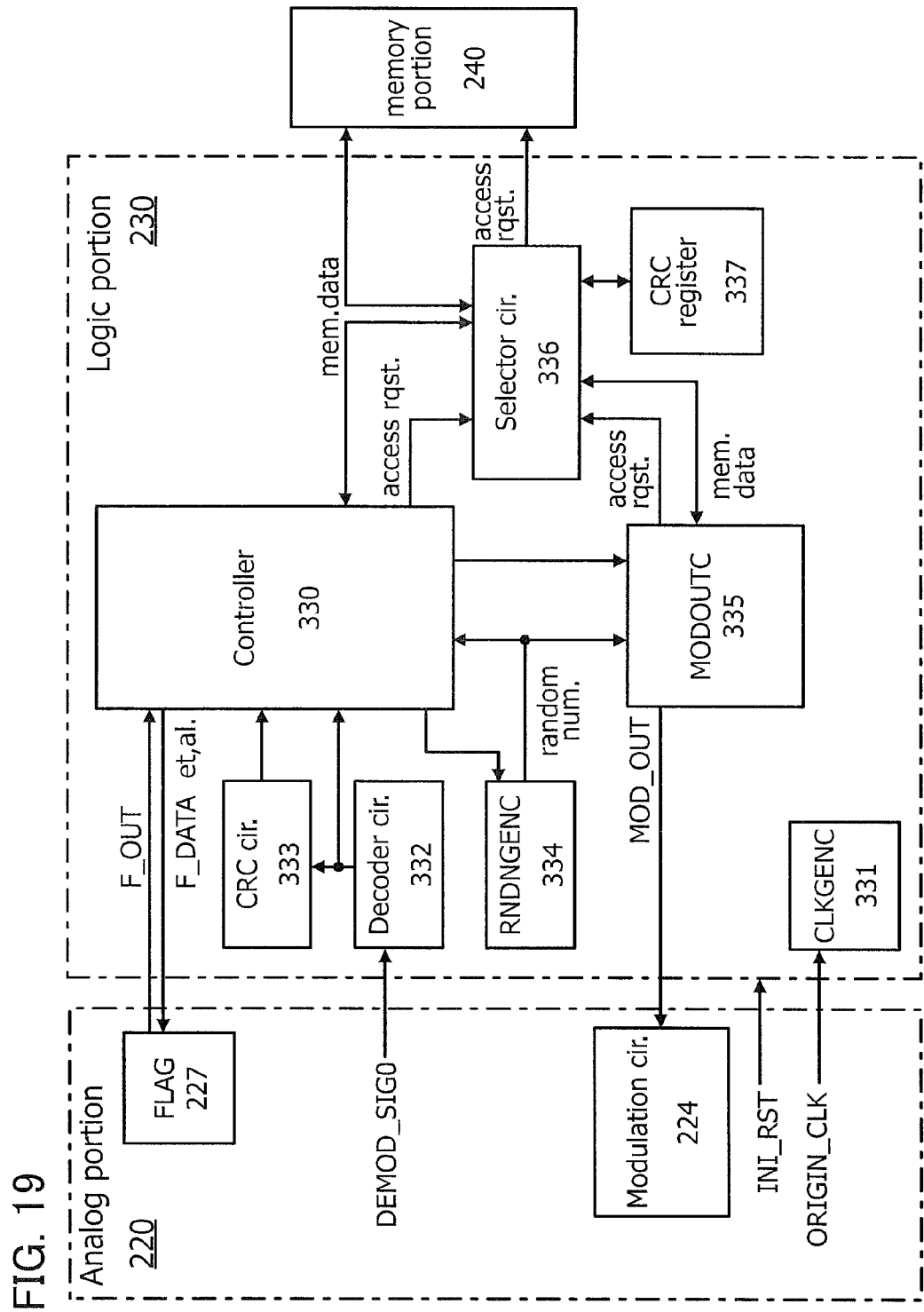
FIG. 19 is a block diagram illustrating a structure example of a logic portion.

FIG. 19 is a block diagram illustrating a structure example of the logic portion 230. The logic portion 230 includes a clock generation circuit (CLKGENC) 331, a decoder circuit 332, a CRC circuit 333, a random number generation circuit (RNDNGENC) 334, an output signal generation circuit (MODOUTC) 335, a selector circuit 336, and a CRC register 337.

A controller 330 is a circuit that controls the entire logic portion 230. An input and an output of the flag holding circuit (FLAG) 227 are connected to the controller 330. The CLKGENC 331 has a function of generating a clock signal that is used in the logic portion 230 from ORIGIN_CLK. The CLKGENC 331 can be formed using a frequency divider circuit, for example.

The decoder circuit 332 is a circuit that decodes DEMOD_SIG0. The decoded signal is input to the controller 330 and the CRC circuit 333. The CRC circuit 333 is a circuit that calculates a cyclic redundancy check (CRC) code from an input signal from the decoder circuit 332. The CRC code calculated by the CRC circuit 333 is output to the controller 330.

The CRC register 337 is a register that functions as a CRC region for storing the CRC code. The CRC region is normally prepared in a memory map of the memory portion 240. Because calculation of the CRC code at the time of start-up is required in the non-contact communication standard, the RFID tag 200 can be operated only when power capable of writing data to the memory portion 240 is generated. That is, the RFID tag 200 can only respond at the time of short-distance communication where a sufficiently high electromotive force is obtained. In view of this, the register that needs lower power for writing than the memory portion 240 does is provided as the CRC region in the logic portion 230. In this way, the operation voltage at the time of start-up becomes lower, whereby the communication distance of the RFID tag 200 can be extended.

The RNDNGENC 334 generates a random number in accordance with the control of the controller 330. This random number is output to the controller 330 and the MODOUTC 335. The MODOUTC 335 generates response data MOD_OUT in accordance with the control of the controller 330.

The memory portion 240 and the CRC register 337 are accessed via the selector circuit 336. The controller 330 and the MODOUTC 335 output an access request signal to the selector circuit 336. The selector circuit 336 writes and reads memory data to and from the memory portion 240 or the CRC region in accordance with an access request.

<<Memory Portion>>

Figure 20:
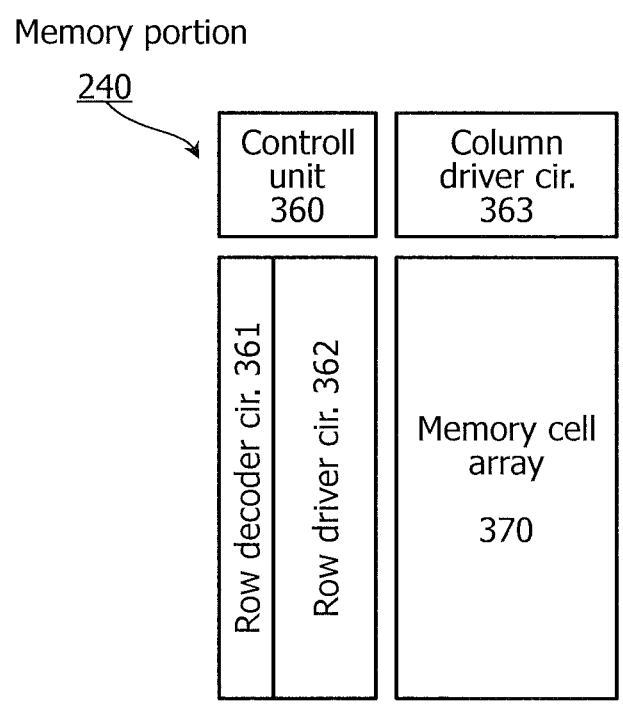
FIG. 20 is a block diagram illustrating a structure example of a memory portion.

FIG. 20 is a block diagram illustrating a structure example of the memory portion 240. The memory portion 240 includes a control unit 360, a row decoder circuit 361, a row driver circuit 362, a column driver circuit 363, and a memory cell array 370.

The control unit 360 is a control circuit of the memory portion 240 and has a function of generating control signals for controlling the circuits (361 to 363) in accordance with an access request from the logic portion 230. The circuits (361 to 363) have a function of generating driving signals for driving the memory cell array 370 in accordance with the control signal from the control unit 360.

<Structure Example 1 of Memory Cell>

Figure 21:
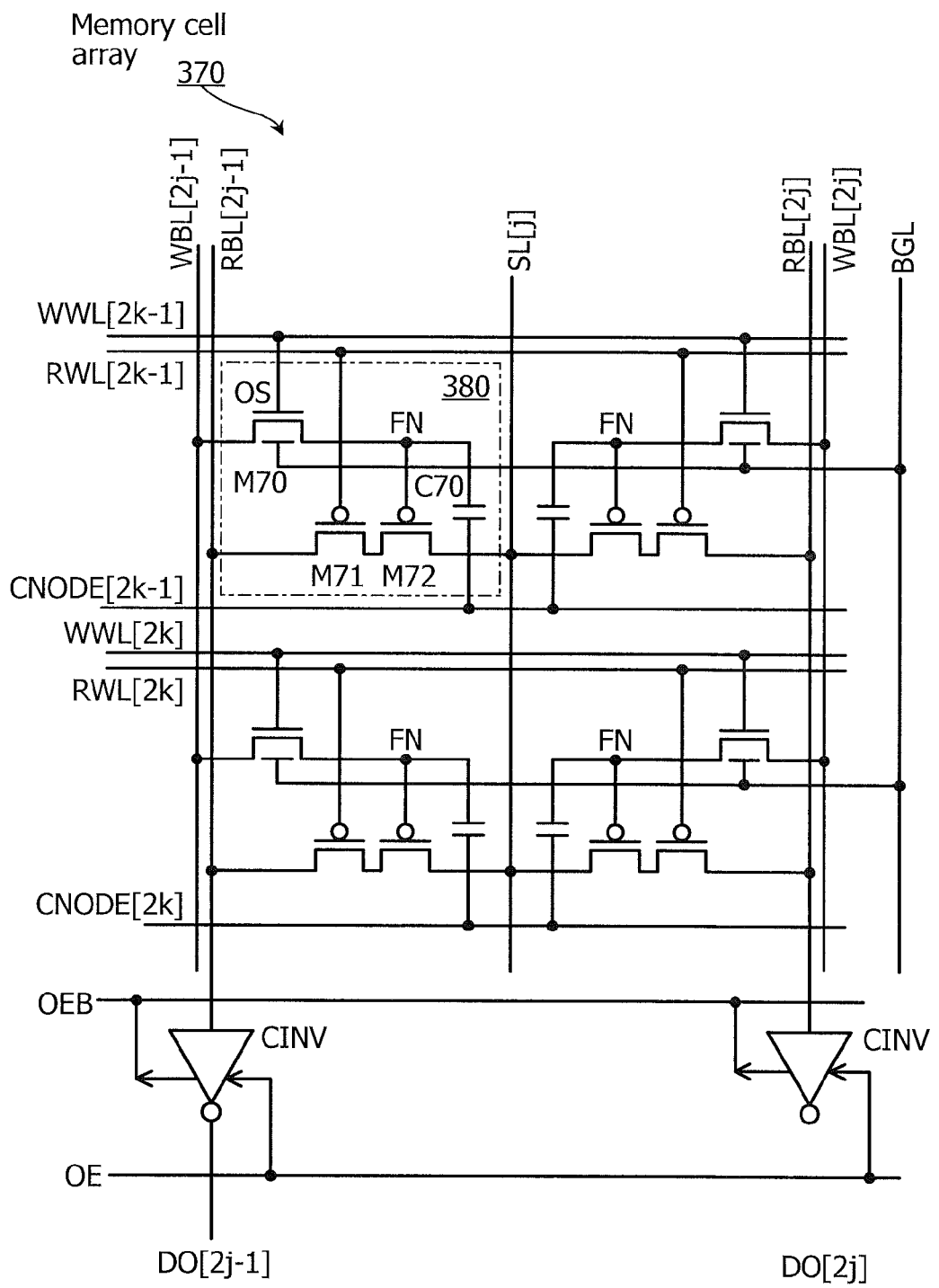
FIG. 21 is a circuit diagram illustrating a structure example of a memory cell array.

The memory cell array 370 is a circuit in which a plurality of memory cells are arranged in an array. FIG. 21 is a circuit diagram illustrating a structure example of the memory cell array 370. FIG. 21 typically illustrates four memory cells 380 in [2j−1, 2k−1] to [2j, 2k] (j and k are integers of 1 or more).

The memory cells 380 each include transistors M70 to M72 and a capacitor C70. Here, the transistor M70 is an n-channel OS transistor. In addition, the transistors M71 and M72 are p-channel Si transistors. A node FN is a data storage portion of the memory cell array 370 that holds charges as data; in this example, the node FN is a gate of the transistor M72.

The memory cell array 370 is provided with wirings (WWL, RWL, CNODE, SL, WBL, RBL) in accordance with the arrangement of the memory cells 380. The memory cells 380 are connected to these wirings in rows and columns. Moreover, a wiring BGL is provided as a common wiring in the memory cell array 370. A back gate of the transistor M70 in each memory cell 380 is connected to BGL.

WWL and RWL function as a writing word line and a reading word line, respectively, and are both connected to the row driver circuit 362. CNODE has a function of supplying a voltage applied to the capacitor C70.

SL functions as a source line and provided in every other column. WBL functions as a writing bit line and is a wiring to which memory data to be written to the memory cells 380 is supplied from the column driver circuit 363. RBL functions as a reading bit line and is a wiring to which memory data read out from the memory cells 380 is output. SL, WBL, and RBL are connected to the column driver circuit 363.

An inverter CINV is connected to an output of RBL because the voltage level (high/low) of a signal read from RBL is opposite from the voltage level of written data. In the example of FIG. 21, when the voltage of written data is at low level, the voltage of RBL becomes high level; when the voltage of written data is at high level, the voltage of RBL becomes low level. Wirings OE and OEB are wirings that supply a voltage to the CINV. The output signal (memory data) of the CINV is output from a wiring DO.

The capacitor C70 functions as a capacitor for holding charges of the node FN. One terminal of the capacitor C70 is connected to the node FN, and the other terminal of the capacitor C70 is connected to the wiring CNODE. The wiring CNODE is connected to the row driver circuit 362. Note that in the case where charges of the node FN can be held by a capacitor between wirings of the memory cell 380, the capacitor C70 and the wiring CNODE need not be provided.

By turning on the transistor M70, a voltage corresponding to the data value ("0", "1") is applied to the node FN. In addition, by turning off the transistor M70, the node FN is brought into an electrically floating state and the memory cell 380 is brought into a data retention state. Since the transistor M70 is an OS transistor, the leakage current flowing between a source and a drain of the transistor M70 in an off state is extremely low. Therefore, the memory cell 380 can retain data for a period of years (e.g., 10 years, approximately) without refresh operation; thus, the memory cell 380 can be used as a nonvolatile memory cell. Moreover, since Vth of the transistor M70 is shifted in the positive direction by applying VBG to the back gate, a voltage lower than Vth can be more certainly applied to the gate of the transistor M70 in the data retention state; accordingly, the nonvolatile memory cell 380 with little data retention errors can be obtained.

Accordingly, data can be held in the memory portion 240 without electric waves received by the RFID tag 200. The operation of the memory portion 240 will be described in more detail below with reference to FIG. 22.

Note that in a memory circuit that utilizes an extremely low off-state current of a transistor including an oxide semiconductor layer in a channel portion, a predetermined voltage might keep being supplied to the transistor in a period for retaining data. For example, a voltage that turns off the transistor completely might keep being supplied to a gate of the transistor. Alternatively, a voltage that shifts the threshold voltage of the transistor to make the transistor in a normally-off state may keep being supplied to a back gate of the transistor. In these cases, the voltage is supplied to the memory circuit in the period for retaining data. However, because almost no current flows, little power is consumed. Because of little power consumption, even if the predetermined voltage is supplied to the memory circuit, the memory circuit can be regarded as being substantially nonvolatile.

<Operation Example 1 of Memory Cell Array (Memory Portion)>

Figure 22:
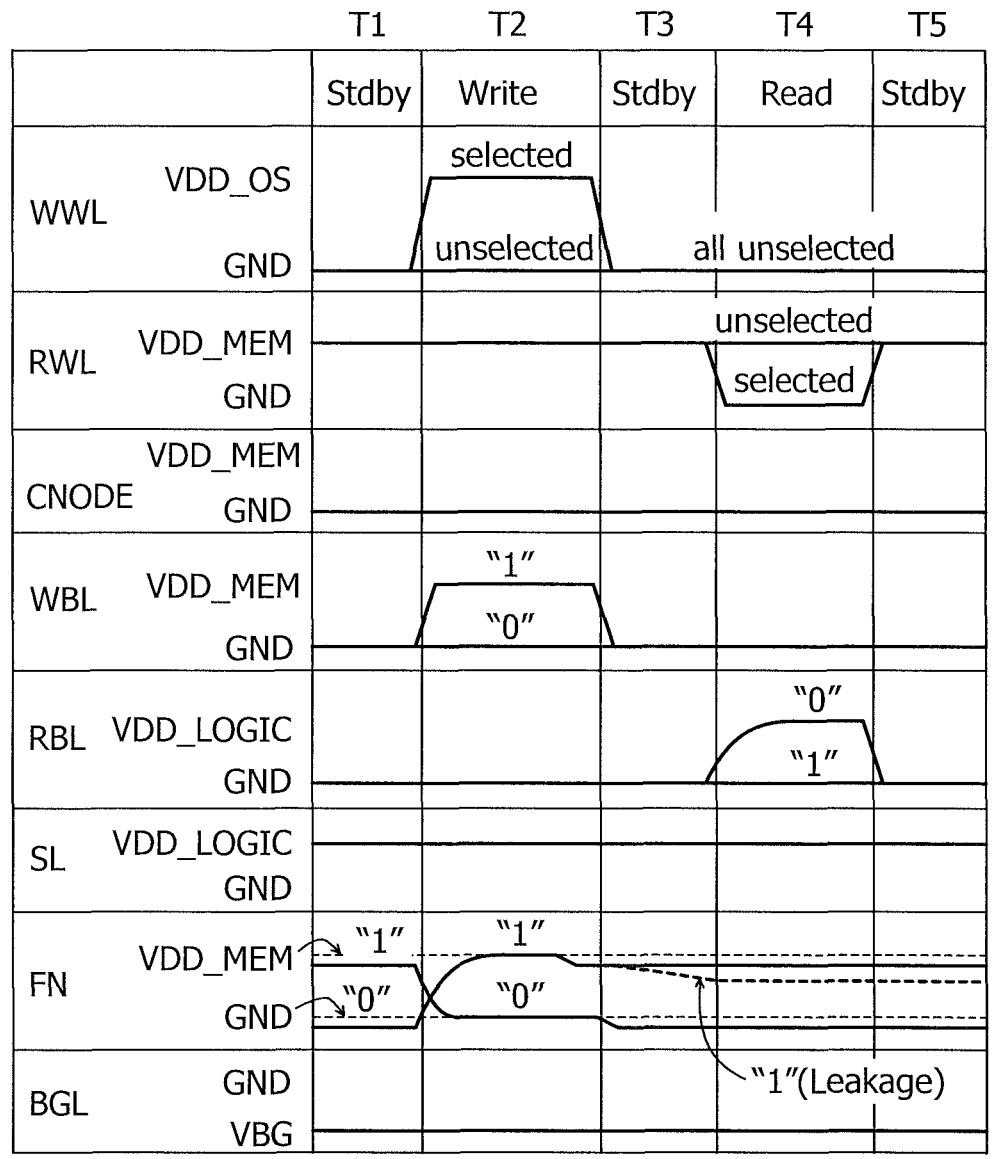
FIG. 22 is a timing chart showing an operation example of a memory portion.

FIG. 22 is a timing chart showing an operation example of the memory cell array 370 (memory portion 240). Specifically, FIG. 22 shows waveforms of signals input to the memory cell array 370 and the voltages (high level ("H")/low level ("L")) of wirings and nodes included in the memory cell array 370. In this example, a constant voltage is applied to CNODE, SL, and BGL.

In a period T1, the memory portion 240 is in a stand-by state (Stdby). The stand-by state refers to a state in which YIN is generated in the RFID tag 200; in this state, the memory portion 240 is in a data retention state. WWL, WBL, and RBL are at low levels and RWL is at high level. In the case where "1" is written to the memory cell 380, the voltage of FN is "H", while in the case where "0" is written to the memory cell 380, the voltage of FN is "L".

A period T2 is a writing operation period. WWL in a row to which data is written becomes "H", turning on the transistor M70, whereby the node FN is connected to WBL. In the case of writing "1", WBL is "H"; accordingly, FN is also "H". In contrast, in the case of writing "0", WBL is "L"; accordingly, FN is also "L". By setting WWL at "L" to turn off the transistor M70, the data writing operation is terminated and the memory cell 380 is brought into a stand-by state.

In a period T3 (stand-by period), the transistor M70 is changed from an on state to an off state, which makes the voltage of the node FN decrease by the threshold voltage of the transistor M70. Since the leakage current of the transistor M70 in an off state is not completely zero, in the case where data "1" is held at the node FN, the voltage of the node FN gradually decreases until the next data "1" is written, as indicated by a dotted line. As described above, because Vth of the transistor M70 is shifted in the positive direction by applying a negative voltage VBG to a back gate, the leakage current of the transistor M70 is extremely low. Therefore, the voltage that is recognized as the data "1" can be held at the node FN for a period of years (e.g., 10 years, approximately).

A period T4 is a reading operation period. RWL in a row from which data is read becomes "L", turning on the transistor M71 in the row. RWL in the other rows remains in the "H" level. In the case where "1" is stored in the memory cell 380, the transistor M72 is in an off state, and thus RBL remains in the "L" level. In the case where "0" is stored, the transistor M72 is also in an on state, so that the transistors M71 and M72 connect RBL to SL; accordingly, the voltage level of RBL becomes "H". The voltage level of a signal read to RBL is inverted by the inverter CINV and output to the wiring DO.

In a period T5, the memory portion 240 is in a stand-by state, in which the voltage level of the node FN and the wiring is the same as that in the period T1.
(Power Blocking Period)

As described above, even when the RFID tag 200 does not generate electromotive force, the VBGGENC 226 can keep supplying the negative voltage VBG to the memory portion 240. Therefore, even in a power blocking state, Vth of the transistor M70 can be adjusted; accordingly, a change in the voltage of the node FN is similar to that in the stand-by state in the periods T3 and T5. In other words, by appropriately setting the capacitance of the capacitor C70, the value of VBG and the like, the memory portion 240 can retain data for a period of years (e.g., 10 years, approximately) in a power blocking state.
<Structure Example 2 and Operation Example 2 of Memory Cell>

Figure 23:
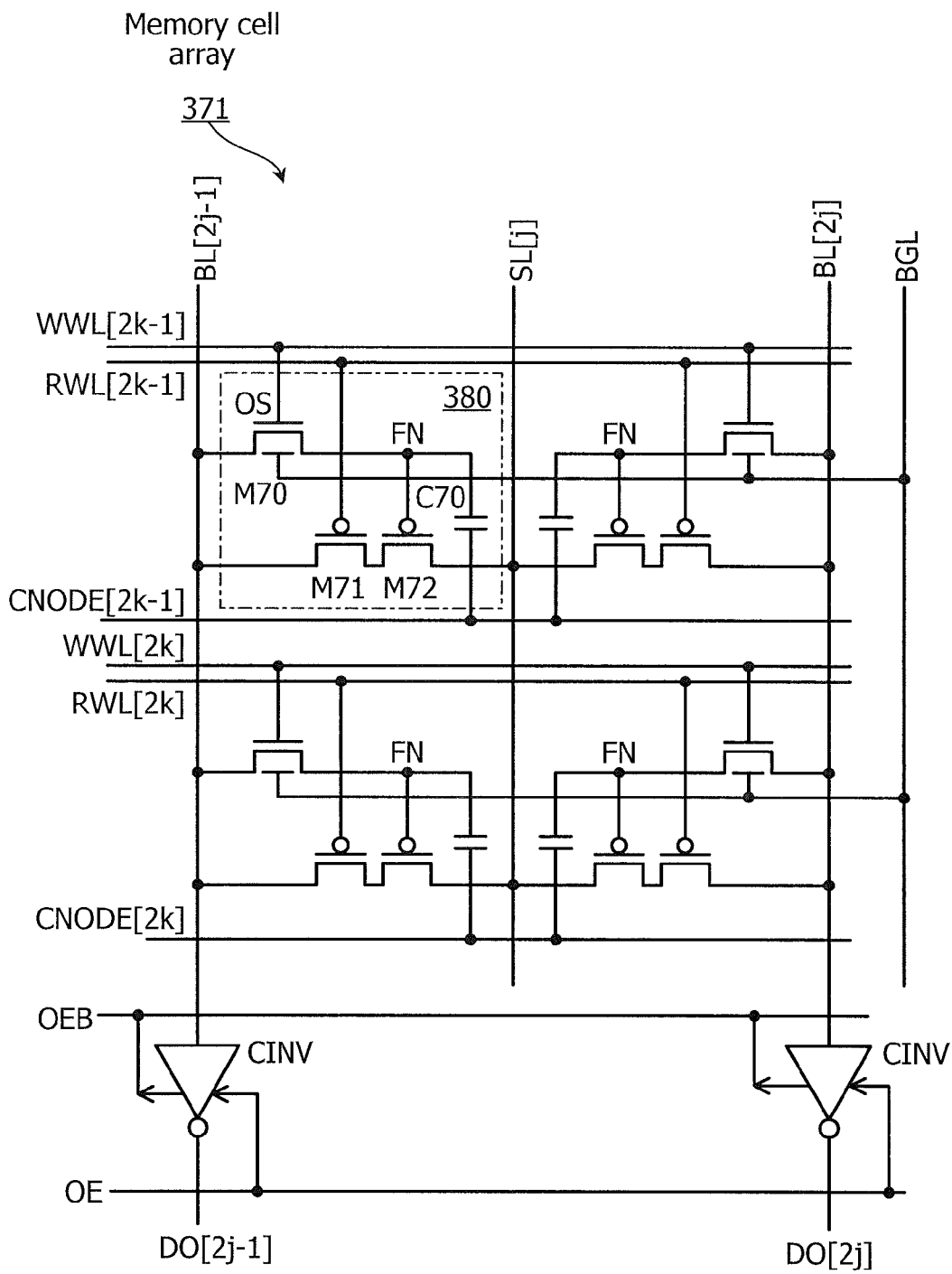
FIG. 23 is a circuit diagram illustrating a structure example of a memory cell array.

FIG. 23 illustrates another structure example of the memory cell array. A memory cell array 371 illustrated in FIG. 23 is a modification example of the memory cell array 370. The memory cell array 371 is different from the memory cell array 370 in having a wiring BL serving as both the wiring WBL and the wiring RBL. That is, in the example of FIG. 21, two kinds of bit lines which are for writing and for reading are provided, while in the example of FIG. 23, one kind of bit line is provided.

Figure 24:
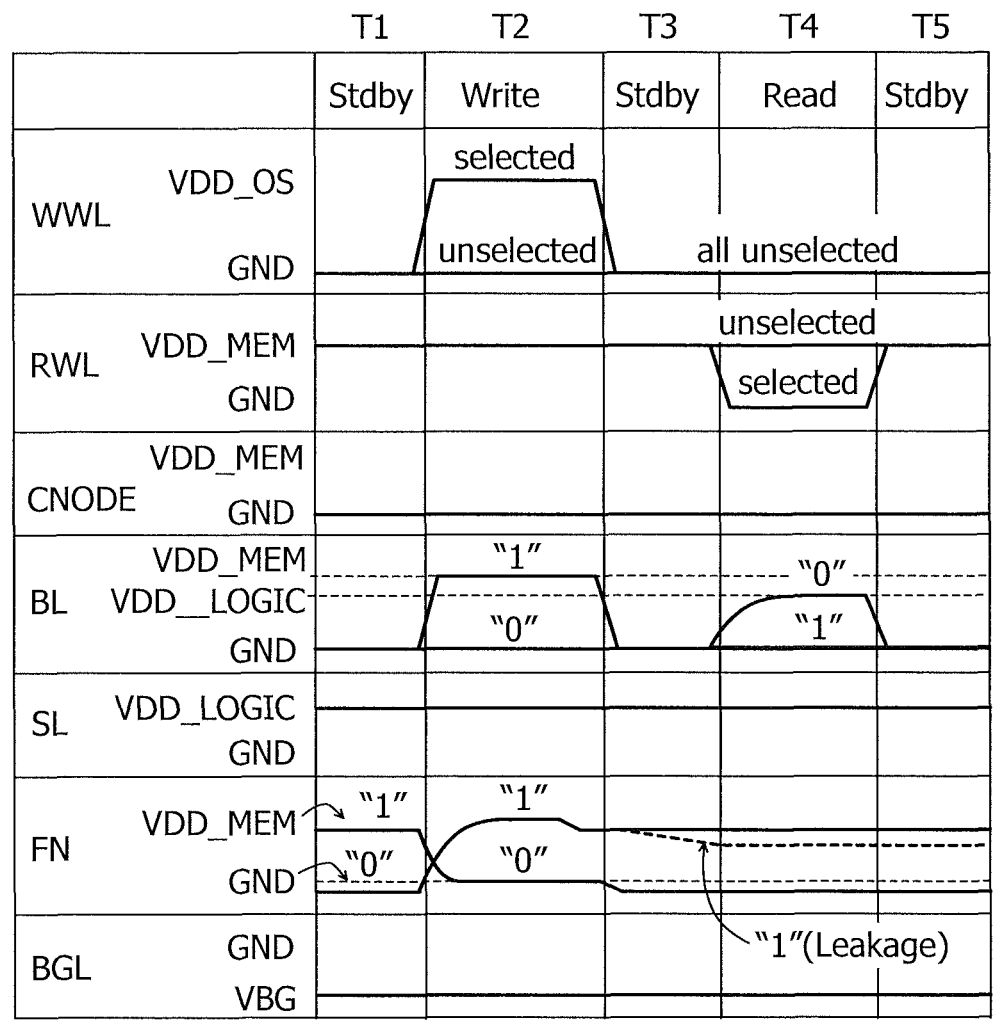
FIG. 24 is a timing chart showing an operation example of a memory portion.

FIG. 24 is a timing chart showing an operation example of the memory cell array 371. As shown in FIG. 24, the memory cell array 371 can be driven in a manner similar to that of the memory cell array 370. BL has both functions of WBL and RBL. In the writing operation period (T2), in the case of writing "1" to the memory cell 380, BL is "H"; while in the case of writing "0", BL is "L". In the reading operation period (T4), in the case where "1" is stored in the memory cell 380, the transistor M72 is in an off state, and thus BL remains in the "L" level. In the case where "0" is stored, the transistor M72 is also in an on state, so that the transistors M71 and M72 connect BL to SL; accordingly, the voltage level of BL becomes "H". The logical value of a signal read to BL is inverted by the inverter CINV and output to the wiring DO.
<Another Structure Example of Memory Cell>

The structure of the memory cell array in the memory portion 240 is not limited to the examples illustrated in FIG. 21 and FIG. 23 as long as the memory portion 240 includes a memory cell including an OS transistor that controls the conduction state between a charge holding portion (node FN) and a wiring for supplying writing data (bit line). Some other structure examples of the memory cell will be described below.

For example, in the memory cell 380, the transistors M71 and M72 can be n-channel Si transistors. Although CNODE is provided in each row, in the case of supplying a constant voltage (GND), CNODE can be shared by different rows, like BGL, in the memory cell arrays 370 and 371. The same can apply to SL. Without providing the transistor M71, the word line for writing and the word line for reading can be combined. Furthermore, like a general DRAM memory cell, the memory cell can consist of only the transistor M70 and the capacitor C70.
<<Another Structure Example of RFID Tag>>

Figure 25:
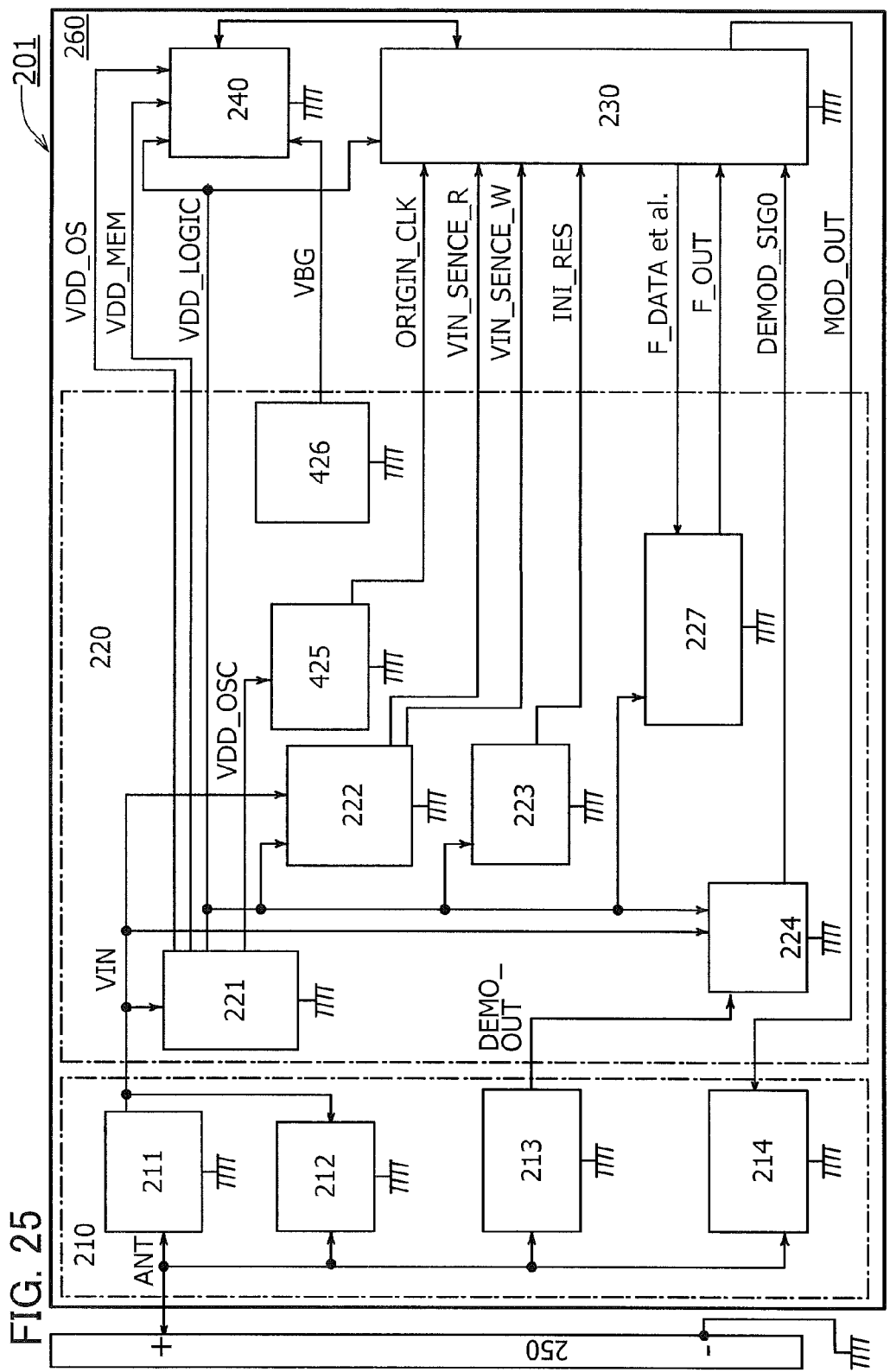
FIG. 25 is a block diagram illustrating a structure example of an RFID tag.

A modification example of the RFID tag 200 will be described below. FIG. 25 is a block diagram illustrating a structure example of the RFID tag.

The RFID tag 200 generates a voltage from a received signal in the power supply circuit 221 and by using the voltage, generates the negative voltage VBG used in the logic portion 230 in the voltage generation circuit (VBGGENC) 226. As illustrated in FIG. 25, an RFID tag 201 includes, instead of the VBGGENC, a circuit (a negative bias circuit 426) having a function of holding the negative voltage VBG The RFID tag 201 includes an oscillator circuit 425 having a different structure from the oscillator circuit 225.

Figure 26:
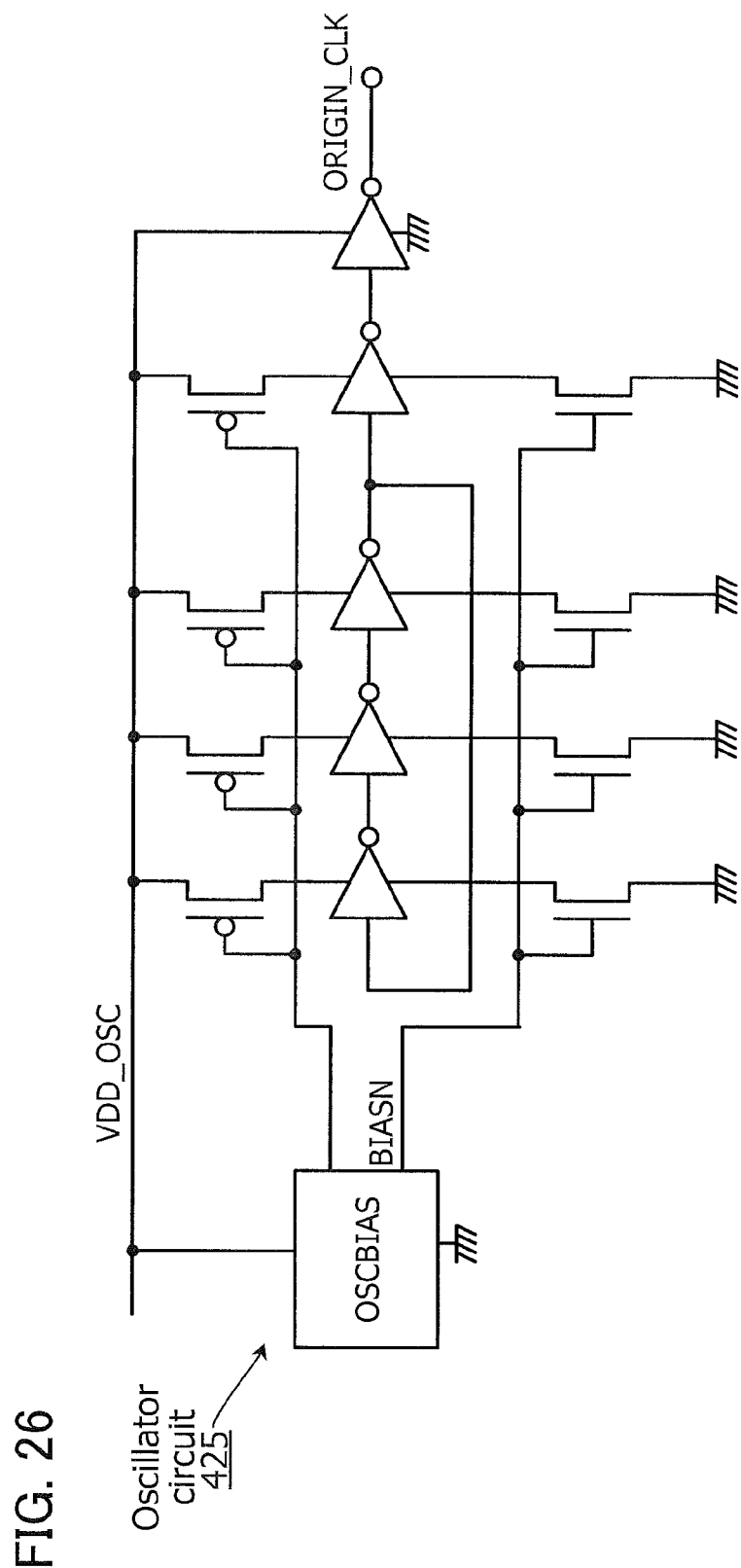
FIG. 26 is a circuit diagram illustrating a structure example of an oscillator circuit.

FIG. 26 is a circuit diagram illustrating a structure example of the oscillator circuit 425. The oscillator circuit 425 has a circuit structure in which the inverter connected to the output node of the signal ORIGIN_CLK is omitted from the oscillator circuit 225 of FIG. 14A.

Figure 27:
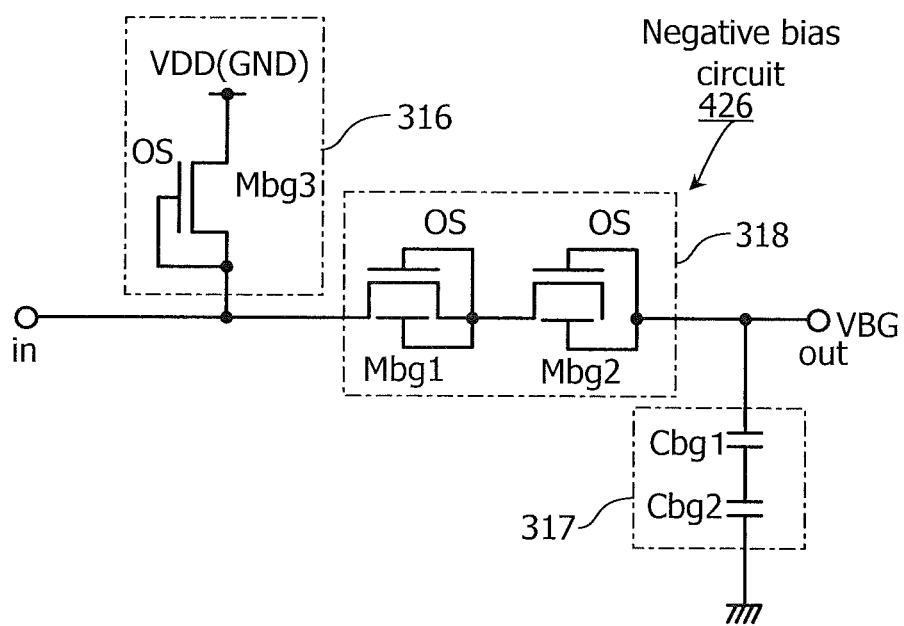
FIG. 27 is a circuit diagram illustrating a structure example of a negative bias circuit.

FIG. 27 is a circuit diagram illustrating a structure example of the negative bias circuit 426. The negative bias circuit 426 includes a protection circuit 316, a capacitor portion 317, and a circuit 318.

In the negative bias circuit 426, the capacitor portion 317 is connected between the output terminal (out) and a wiring to which a ground potential is applied. This capacitor portion 317 is provided to hold the potential of the output terminal (out) and in this example includes a capacitor Cbg1 and a capacitor Cbg2 that are serially connected. The structure of the capacitor portion 317 is not limited to the example illustrated in FIG. 27 and may include only one capacitor. A plurality of capacitors can be connected in series or in parallel to form the capacitor portion 317.

The input node of the capacitor portion 317 is connected to the input terminal (in) through the circuit 318. The circuit 318 is a circuit with a rectifying function. The circuit 318 is provided to rectify current so that current flows from the input terminal (in) toward the output terminal (out) (the input node of the capacitor portion 317). For example, the circuit 318 can be formed of one diode or a plurality of diodes connected in series. Here, the circuit 318 is formed of diode-connected transistors Mbg1 and Mbg2. Note that the transistors Mbg1 and Mbg2 have back gates connected to their respective gates.

The protection circuit 316 has a function of an electrostatic discharge (ESD) protection circuit that protects a circuit connected to the negative bias circuit 426 from ESD. Here, the protection circuit 316 includes a diode-connected transistor Mbg3. A voltage VDD or a ground potential (GND) is input to a source or a drain of the transistor Mbg3.

In the manufacturing process of the RFID tag 201, a negative voltage is applied to the input terminal (in) to charge the capacitors Cbg1 and Cbg2. The voltage of the output terminal (out) (VGB) is held in the capacitors Cbg1 and Cbg2. The voltage VBG is a negative voltage. The voltage VBG held in the negative bias circuit 426 is applied to the memory cell array 370 or 371 of the memory portion.

When the transistors Mbg1 and Mbg2 are OS transistors, leakage of charges from the capacitors Cbg1 and Cbg2 can be prevented. This allows the application of VBG by the negative bias circuit 426 to the memory portion 240 regardless of the reception status of the RFID tag 201.

[Effects]

The RFID tag of this embodiment has the following effects, for example, by including a negative voltage generation circuit (VBGENC) using an OS transistor and a memory using an OS transistor (hereinafter referred to as an OS memory).

(1) Data writing to the OS memory is performed by turning on the OS transistor; thus, high voltage for injecting charges to a floating gate is not necessary unlike in a flash memory (EEPROM). By using the OS memory, a memory portion can operate with low voltage. Thus, the RFID tag capable of long-distance communication can be provided.

(2) The RFID tag can be used in higher-temperature environment than the RFID tag in which transistors are Si transistors only.

The RFID tag operates using data stored in the memory portion. As described above, the off-state current of the OS transistor hardly varies at 150° C. or higher; in the example of FIG. 30A, the off-state current is lower than the lower limit of measurement. That is, the OS memory can keep data in high-temperature environment of 100° C. or higher. Accordingly, although the communication in the high-temperature environment is difficult, the RFID tag does not lose data stored in the memory portion owing to the OS memory. Thus, even after being exposed to the high-temperature environment, the RFID tag can carry out communication in the environment where a Si transistor can operate. This will be proved in Example 1.

(3) Because the OS memory incorporated in the RFID tag has a structure in which data is rewritten by turning on or off the OS transistor, it has higher deterioration resistance than an EEPROM that uses a floating gate. Accordingly, the RFID tag is very suitable for a system with frequent communication such as the system in which data of the memory portion 240 is frequently rewritten.

(4) Furthermore, the RFID tag 200 illustrated in FIG. 7 can generate VBG for increasing retention characteristics of the OS memory from a received signal, which leads to the following advantages over the RFID tag 201. For example, the productivity is increased and thus the inspection step at the manufacture can be simplified. In addition, a reduction in yield due to ESD breakdown can be prevented. Moreover, the circuit portion 260 can be prevented from having a complicated structure.

In the case of not generating the negative voltage VBG internally like the RFID tag 201, a capacitor for holding VBG is provided in the RFID tag. In this case, a step for supplying a negative voltage to this capacitor is necessary at the time of manufacture. In addition, the step for inspecting whether a predetermined negative voltage is supplied to the capacitor is necessary. In contrast, the circuit portion 260 of the RFID tag 200 does not need such steps of supplying a negative voltage or inspecting the supplying step.

To supply a negative voltage to a capacitor, an input terminal for the connection to a supply source of the negative voltage needs to be provided in the circuit portion of the RFID tag. Since this terminal is for applying a negative voltage that is lower than GND, if a high voltage of negative polarity is applied owing to ESD or the like, the high voltage of negative polarity is applied to the capacitor as it is, breaking the capacitor. In order to protect the terminal from the high voltage of negative polarity, the circuit portion may entirely take countermeasures against the negative voltage due to ESD, which may increase the complexity of the structure of the circuit portion. In contrast, the RFID tag 200 can have a structure in which the extraction terminal of the circuit portion 260 is only one terminal for the connection with the antenna 250, as illustrated in FIG. 7.

This embodiment can be implemented in appropriate combination with any of the other embodiments.

(Embodiment 3)

In this embodiment, a specific device structure of the RFID tag 200 will be described.

<<Device Structure of Circuit Portion 260>>

FIG. 28A is a cross-sectional view illustrating an example of a device structure of the circuit portion 260 of the RFD tag 200. A die 600 illustrated in FIG. 28A is included in an IC chip of the circuit portion 260. FIG. 28A typically illustrates a cross-sectional structure of an element constituting the VBGGENC 226. Note that FIG. 28A is not a cross-sectional view of the die 600 taken along a specific section line but a drawing for illustrating a layered structure of the die 600 (circuit portion 260).

Here, the die 600 is manufactured using a semiconductor substrate. A bulk single crystal silicon wafer 601 is used as the semiconductor substrate. Note that a substrate for forming a backplane of the die 600 is not limited to the bulk single crystal silicon wafer but can be any of a variety of semiconductor substrates. For example, an SOI semiconductor substrate including a single crystal silicon layer may be used.

Transistors Mp1 and Mn1 are Si transistors included in the inverter 301. The transistor Mp1 is a p-channel transistor, and the transistor Mn1 is an n-channel transistor. As an element included in the charge pump circuit 303, the first-stage fundamental circuit (the transistor M1, the capacitor C1) is illustrated in FIG. 28A. By stacking the charge pump circuit 303 over a circuit formed using a Si transistor, such as the level shifter 300, the area overhead due to incorporation of the VBGGENC 226 in the circuit portion 260 can be reduced.

Also in the memory portion 240, the OS transistor (M70) and the capacitor C70 included in the memory cell 380 are stacked over the Si transistors M71 and M72. This can downsize the memory portion 240, leading to higher density.

The transistors Mp1 and Mn1 can be formed using the single crystal silicon wafer 601 by any of a variety of CMOS processes. The insulating layer 610 is an insulator for electrically disconnecting the transistors Mp1 and Mn1. An insulating layer 611 is formed to cover the transistors Mp1 and Mn1. Conductors 635 to 637 are formed over the insulating layer 611. Conductors 631 to 634 are formed in openings provided in the insulating layer 611, and as illustrated, the transistors Mp1 and Mn1 are connected to the conductors 635 to 637. The conductors 635 and 637 are wirings that supply VDD_OS and GND to the inverter 301. The conductor 636 serves as the output terminal of the inverter 301.

One or more wiring layers are formed over the transistors Mp1 and Mn1 by the back end of the line (BEOL) process. Here, insulating layers 612 to 614 and conductors 641 to 646 are formed; thus, three wiring layers are formed.

An insulating layer 615 is formed so as to cover the conductor 646. The transistor M1 and the capacitor C1 are formed over the insulating layer 615.

The transistor M1 includes an oxide semiconductor (OS) layer 660 and conductors 672, 673, 682, and 683. A channel formation region exists in the OS layer 660. The conductor 682 serves as a gate electrode, and the conductor 683 serves as a back gate electrode. The conductors 672 and 673 serve as a drain electrode and a source electrode. The conductor 682 is connected to the conductor 672 by the conductor 692. The conductor 682 overlaps with the OS layer 660 with an insulating layer 617 interposed therebetween. The conductor 683 overlaps with the OS layer 660 with the insulating layer 616 interposed therebetween. The insulating layer 617 serves as a gate insulating layer, and the insulating layer 616 serves as a gate insulating layer on the back gate side.

The capacitor C1 is a MIM capacitor, including the conductor 672 and a conductor 681 as electrodes and the insulating layer 617 as a dielectric (insulating film). A conductor 671 serves as an electrode for connecting the capacitor C1 to the inverter 301 and is connected to the conductor 646. The capacitor C1 is manufactured in the manufacturing process of the transistor M1 here; however, the capacitor C1 may be manufactured in the manufacturing process of the transistors Mp1 and Mn1.

An insulating layer 618 functioning as a passivation film is formed to cover the transistor M1 and the capacitor C1. An insulating layer 619 is formed to cover the insulating layer 618. A conductor 691 and a conductor 692 are formed over the insulating layer 619. The conductor 671 is connected to the electrode (the conductor 681) of the capacitor C1 by the conductor 691. The gate electrode (the conductor 682) of the transistor M1 is connected to the drain electrode (the conductor 672) by the conductor 692.

The insulating layers 610 to 619 can be formed using a single layer of an insulating film or two or more layers of insulating films. Examples of the insulating film used for each of the insulating layers 610 to 619 include an aluminum oxide film, a magnesium oxide film, a silicon oxide film, a silicon oxynitride film, a silicon nitride oxide film, a silicon nitride film, a gallium oxide film, a germanium oxide film, an yttrium oxide film, a zirconium oxide film, a lanthanum oxide film, a neodymium oxide film, a hafnium oxide film, and a tantalum oxide film. These insulating films can be formed by a sputtering method, a CVD method, an MBE method, an ALD method, or a PLD method. As a film used for each of the insulating layers 610 to 619, a resin film of polyimide, acrylic, or the like can be formed.

Note that in this specification, an oxynitride refers to a substance that contains more oxygen than nitrogen, and a nitride oxide refers to a substance that contains more nitrogen than oxygen.

The conductors 631 to 637, 641 to 646, 671 to 673, 681, 682, 691, 692 can be formed using a single layer of conductive film or two or more layers of conductive films. Such conductive films are metal films containing aluminum, chromium, copper, silver, gold, platinum, tantalum, nickel, titanium, molybdenum, tungsten, hafnium, vanadium, niobium, manganese, magnesium, zirconium, beryllium, and the like. Such conductive films can be alloy films containing any of these metal elements as a component, compound films containing any of these metal elements as a component, or polycrystalline silicon films containing an impurity element such as phosphorus, or the like.

The structures of the Si transistors Mp1 and Mn1 and the OS transistor M1 included in the die 600 are not limited to the structures illustrated in FIG. 28A. For example, the OS transistor can have a structure illustrated in FIG. 28B. In the example of FIG. 28B, the transistor M1 is further provided with an OS layer 661. Also in the case of FIG. 28B, a channel formation region is provided in the OS layer 660.

To form the transistor M1 of FIG. 28B, after the conductors 671 to 673 are formed, one layer of oxide semiconductor film or two or more layers of oxide semiconductor films for forming the OS layer 661, an insulating film for forming the insulating layer 617, and a conductive film for forming the conductors 681 and 682 are stacked. Then, by etching this stacked film with the use of a resist mask for etching the conductive film, the OS layer 661, the insulating layer 617, and the conductors 681 and 682 are formed. In the capacitor C1, the insulating layer 617 in a region that is not covered with the conductor 681 is removed.

<<Oxide Semiconductor>>

Next, the oxide semiconductor used in the OS transistor will be described.

The channel formation region of the OS transistor is preferably formed using a highly purified oxide semiconductor (purified OS). A purified OS refers to an oxide semiconductor obtained by reduction of impurities such as moisture or hydrogen that serve as electron donors (donors) and reduction of oxygen vacancies. By highly purifying an oxide semiconductor in this manner, the conductivity type of the oxide semiconductor can be intrinsic or substantially intrinsic. The term "substantially intrinsic" means that the carrier density of an oxide semiconductor is lower than $1\times10^{17}/cm^3$. The carrier density is preferably lower than $1\times10^{15}/cm^3$, further preferably lower than $1\times10^{13}/cm^3$.

By forming the channel formation region using a purified OS, the normalized off-state current of the OS transistor can be as low as several yoctoamperes per micrometer to several zeptoamperes per micrometer at room temperature.

In the oxide semiconductor, hydrogen, nitrogen, carbon, silicon, and metal elements that are not main components are impurities. For example, hydrogen and nitrogen form donor levels to increase the carrier density. Silicon forms impurity levels in the oxide semiconductor. The impurity level becomes a trap, which might degrade the electrical characteristics of the OS transistor. It is preferable to reduce the concentration of the impurities in the oxide semiconductor and at an interface with another layer.

To make the oxide semiconductor intrinsic or substantially intrinsic, the oxide semiconductor is preferably highly purified to approximately any of the following impurity concentration levels. The following impurity concentrations are obtained by secondary ion mass spectrometry (SIMS) analysis at a certain depth of an oxide semiconductor layer or in a certain region of the oxide semiconductor. The purified OS has any of the following impurity concentration levels.

For example, in the case where the impurity includes silicon, the concentration of silicon is lower than $1\times10^{19}$ atoms/$cm^3$, preferably lower than $5\times10^{18}$ atoms/$cm^3$, further preferably lower than $1\times10^{18}$ atoms/$cm^3$.

For example, in the case where the impurity includes hydrogen, the concentration of hydrogen is lower than or equal to $2\times10^{20}$ atoms/$cm^3$, preferably lower than or equal to $5\times10^{19}$ atoms/$cm^3$, further preferably lower than or equal to $1\times10^{19}$ atoms/$cm^3$, still further preferably lower than or equal to $5\times10^{18}$ atoms/$cm^3$.

For example, in the case where the impurity includes nitrogen, the concentration of nitrogen is lower than $5\times10^{19}$ atoms/$cm^3$, preferably lower than or equal to $5\times10^{18}$ atoms/$cm^3$, further preferably lower than or equal to $1\times10^{18}$ atoms/$cm^3$, still further preferably lower than or equal to $5\times10^{17}$ atoms/$cm^3$.

In the case where the oxide semiconductor including crystals contains silicon or carbon at high concentration, the crystallinity of the oxide semiconductor might be lowered. In order not to lower the crystallinity of the oxide semiconductor, for example, the concentration of silicon is set lower than $1\times10^{19}$ atoms/cm$^3$, preferably lower than $5\times10^{18}$ atoms/cm$^3$, further preferably lower than $1\times10^{18}$ atoms/cm$^3$. For example, the concentration of carbon is set lower than $1\times10^{19}$ atoms/cm$^3$, preferably lower than $5\times10^{18}$ atoms/cm$^3$, further preferably lower than $1\times10^{18}$ atoms/cm$^3$.

As the oxide semiconductor used for the OS transistor, any of the following can be used: indium oxide, tin oxide, zinc oxide, an In—Zn-based oxide, a Sn—Zn-based oxide, an Al—Zn-based oxide, a Zn—Mg-based oxide, a Sn—Mg-based oxide, an In—Mg-based oxide, an In—Ga-based oxide, an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide.

For example, an In—Ga—Zn-based oxide means an oxide containing In, Ga, and Zn, and there is no limitation on the ratio of In, Ga, and Zn. The In—Ga—Zn-based oxide may contain a metal element other than In, Ga, and Zn. An oxide semiconductor having an appropriate composition may be formed in accordance with needed electrical characteristics (e.g., field-effect mobility and threshold voltage).

For example, an In—Ga—Zn-based oxide with an atomic ratio of In:Ga:Zn=1:1:1, In:Ga:Zn=1:3:2, In:Ga:Zn=3:1:2, or In:Ga:Zn=2:1:3, or an oxide whose composition is in the neighborhood of the above composition is preferably used. In this specification, the atomic ratio of the oxide semiconductor varies within a range of ±20% as an error.

For example, the oxide semiconductor film in which a channel of the OS transistor is formed can be formed by sputtering.

For example, it is preferable to use an In—Ga—Zn-based oxide target with an atomic ratio of In:Ga:Zn=1:1:1, 5:5:6, 4:2:3, 3:1:2, 1:1:2, 2:1:3, 1:3:2, 1:3:4, 1:6:4, or 3:1:4 as an In—Ga—Zn-based oxide deposition target. When an In—Ga—Zn-based oxide semiconductor film is deposited using such a target, a crystal part is formed in the oxide semiconductor film easily. The filling factor of such a target is preferably higher than or equal to 90%, further preferably higher than or equal to 95%. With a target having a high filling factor, a dense oxide semiconductor film can be deposited.

For example, it is preferable to use an In—Zn-based oxide target with an atomic ratio of In:Zn=50:1 to 1:2 (a molar ratio of $In_2O_3$:ZnO=25:1 to 1:4) as an In—Zn-based oxide deposition target. The atomic ratio of In:Zn is preferably 15:1 to 1.5:1 (the molar ratio of $In_2O_3$:ZnO=3:4 to 15:2). For example, in an In—Zn-based oxide deposition target with an atomic ratio of In:Zn:O=X:Y:Z, the relation Z>1.5X+Y is preferably satisfied. The mobility of an In—Zn-based oxide film can be increased by keeping the ratio of Zn within the above range.

<Structure of Oxide Semiconductor Film>

The structure of the oxide semiconductor film cable of being used as an OS layer of an OS transistor will be described below.

In this specification, the trigonal and rhombohedral crystal systems are included in the hexagonal crystal system.

In the description of a crystal structure, the term "parallel" indicates that the angle formed between two straight lines is greater than or equal to −10° and less than or equal to 10°, and accordingly also includes the case where the angle is greater than or equal to −5° and less than or equal to 5°. In addition, the term "substantially parallel" indicates that the angle formed between two straight lines is greater than or equal to −30° and less than or equal to 30°. In addition, the term "perpendicular" indicates that the angle formed between two straight lines is greater than or equal to 80° and less than or equal to 100°, and accordingly includes the case where the angle is greater than or equal to 85° and less than or equal to 95°. In addition, the term "substantially perpendicular" indicates that the angle formed between two straight lines is greater than or equal to 60° and less than or equal to 120°.

An oxide semiconductor film is roughly classified into a single crystal oxide semiconductor film and a non-single-crystal oxide semiconductor film. The non-single-crystal oxide semiconductor film means any of an amorphous oxide semiconductor film, a microcrystalline oxide semiconductor film, a polycrystalline oxide semiconductor film, a c-axis aligned crystalline oxide semiconductor (CAAC-OS) film, and the like.

<CAAC-OS Film>

The CAAC-OS film will be described in detail below.

The CAAC-OS film is one of oxide semiconductor films having a plurality of c-axis aligned crystal parts. With a transmission electron microscope (TEM), a combined analysis image (also referred to as a high-resolution TEM image) of a bright-field image and a diffraction pattern of the CAAC-OS film is observed. Consequently, a plurality of crystal parts are observed clearly. However, in the high-resolution TEM image, a boundary between crystal parts, i.e., a grain boundary is not observed clearly. Thus, in the CAAC-OS film, a reduction in electron mobility due to the grain boundary is unlikely to occur.

According to the high-resolution cross-sectional TEM image of the CAAC-OS film observed in a direction substantially parallel to a sample surface, metal atoms are arranged in a layered manner in the crystal parts. Each metal atom layer has a morphology reflecting a surface over which the CAAC-OS film is formed (also referred to as a formation surface) or a top surface of the CAAC-OS film, and is provided parallel to the formation surface or the top surface of the CAAC-OS film.

On the other hand, according to the high-resolution planar TEM image of the CAAC-OS film observed in a direction substantially perpendicular to the sample surface, metal atoms are arranged in a triangular or hexagonal configuration in the crystal parts. However, there is no regularity of arrangement of metal atoms between different crystal parts.

Note that in an electron diffraction pattern of the CAAC-OS film, spots (luminescent spots) having alignment are shown. For example, spots are observed in an electron diffraction pattern (also referred to as a nanobeam electron diffraction pattern) of the top surface of the CAAC-OS film which is obtained using an electron beam with a diameter of, for example, larger than or equal to 1 nm and smaller than or equal to 30 nm.

From the results of the cross-sectional TEM image and the plan TEM image, alignment is found in the crystal parts in the CAAC-OS film.

Most of the crystal parts included in the CAAC-OS film each fit into a cube whose one side is less than 100 nm. Thus, there is a case where a crystal part included in the CAAC-OS film fits into a cube whose one side is less than 10 nm, less than 5 nm, or less than 3 nm. Note that when a plurality of crystal parts included in the CAAC-OS film are connected to each other, one large crystal region is formed in some cases. For example, a crystal region with an area of larger than or equal to 2500 nm$^2$, larger than or equal to 5 μm$^2$, or larger than or equal to 1000 μm$^2$ is observed in some cases in the planar TEM image.

The CAAC-OS film is subjected to structural analysis with an X-ray diffraction (XRD) apparatus. For example, when the CAAC-OS film including an InGaZnO$_4$ crystal is analyzed by an out-of-plane method, a peak appears frequently when the diffraction angle (2θ) is around 31°. This peak is derived from the (009) plane of the InGaZnO$_4$ crystal, which indicates that crystals in the CAAC-OS film have c-axis alignment, and that the c-axes are aligned in a direction substantially perpendicular to the formation surface or the top surface of the CAAC-OS film.

On the other hand, when the CAAC-OS film is analyzed by an in-plane method in which an X-ray enters a sample in a direction substantially perpendicular to the c-axis, a peak appears frequently when 2θ is around 56°. This peak is derived from the (110) plane of the InGaZnO$_4$ crystal. Here, analysis (φ scan) is performed under conditions where the sample is rotated around a normal vector of a sample surface as an axis (φ axis) with 2θ fixed at around 56°. In the case where the sample is a single crystal oxide semiconductor film of InGaZnO$_4$, six peaks appear. The six peaks are derived from crystal planes equivalent to the (110) plane. In contrast, in the case of a CAAC-OS film, a peak is not clearly observed even when φ scan is performed with 2θ fixed at around 56°.

According to the above results, in the CAAC-OS film having c-axis alignment, while the directions of a-axes and b-axes are different between crystal parts, the c-axes are aligned in a direction parallel to a normal vector of a formation surface or a normal vector of a top surface. Thus, each metal atom layer which is arranged in a layered manner and observed in the cross-sectional TEM image corresponds to a plane parallel to the a-b plane of the crystal.

Note that the crystal part is formed concurrently with deposition of the CAAC-OS film or is formed through crystallization treatment such as heat treatment. As described above, the c-axis of the crystal is aligned in a direction parallel to a normal vector of a formation surface or a normal vector of a top surface of the CAAC-OS film. Thus, for example, in the case where the shape of the CAAC-OS film is changed by etching or the like, the c-axis might not be necessarily parallel to a normal vector of a formation surface or a normal vector of a top surface of the CAAC-OS film.

Further, distribution of c-axis aligned crystal parts in the CAAC-OS film is not necessarily uniform. For example, in the case where crystal growth leading to the crystal parts of the CAAC-OS film occurs from the vicinity of the top surface of the CAAC-OS film, the proportion of the c-axis aligned crystal parts in the vicinity of the top surface is higher than that in the vicinity of the formation surface in some cases. Further, when an impurity is added to the CAAC-OS film, a region to which the impurity is added is altered, and the proportion of the c-axis aligned crystal parts in the CAAC-OS film varies depending on regions, in some cases.

Note that when the CAAC-OS film with an InGaZnO$_4$ crystal is analyzed by an out-of-plane method, a peak may also be observed at 2θ of around 36°, in addition to the peak at 2θ of around 31°. The peak at 2θ of around 36° indicates that a crystal having no c-axis alignment is included in part of the CAAC-OS film. It is preferable that in the CAAC-OS film, a peak appear at 2θ of around 31° and a peak do not appear at 2θ of around 36°.

The CAAC-OS film is an oxide semiconductor film having low impurity concentration. The impurity is an element other than the main components of the oxide semiconductor film, such as hydrogen, carbon, silicon, or a transition metal element. In particular, an element that has higher bonding strength to oxygen than a metal element included in the oxide semiconductor film, such as silicon, disturbs the atomic order of the oxide semiconductor film by depriving the oxide semiconductor film of oxygen and causes a decrease in crystallinity. Furthermore, a heavy metal such as iron or nickel, argon, carbon dioxide, or the like has a large atomic radius (molecular radius), and thus disturbs the atomic order of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having a low density of defect states. In some cases, oxygen vacancies in the oxide semiconductor film serve as carrier traps or serve as carrier generation sources when hydrogen is captured therein.

The state in which impurity concentration is low and density of defect states is low (the number of oxygen vacancies is small) is referred to as a "highly purified intrinsic" or "substantially highly purified intrinsic" state. A highly purified intrinsic or substantially highly purified intrinsic oxide semiconductor film has few carrier generation sources, and thus can have a low carrier density. Thus, a transistor including the oxide semiconductor film rarely has negative threshold voltage (is rarely normally on). The highly purified intrinsic or substantially highly purified intrinsic oxide semiconductor film has few carrier traps. Accordingly, the transistor including the oxide semiconductor film has little variation in electrical characteristics and high reliability. Electric charge trapped by the carrier traps in the oxide semiconductor film takes a long time to be released, and might behave like fixed electric charge. Thus, the transistor which includes the oxide semiconductor film having high impurity concentration and a high density of defect states has unstable electrical characteristics in some cases.

In an OS transistor including the CAAC-OS film, changes in electrical characteristics of the transistor due to irradiation with visible light or ultraviolet light are small. Thus, the transistor has high reliability.

For example, a CAAC-OS film is deposited by sputtering with a polycrystalline metal oxide target. When ions collide with the target, a crystal region included in the target might be separated from the target along the a-b plane, and a sputtered particle having a plane parallel to the a-b plane (flat-plate-like or pellet-like sputtered particle) might be separated from the target. In that case, the flat-plate-like or pellet-like sputtered particle reaches a substrate while maintaining its crystal state, so that the CAAC-OS film can be deposited.

By reducing the amount of impurities entering the CAAC-OS film during the deposition, the crystal state can be prevented from being broken by the impurities. For example, the concentration of impurities (e.g., hydrogen, water, carbon dioxide, or nitrogen) which exist in a treatment chamber may be reduced. Furthermore, the concentration of impurities in a deposition gas may be reduced. Specifically, a deposition gas whose dew point is lower than or equal to −80° C., preferably lower than or equal to −100° C. is used.

By increasing the substrate heating temperature during the deposition, when the flat-plate-like or pellet-like sputtered particle reaches the substrate, migration occurs on the substrate, so that a flat plane of the sputtered particle is attached to the substrate. For example, the substrate heating temperature during the deposition is higher than or equal to 100° C. and lower than or equal to 740° C., preferably higher than or equal to 200° C. and lower than or equal to 500° C.

Furthermore, it is possible to reduce plasma damage during the deposition by increasing the proportion of oxygen in the deposition gas and optimizing power. For example, the proportion of oxygen in the deposition gas is higher than or equal to 30 vol %, preferably 100 vol %.

<Polycrystalline Oxide Semiconductor Film>

Next, a polycrystalline oxide semiconductor film will be described.

In an image of a polycrystalline oxide semiconductor film which is obtained with a TEM, crystal grains can be found. In most cases, the size of a crystal grain in the polycrystalline oxide semiconductor film is greater than or equal to 2 nm and less than or equal to 300 nm, greater than or equal to 3 nm and less than or equal to 100 nm, or greater than or equal to 5 nm and less than or equal to 50 nm in an image obtained with the TEM, for example. Moreover, in an image of the polycrystalline oxide semiconductor film which is obtained with the TEM, a crystal grain boundary can be found in some cases.

The polycrystalline oxide semiconductor film may include a plurality of crystal grains, and alignment of crystals may be different in the plurality of crystal grains. A polycrystalline oxide semiconductor film is subjected to structural analysis with an XRD apparatus. For example, when the polycrystalline oxide semiconductor film including an $InGaZnO_4$ crystal is analyzed by an out-of-plane method, peaks appear at 2θ of around 31°, 36°, and the like in some cases.

The polycrystalline oxide semiconductor film has high crystallinity and thus has high electron mobility in some cases. Accordingly, a transistor including the polycrystalline oxide semiconductor film has high field-effect mobility. Note that there are cases in which an impurity is segregated at the crystal grain boundary in the polycrystalline oxide semiconductor film. Moreover, the crystal grain boundary of the polycrystalline oxide semiconductor film serves as a defect state. Since the crystal grain boundary of the polycrystalline oxide semiconductor film may serve as a carrier trap or a carrier generation source, a transistor including the polycrystalline oxide semiconductor film has larger variation in electrical characteristics and lower reliability than a transistor including a CAAC-OS film in some cases.

<Microcrystalline Oxide Semiconductor Film>

Next, a microcrystalline oxide semiconductor film will be described.

A microcrystalline oxide semiconductor film has a region in which a crystal part is observed and a region in which a crystal part is not observed clearly in a high-resolution TEM image. In most cases, a crystal part in the microcrystalline oxide semiconductor film is greater than or equal to 1 nm and less than or equal to 100 nm, or greater than or equal to 1 nm and less than or equal to 10 nm. A microcrystal with a size greater than or equal to 1 nm and less than or equal to 10 nm, or a size greater than or equal to 1 nm and less than or equal to 3 nm is specifically referred to as nanocrystal (nc). An oxide semiconductor film including nanocrystal is referred to as a nanocrystalline oxide semiconductor (nc-OS) film. In a high-resolution TEM image of the nc-OS film, a crystal grain boundary cannot be found clearly in the nc-OS film in some cases.

In the nc-OS film, a microscopic region (for example, a region with a size greater than or equal to 1 nm and less than or equal to 10 nm, in particular, a region with a size greater than or equal to 1 nm and less than or equal to 3 nm) has a periodic atomic order. Note that there is no regularity of crystal orientation between different crystal parts in the nc-OS film. Thus, the orientation of the whole film is not observed. Accordingly, in some cases, the nc-OS film cannot be distinguished from an amorphous oxide semiconductor film depending on the analysis method. For example, when the nc-OS film is subjected to structural analysis by an out-of-plane method with an XRD apparatus using an X-ray having a diameter larger than that of a crystal part, a peak which shows a crystal plane does not appear. Further, a diffraction pattern like a halo pattern appears in a selected-area electron diffraction pattern of the nc-OS film which is obtained by using an electron beam having a probe diameter (e.g., larger than or equal to 50 nm) larger than the diameter of a crystal part. Meanwhile, spots are shown in a nanobeam electron diffraction pattern of the nc-OS film obtained by using an electron beam having a probe diameter (e.g., larger than or equal to 1 nm and smaller than or equal to 30 nm) close to, or smaller than or equal to the diameter of a crystal part. Further, in a nanobeam electron diffraction pattern of the nc-OS film, regions with high luminance in a circular (ring) pattern are observed in some cases. Also in a nanobeam electron diffraction pattern of the nc-OS film, a plurality of spots are shown in a ring-like region in some cases.

The nc-OS film is an oxide semiconductor film that has high regularity than an amorphous oxide semiconductor film. Thus, the nc-OS film has a lower density of defect states than the amorphous oxide semiconductor film. Note that there is no regularity of crystal orientation between different crystal parts in the nc-OS film; thus, the nc-OS film has a higher density of defect states than the CAAC-OS film.

Thus, the nc-OS film may have a higher carrier density than the CAAC-OS film. The oxide semiconductor film having a high carrier density may have high electron mobility. Thus, a transistor including the nc-OS film may have high field-effect mobility. The nc-OS film has a higher defect state density than the CAAC-OS film, and thus may have many carrier traps. Consequently, a transistor including the nc-OS film has larger variation in electrical characteristics and lower reliability than a transistor including the CAAC-OS film. The nc-OS film can be formed easily as compared with the CAAC-OS film because the nc-OS film can be formed even when a relatively large amount of impurities are included; thus, depending on the purpose, the nc-OS film can be favorably used in some cases. Therefore, a semiconductor device including the transistor including the nc-OS film can be manufactured with high productivity in some cases.

<Amorphous Oxide Semiconductor Film>

Next, an amorphous oxide semiconductor film will be described.

The amorphous oxide semiconductor film has disordered atomic arrangement and no crystal part. For example, the amorphous oxide semiconductor film does not have a specific state as in quartz.

In a high-resolution TEM image of the amorphous oxide semiconductor film, crystal parts cannot be found.

When the amorphous oxide semiconductor film is subjected to structural analysis by an out-of-plane method with an XRD apparatus, a peak that shows a crystal plane does not appear. A halo pattern is shown in an electron diffraction pattern of the amorphous oxide semiconductor film. Furthermore, a halo pattern is shown but a spot is not shown in a nanobeam electron diffraction pattern of the amorphous oxide semiconductor film.

The amorphous oxide semiconductor film contains impurities such as hydrogen at a high concentration. In addition, the amorphous oxide semiconductor film has a high density of defect states.

The oxide semiconductor film having a high impurity concentration and a high density of defect states has many carrier traps or many carrier generation sources.

Accordingly, the amorphous oxide semiconductor film has much higher carrier density than the nc-OS film. Therefore, a transistor including the amorphous oxide semiconductor film tends to be normally on. Thus, in some cases, such an amorphous oxide semiconductor film can be favorably used in a transistor which needs to be normally on. Since the amorphous oxide semiconductor film has a high density of defect states, carrier traps might be increased. Consequently, a transistor including the amorphous oxide semiconductor film in which a channel is formed has larger variation in electric characteristics and lower reliability than a transistor including the CAAC-OS film or the nc-OS film in which a channel is formed.

<Single Crystal Oxide Semiconductor Film>

Next, a single crystal oxide semiconductor film will be described.

The single crystal oxide semiconductor film has a lower impurity concentration and a lower density of defect states (few oxygen vacancies). Thus, the carrier density can be decreased. Accordingly, a transistor including the single crystal oxide semiconductor film is unlikely to be normally on. Moreover, since the single crystal oxide semiconductor film has a lower impurity concentration and a lower density of defect states, carrier traps might be reduced. Thus, the transistor including the single crystal oxide semiconductor film has small variation in electrical characteristics and accordingly has high reliability.

Note that when the oxide semiconductor film has few defects, the density thereof is increased. When the oxide semiconductor film has high crystallinity, the density thereof is increased. When the oxide semiconductor film has a lower concentration of impurities such as hydrogen, the density thereof is increased. The single crystal oxide semiconductor film has a higher density than the CAAC-OS film. The CAAC-OS film has a higher density than the microcrystalline oxide semiconductor film. The polycrystalline oxide semiconductor film has a higher density than the microcrystalline oxide semiconductor film. The microcrystalline oxide semiconductor film has a higher density than the amorphous oxide semiconductor film.

Note that an oxide semiconductor film may have a structure having physical properties between the nc-OS film and the amorphous oxide semiconductor film. The oxide semiconductor film having such a structure is specifically referred to as an amorphous-like oxide semiconductor (a-like OS) film.

In a high-resolution TEM image of the amorphous-like OS film, a void may be seen. Furthermore, in the high-resolution TEM image, there are a region where a crystal part is clearly observed and a region where a crystal part is not observed. In the amorphous-like OS film, crystallization occurs by a slight amount of electron beam used for TEM observation and growth of the crystal part is found sometimes. In contrast, in the nc-OS film having good quality, crystallization is less observed by a slight amount of electron beam used for TEM observation.

Note that the crystal part size in the amorphous-like OS film and the nc-OS film can be measured using high-resolution TEM images. For example, an $InGaZnO_4$ crystal has a layered structure in which two Ga—Zn—O layers are included between In—O layers. A unit cell of the $InGaZnO_4$ crystal has a structure in which nine layers including three In—O layers and six Ga—Zn—O layers are layered in the c-axis direction. Accordingly, the spacing between these adjacent layers is equivalent to the lattice spacing on the (009) plane (also referred to as d value). The value is calculated at 0.29 nm from crystal structure analysis. Thus, each of the lattice fringes in which the spacing therebetween is from 0.28 nm to 0.30 nm corresponds to the a-b plane of the $InGaZnO_4$ crystal, focusing on the lattice fringes in the high-resolution TEM image.

Furthermore, the film density of the oxide semiconductor film varies depending on the structure in some cases. For example, the structure of an oxide semiconductor film can be estimated by comparing the film density of the oxide semiconductor film with the film density of a single crystal oxide semiconductor film having the same composition as the oxide semiconductor film. For example, the film density of the amorphous-like OS film is 78.6% or higher and lower than 92.3% of the film density of the single crystal oxide semiconductor film having the same composition. For example, the film density of the nc-OS film and the CAAC-OS film is 92.3% or higher and lower than 100% of the film density of the single crystal oxide semiconductor film having the same composition. Note that it is difficult to form an oxide semiconductor film having a film density of lower than 78% of the film density of the single crystal oxide semiconductor film having the same composition.

Specific examples of the above description are given. For example, in an oxide semiconductor film in which the atomic ratio of In to Ga and Zn is 1:1:1, the film density of a single crystal of $InGaZnO_4$ with a rhombohedral crystal structure is 6.357 $g/cm^3$. Accordingly, in the oxide semiconductor film in which the atomic ratio of In to Ga and Zn is 1:1:1, the film density of the amorphous-like OS film is higher than or equal to 5.0 $g/cm^3$ and lower than 5.9 $g/cm^3$, and the film density of the nc-OS film and the CAAC-OS film is higher than or equal to 5.9 $g/cm^3$ and lower than 6.3 $g/cm^3$.

However, there might be no single crystal oxide semiconductor film having the same composition as the oxide semiconductor film. In that case, single crystal oxide semiconductor films with different compositions are combined in an adequate ratio to calculate film density equivalent to that of a single crystal oxide semiconductor film with the desired composition. The film density of the single crystal oxide semiconductor film with the desired composition may be obtained by calculating the weighted average of the film densities of the single crystal oxide semiconductor films with the different compositions in consideration of the combination ratio therebetween. Note that it is preferable to use as few kinds of single crystal oxide semiconductor film as possible to calculate the film density.

Each of the OS layers 660 and 661 of the transistor M1 can be formed using one oxide semiconductor film or two or more oxide semiconductor films. In the case where the OS layers 660 and 661 are formed using two or more oxide semiconductor films, two or more kinds of films selected form an amorphous oxide semiconductor film, an amorphous-like OS film, a microcrystalline oxide semiconductor (nc-OS) film, and a CAAC-OS film may be used.

<Another Structure Example of OS Transistor>

For example, in the transistor M1 in FIG. 28A, the OS layer 660 is formed of two layers of oxide semiconductor films having different constituent elements. In this case, the lower layer is formed using an In—Zn-based oxide film and the upper layer is formed using an In—Ga—Zn-based oxide film. Alternatively, each of the lower and upper layers can be formed using an In—Ga—Zn-based oxide film.

For example, in the case where each of the lower and upper layers is formed using an In—Ga—Zn-based oxide film, one of the layers can be formed using an oxide film with an atomic ratio of In:Ga:Zn=1:1:1, 5:5:6, or 3:1:2, and the other can be formed using an oxide film with an atomic ratio of In:Ga:Zn=1:3:2, 1:3:4, 1:3:6, 1:6:4, or 1:9:6.

In FIG. 28B, when the OS layer 660 has a two-layer structure and the OS layer 661 has a single-layer structure, the transistor M1 may be formed using an oxide semiconductor film having a three-layer structure. Also in this case, all or part of the three layers may be formed using oxide semiconductor films including different constituent elements, or the three layers may be formed using oxide semiconductor films including the same constituent element.

For example, in the case where each of the OS layers 660 and 661 is formed using an In—Ga—Zn-based oxide film, each of the lower layer of the OS layer 660 and the OS layer 661 can be formed using an oxide film with an atomic ratio of In:Ga:Zn=1:3:2, 1:3:4, 1:3:6, 1:6:4, or 1:9:6, and the upper layer of the OS layer 660 can be formed using an oxide film with an atomic ratio of In:Ga:Zn=1:1:1, 5:5:6, or 3:1:2.

This embodiment can be implemented in appropriate combination with any of the other embodiments.

(Embodiment 4)

In this embodiment, usage examples of RFID tags will be described.

Figure 29A:
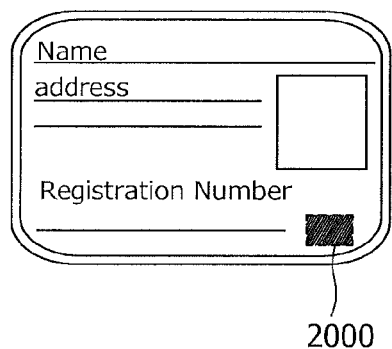
FIGS. 29A to 29F illustrate usage examples of an RFID tag.
Figure 29B:
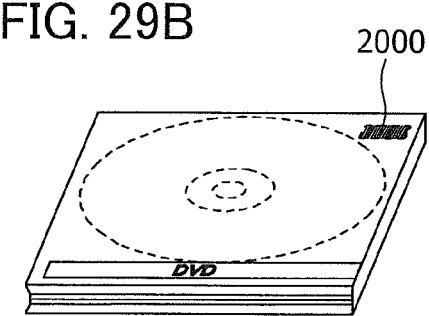
Figure 29C:
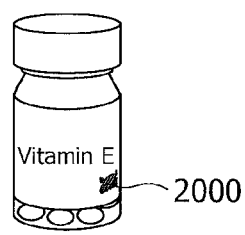
Figure 29D:
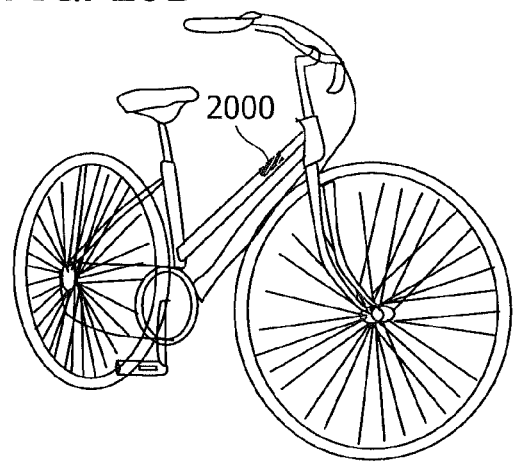
Figure 29E:
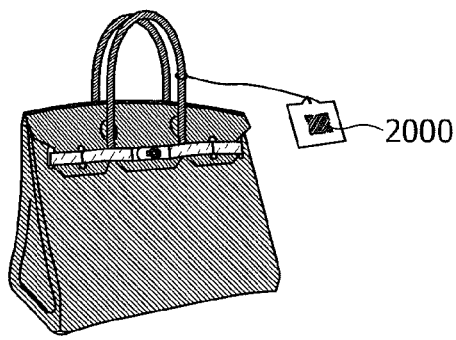
Figure 29F:
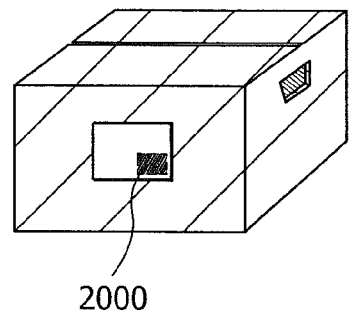

RFID tags can be used in a wide range of fields. For example, they can be provided in objects such as bills, coins, securities, bearer bonds, documents (e.g., driver's licenses or resident's cards, see FIG. 29A), packaging containers (e.g., wrapping paper or bottles, see FIG. 29C), recording media (e.g., DVD software or video tapes, see FIG. 29B), vehicles (e.g., bicycles, see FIG. 29D), personal belongings (e.g., bags or glasses), foods, plants, animals, human bodies, clothing, household goods, medical supplies such as medicine and chemicals, and electronic devices (e.g., liquid crystal display devices, EL display devices, smart phones, cellular phones, clocks, or watches), or tags on objects (see FIGS. 29E and 29F).

An RFID tag 2000 is fixed to an object by being attached to a surface of the object, or embedded in the object. For example, the RFID tag 2000 is fixed to each object by being embedded in paper of a book, or embedded in an organic resin of a package. Since the RFID tag 2000 can be reduced in size, thickness, and weight, it can be fixed to an object without spoiling the design of the object. When the RFID tag 2000 is provided in bills, coins, securities, bearer bonds, documents, or the like, an authentication function can be provided to the objects. The use of the authentication function can prevent forgery. Further, when the RFID tag 2000 is attached to packaging containers, recording media, personal belongings, foods, clothing, household goods, electronic devices, or the like, a system such as an inspection system or an inventory management system can be used efficiently. When the RFID tag 2000 is attached to vehicles, the level of security can be raised.

The RFID tag of Embodiment 2 can be used as the RFID tag 2000, for example. In this case, the RFID tag 2000 can retain data in high-temperature environment; accordingly, an identity management system for an object that is exposed to high-temperature environment can be constructed. Examples of such an object include an object subjected to high-temperature sterilizing treatment (e.g., surgical instrument, dishes, cooking tools, experimental instrument, and clothing).

For example, the RFID tag 2000 is attached to surgical instruments (e.g., steel items such as a scalpel, tweezers, and forceps). Identification information on the kind of the instrument, usage history information, information on cleaning and sterilization, or the like is written to the RFID tag 2000 by a reader/writer. The RFID tag 2000 does not lose its data through the sterilizing treatment by steam under high pressure for the surgical instrument. Thus, with the identity management system using the RFID tag 2000, surgical instruments can be efficiently and appropriately managed and in addition can be properly disposed of.

EXAMPLE 1

Overview

An RFID tag (wireless IC tag) incorporating a memory that uses a c-axis aligned crystalline oxide semiconductor (CAAC-OS) was fabricated. The RFD tag was made through a hybrid process of Si and an oxide semiconductor. The fabricated RFID tag performed memory writing operation at high speed. In addition, the tag retained data through a high-temperature test that was set for more than 300 sterilizing treatments each at 130° C. for 30 minutes, showing that the RFID tag is appropriate for medical uses. Furthermore, this example shows that the incorporation of a memory that uses an oxide semiconductor makes it possible to provide an RFID tag that conforms to the international standard. Detailed description will be given below.

The demand for RFIDs has increased recently in a medical field. For example, an RFID tag is used by being attached to a medical tool for the management thereof. Since medical tools need to be subjected to high-temperature sterilizing treatment at 130° C. with an autoclave, RFID tags are required to have high reliability with respect to temperature for their data retention characteristics. However, although an RFID tag incorporating a ferroelectric random access memory (FeRAM) as a nonvolatile memory capable of high-speed writing has been commercialized, it does not have guaranteed data retention at high temperature. As a nonvolatile memory incorporated in an autoclave-ready tag, an EEPROM with low-speed writing is generally used.

Figure 30A:
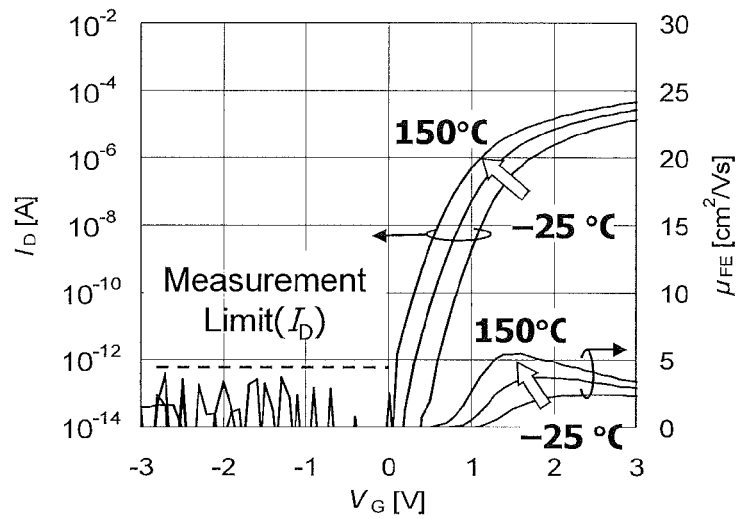
FIG. 30A is a graph showing measurement results of temperature characteristics of an OS transistor.
Figure 30B:
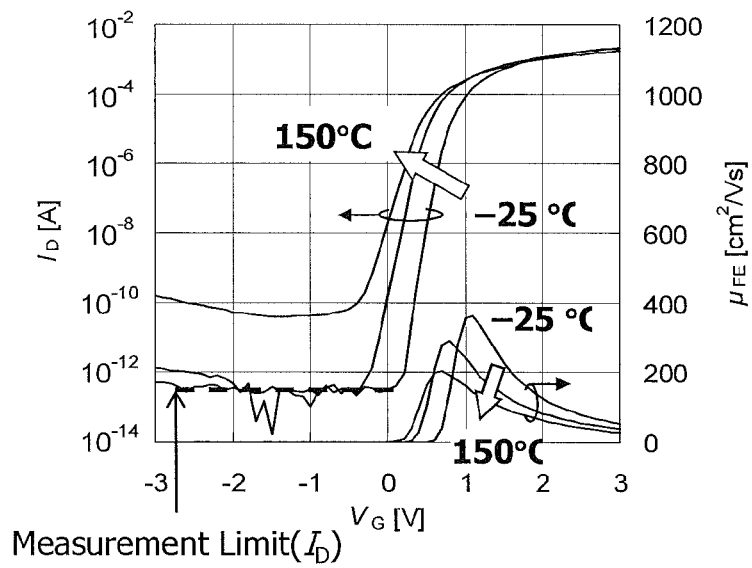
FIG. 30B is a graph showing measurement results of temperature characteristics of a single crystal Si transistor.

As shown in FIG. 30A, a transistor that uses a CAAC-OS layer in which a channel is formed (hereinafter also referred to as a CAAC-OS transistor) has high temperature reliability in high-temperature environment. As described in Embodiment 2, by using a CAAC-OS transistor in a memory cell, a nonvolatile memory can be provided. In the following description, such a memory is referred to as a CAAC-OS memory. Because of high reliability of the CAAC-OS transistor in high-temperature environment and high-speed writing of the CAAC-OS memory, a high-reliability RFID tag that is significantly appropriate for medical uses can be provided.

<<CAAC-OS-Memory-Equipped RFID Tag>>
<RFID Tag>

Figure 31A:
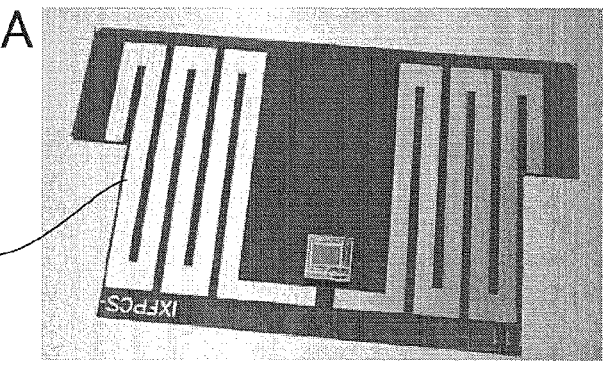
FIG. 31A is a photograph of the external appearance of a fabricated RFID tag.
Figure 31B:
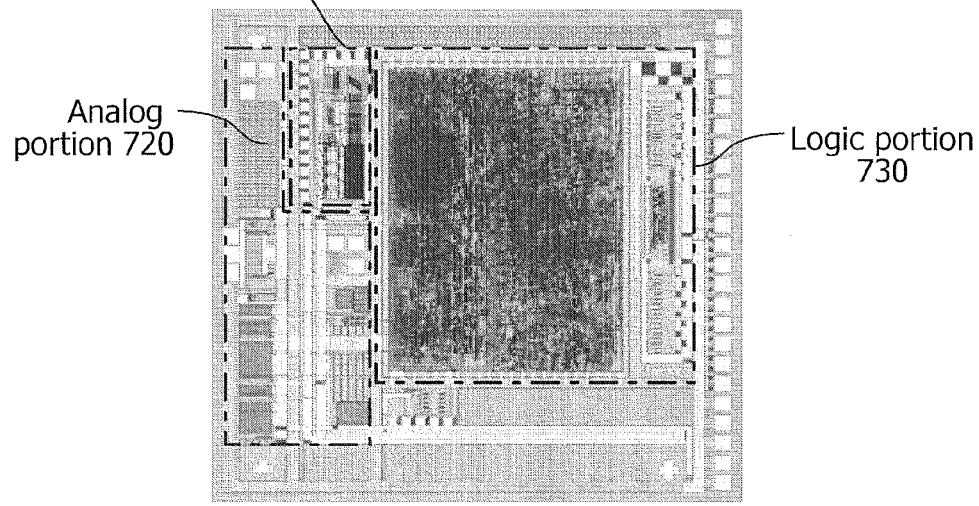
FIG. 31B is a micrograph of a die of the tag.
Figure 31C:
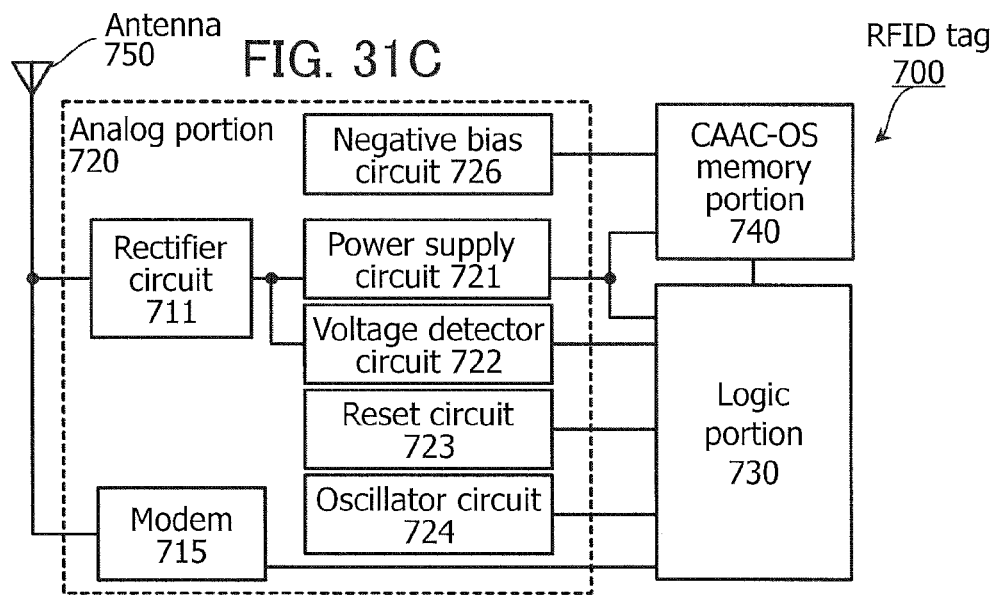
FIG. 31C is a schematic block diagram of the die.

FIG. 31A is a photograph of the external appearance of a fabricated RFID tag 700. FIG. 31B is an optical micrograph of a die of the tag 700. FIG. 31C is a block diagram of the tag 700.

The circuit structure of the fabricated RFID tag 700 is similar to that of the RFID tag 201 (FIG. 25). In FIG. 31C, an input output portion is included in an analog portion 720. The RFD tag 700 includes the analog portion 720, a logic portion 730, a CAAC-OS memory portion 740, and an antenna 750. FIG. 31C illustrates major circuits in the analog portion 720. The analog portion 720 includes a rectifier circuit 711, a modem (modulation demodulation device) 715, a power supply circuit 721, a voltage detector circuit 722, a reset circuit 723, an oscillator circuit 724, and a negative bias circuit 726. The modem 715 includes a modulation circuit and a demodulation circuit.

Table 1 shows major specifications of the RFID tag 700. The carrier frequency is 920 MHz (UHF band), and the communication protocol is ISO/IEC18000-6 Type C. The die size is 5.0×5.0 mm². As an oxide semiconductor layer of an OS transistor, an In—Ga—Zn oxide (IGZO) film was formed.

TABLE 1

| Tag | | Carrier frequency | 92 MHz |
|---|---|---|---|
| | | Protocol | ISO/IEC18000-6 TypeC |
| | | Die size | 5.0 × 5.0 mm² |
| CAAC-OS memory | Technology | CAAC-OS transistor | 0.8 μm |
| | | Si transistor | 0.35 μm |
| | Voltage | CAAC-OS transistor | 3.3 V/−5 V |
| | | Si transistor | 1.8 V/1.2 V |
| | | Module area | 1.1 × 0.5 mm² |
| | | Cell area | 8.0 × 8.2 μm² |
| | | Capacitance | 20.6 fF |
| | | Number of bits | 1024 bit |
| Logic | | Technology | 0.35 μm |
| | | Voltage | 1.2 V |
| | | Area | 3.4 × 3.15 mm² |

<CAAC-OS Memory>

Figure 32A:
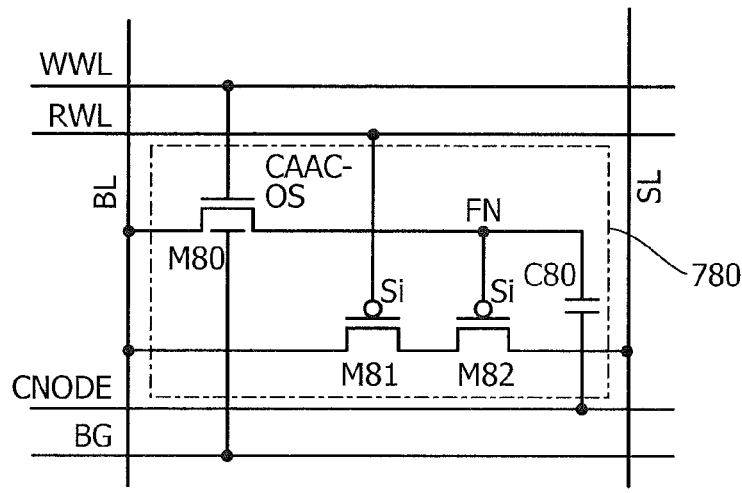
FIG. 32A is a circuit diagram of a memory cell of a CAAC-OS memory portion.
Figure 32B:
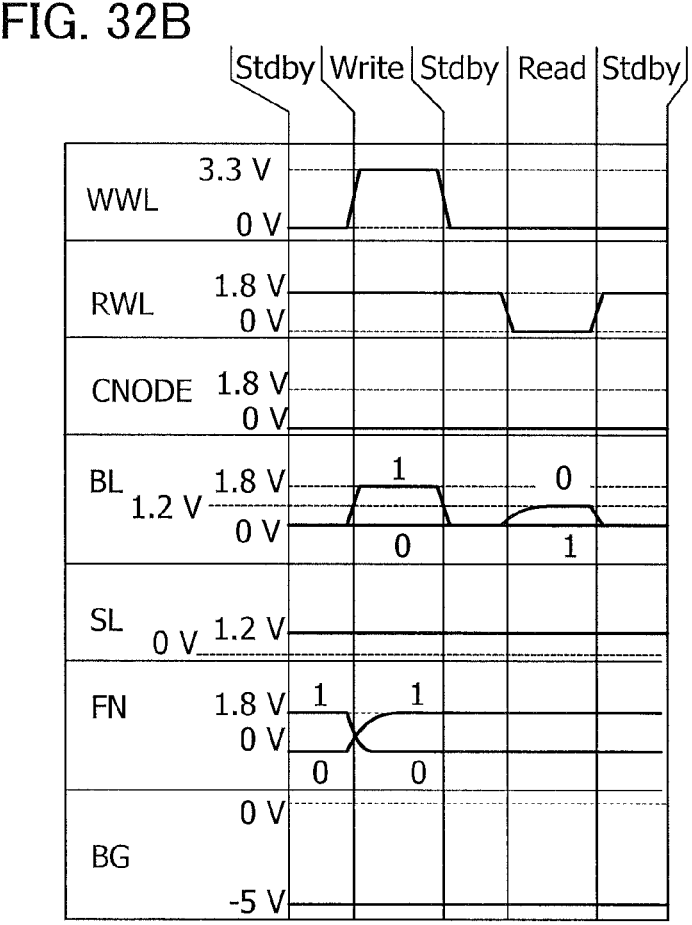
FIG. 32B is a timing chart showing an operation of the memory portion.

FIG. 32A is a circuit diagram of a memory cell of the CAAC-OS memory portion 740. FIG. 32B is a timing chart showing an operation of the CAAC-OS memory portion 740. An operation of the CAAC-OS memory portion 740 is similar to that of the memory portion 240 of the RFID tag 201 (see FIG. 24).

A memory cell array of the CAAC-OS memory portion 740 includes a circuit structure similar to that of the memory cell array 371 (FIG. 23). As illustrated in FIG. 32A, the memory cell 780 includes a CAAC-OS transistor M80, a Si transistor M81, a Si transistor M82, and a capacitor C80. The technology of the CAAC-OS transistor M80 is 0.8 μm. The CAAC-OS transistor M80 exhibits $V_G$-$I_D$ characteristics shown in FIG. 33 and off-state current characteristics shown in FIG. 34.

Figure 33:
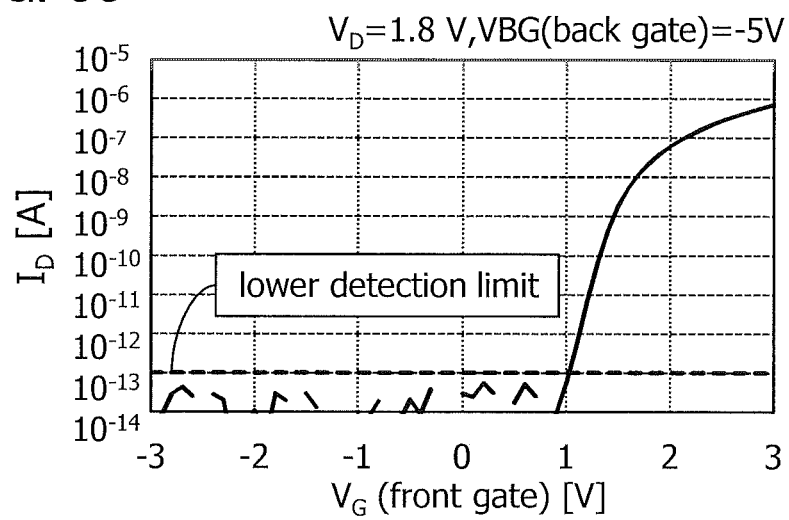
FIG. 33 shows gate voltage $V_G$—drain current $I_D$ characteristics of a CAAC-OS transistor.

In FIG. 33, the horizontal axis indicates the voltage $V_G$ of a front gate and the vertical axis indicates a current $I_D$ between a source and a drain. The front gate of the CAAC-OS transistor M80 is the gate connected to WWL. The results shown in FIG. 33 were measured under conditions that a voltage $V_D$ of 1.8 V was applied to the drain of the transistor M80 and a VBG of −5 V was applied to the back gate.

Figure 34:
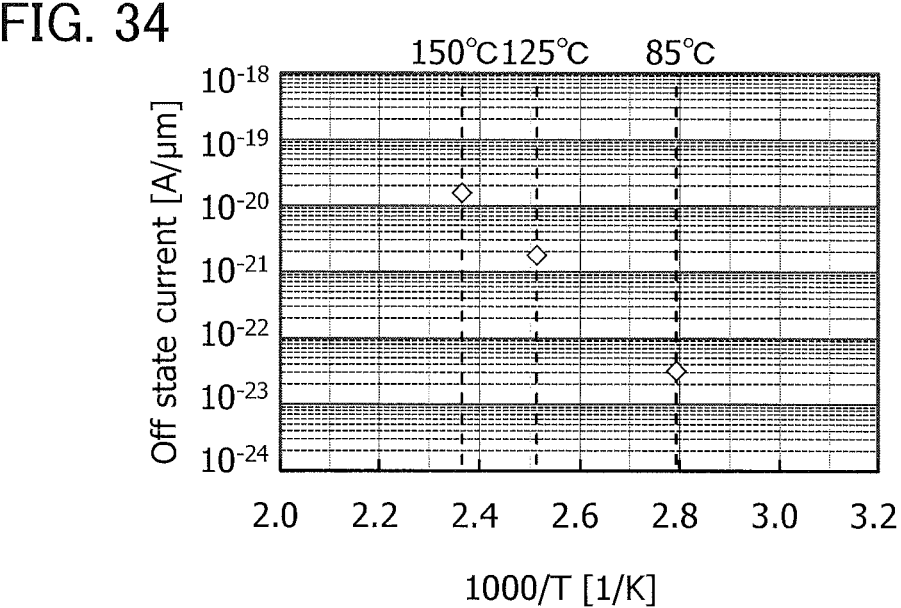
FIG. 34 shows an Arrhenius plot of the off-state current of a CAAC-OS transistor.

An Arrhenius plot in FIG. 34 was obtained by measurement by the following method: the potential of a capacitor was monitored for a long time to calculate an off-state current from a change in the potential (see K. Kato et al., Jpn. J. Appl. Phys., vol. 51, no. 2, 021201, February 2012.).

Figure 35:
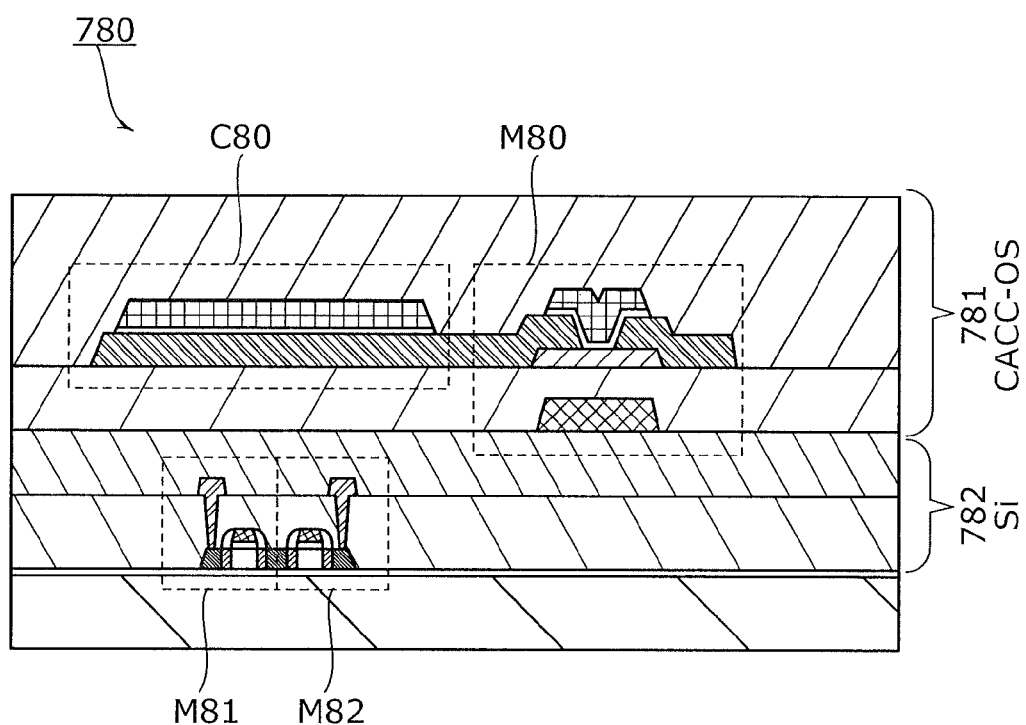
FIG. 35 is a schematic cross-sectional view of a memory cell of a CAAC-OS memory portion.

The die of the RFID tag 700 was made through a hybrid process capable of stacking a CAAC-OS device layer 781 and a Si device layer 782 as illustrated in FIG. 35. FIG. 35 is a schematic cross-sectional view of the die of the RFID tag 700 and roughly illustrates a typical cross-sectional structure of the memory cell 780 of the CAAC-OS memory portion 740. This hybrid process is advantageous in reducing the area of the RFID tag.

The operation of the CAAC-OS memory portion 740 is similar to that of the memory portion 240 of the RFID tag 201 (see FIG. 24). As shown in FIG. 32B, writing is performed by storing charges in the capacitor C81 through the CAAC-OS transistor M80. Reading is performed by detecting the voltage of BL. As shown in FIG. 34, the off-state current of the CAAC-OS transistor is as low as 35.7 yA (y=$10^{-24}$) per micrometer of channel width at 85° C.; accordingly, charges stored in the capacitor C80 can be held for a long time. Assuming that charges stored in the capacitor C80 are steadily lost owing to the off-state current, the charge holding time of the memory cell 780 at 85° C. is estimated at approximately 10 years. Thus, the CAAC-OS memory portion 740 can be regarded as a nonvolatile memory.

<<Test Result>>

Figure 36:
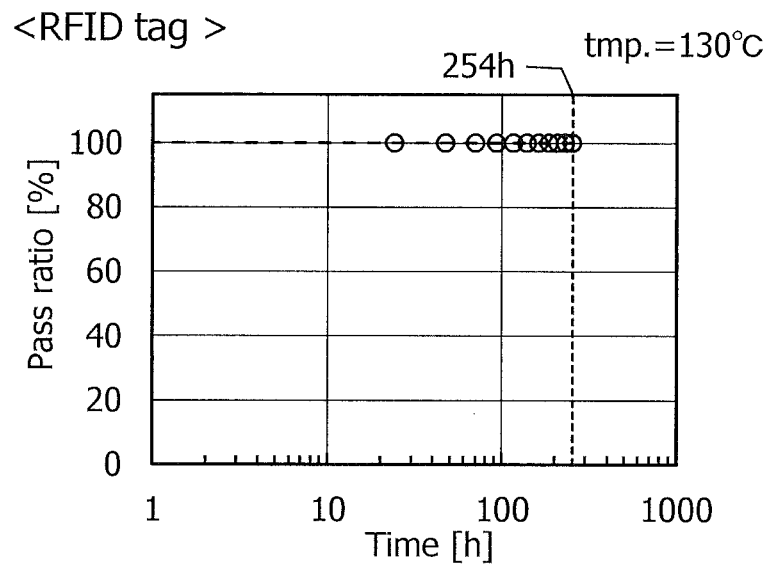
FIG. 36 shows results of a retention test of a fabricated RFID tag (130° C.)
Figures 38A, 38B:
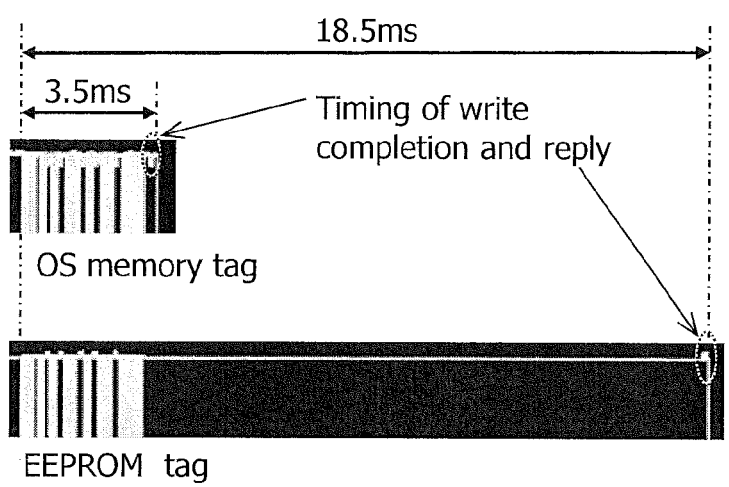
FIGS. 38A and 38B show test results of wireless writing time of RFID tags (FIG. 38A: a fabricated OS memory tag.

FIG. 36 shows results of a retention test of the RFID tag 700 at 130° C. As shown in FIG. 36, the RFID tag 700 retained written data after 254 hours at 130° C. This is equivalent to the retention after 508 sterilizing treatments at 130° C. with an autoclave, and this RFID tag is enough for practical use. After the above retention test, wireless writing time of the RFID tag 700 was tested. FIGS. 38A and 38B show results of the test. FIG. 38A shows the test results of the fabricated RFID tag 700 (OS memory tag), and the writing time was 3.5 ms. FIG. 38B shows the test results of a general tag using an EEPROM (EEPROM tag), and the writing time was 18.5 ms. It was confirmed that after the retention test at 130° C., the RFID tag 700 exhibited higher-speed writing than the RFID tag incorporating the EEPROM.

Figure 37:
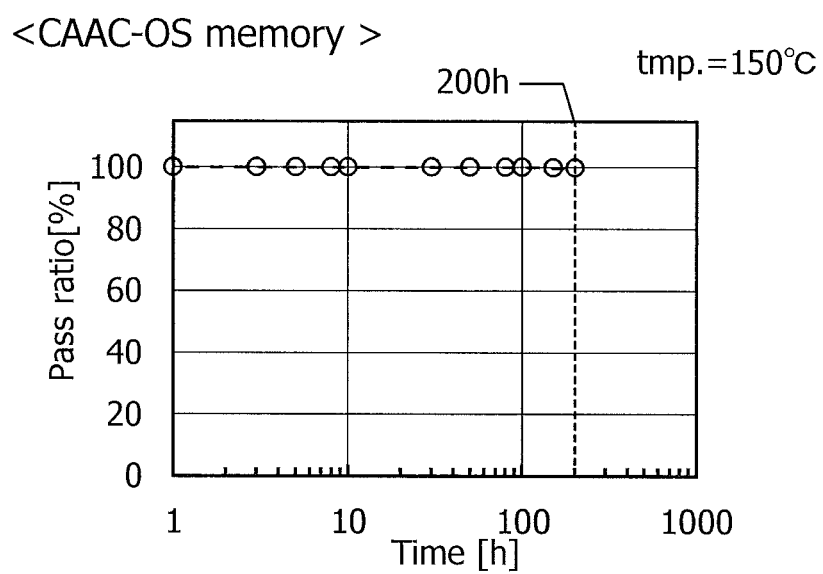
FIG. 37 shows results of a retention test of a fabricated CAAC-OS memory module (150° C.)

A CAAC-OS memory module having a structure similar to that of the CAAC-OS memory portion 740 incorporated in the RFID tag 700 was fabricated, and a retention test at 150° C. was performed. FIG. 37 shows the results, which show that written data was retained for 200 hours at 150° C. In consideration of the off-state current results of FIG. 34, the retention time of 200 hours at 150° C. is equivalent to the retention time of 10 years at 85° C.

By further reducing the off-state current of the CAAC-OS transistor incorporated in the RFID tag, higher retention characteristics of the CAAC-OS memory can be achieved. By reducing the CAAC-OS transistor in size, the RFID tag can be downsized. Our research showed that a CAAC-OS transistor with a 100-nm technology has favorable characteristics. By using a Si transistor with a 180-nm technology, the die size of an RFID tag incorporating the CAAC-OS memory can be downsized to 1.0×1.0 mm² or smaller.

<<Summary>>

In this example, an RFID tag incorporating a CAAC-OS memory was fabricated. This RFID tag is capable of high-speed memory writing and operation conforming to the international standard. In addition, it was confirmed that the fabricated RFID tag retained data through more than 300 sterilizing treatments each at 130° C. for 30 minutes, proving that the RFID tag is appropriate for medical uses.

This application is based on Japanese Patent Application serial no. 2013-171308 filed with Japan Patent Office on Aug. 21, 2013 and Japanese Patent Application serial no. 2014-013156 filed with Japan Patent Office on Jan. 28, 2014, the entire contents of which are hereby incorporated by reference.

What is claimed is:

1. A semiconductor device comprising;
a first power supply circuit;
a second power supply circuit; and
a memory portion comprising a first transistor, the first transistor comprising a gate electrode, a back gate electrode, a first oxide semiconductor layer in a channel portion between the gate electrode and the back gate electrode,
wherein the first power supply circuit is configured to generate a second voltage from a first voltage and supply the second voltage to the second power supply circuit and the memory portion,
wherein the second power supply circuit is configured to generate a third voltage from the second voltage and supply the third voltage to the memory portion, and
wherein the back gate electrode is configured to be supplied with the third voltage.

2. The semiconductor device according to claim 1,
wherein the second power supply circuit includes a charge pump circuit, and
wherein the charge pump circuit comprises a second transistor, the second transistor comprising a second oxide semiconductor layer in a channel portion.

3. The semiconductor device according to claim 2, the second oxide semiconductor layer comprises at least one of indium, zinc, and gallium.

4. The semiconductor device according to claim 2, the charge pump circuit is a step-up charge pump circuit.

5. The semiconductor device according to claim 2, the charge pump circuit is a step-down charge pump circuit.

6. The semiconductor device according to claim 1, the first oxide semiconductor layer comprises at least one of indium, zinc, and gallium.

7. A semiconductor device comprising;
a first power supply circuit;
a second power supply circuit; and
a memory portion including a first transistor, the first transistor comprising a gate electrode, a back gate electrode, and a first oxide semiconductor layer between the gate electrode and the back gate electrode;
wherein the first power supply circuit is configured to generate a second voltage from a first voltage and supply the second voltage to the second power supply circuit and the gate electrode, and
wherein the second power supply circuit is configured to generate a third voltage from the second voltage and supply the third voltage to the back gate electrode.

8. The semiconductor device according to claim 7,
wherein the second power supply circuit includes a charge pump circuit, and
wherein the charge pump circuit comprises a second transistor, the second transistor comprising a second oxide semiconductor layer in a channel portion.

9. The semiconductor device according to claim 8, the second oxide semiconductor layer comprises at least one of indium, zinc, and gallium.

10. The semiconductor device according to claim 8, the charge pump circuit is a step-up charge pump circuit.

11. The semiconductor device according to claim 8, the charge pump circuit is a step-down charge pump circuit.

12. The semiconductor device according to claim 7, the first oxide semiconductor layer comprises at least one of indium, zinc, and gallium.

* * * * *